(12) United States Patent
Tsukada et al.

(10) Patent No.: US 7,878,609 B2
(45) Date of Patent: Feb. 1, 2011

(54) MOUNTING STRUCTURE, MODULE, AND LIQUID CONTAINER

(75) Inventors: Kenji Tsukada, Nagano-Ken (JP); Munehide Kanaya, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 1030 days.

(21) Appl. No.: 11/564,022

(22) Filed: Nov. 28, 2006

(65) Prior Publication Data

US 2007/0085865 A1 Apr. 19, 2007

Related U.S. Application Data

(62) Division of application No. 09/858,888, filed on May 17, 2001, now Pat. No. 7,225,670.

(30) Foreign Application Priority Data

May 18, 2000 (JP) ............................. 2000-147055
Nov. 16, 2000 (JP) ............................. 2000-349436

(51) Int. Cl.
*B41J 2/195* (2006.01)
*G01F 23/00* (2006.01)

(52) U.S. Cl. ........................................ 347/7; 73/290 R

(58) Field of Classification Search ................ 347/7, 347/19, 86; 73/1.73, 33.04, 53.04, 301, 290 R, 73/290 V
See application file for complete search history.

(56) References Cited

U.S. PATENT DOCUMENTS

| | | | |
|---|---|---|---|
| 3,110,890 A | 11/1963 | Westcott et al. |
| 3,220,258 A | 11/1965 | Rod |
| 3,394,589 A | 7/1968 | Tomioka |
| 3,703,693 A | 11/1972 | Levinn |
| 3,832,900 A | 9/1974 | Ross |
| 3,889,247 A | 6/1975 | Voll |
| 4,008,612 A | 2/1977 | Nagaoka et al. |
| 4,107,994 A | 8/1978 | Sogo |
| 4,196,625 A | 4/1980 | Kern |
| 4,310,957 A | 1/1982 | Sachs |
| 4,329,875 A | 5/1982 | Nolting et al. |
| 4,337,470 A | 6/1982 | Furukawa |

(Continued)

FOREIGN PATENT DOCUMENTS

CN 1 274 645 A 11/2000

(Continued)

OTHER PUBLICATIONS

Patent Abstracts of Japan, Publication No. 07081290; Mar. 28, 1995; Pentel KK.

(Continued)

*Primary Examiner*—Anh T. N. Vo
(74) *Attorney, Agent, or Firm*—Sughrue Mion, PLLC

(57) ABSTRACT

The mounting structure for mounting the piezo-electric device (106) used to detect the consumption condition of the liquid in the liquid container (1) to the liquid container (1), having the receiving portion (363) to which the piezo-electric device (106) is to be mounted and the mount portion (363) to be mounted to the liquid container (1). The mounting structure can appropriately mount a piezo-electric device (106) for detecting the consumption condition of a liquid in a liquid container (1) to the liquid container (1).

4 Claims, 34 Drawing Sheets

U.S. PATENT DOCUMENTS

| | | | |
|---|---|---|---|
| 4,403,227 A | 9/1983 | Bertschy et al. |
| 4,419,677 A | 12/1983 | Kasugayama et al. |
| 4,479,982 A | 10/1984 | Nilsson et al. |
| 4,570,482 A | 2/1986 | Murata et al. |
| 4,594,891 A | 6/1986 | Benz et al. |
| 4,604,633 A | 8/1986 | Kimura et al. |
| 4,636,814 A | 1/1987 | Terasawa |
| 4,677,448 A | 6/1987 | Mizusawa et al. |
| 4,703,652 A | 11/1987 | Itoh et al. |
| 4,770,038 A | 9/1988 | Zuckerwar et al. |
| 4,796,782 A | 1/1989 | Wales et al. |
| 4,811,595 A | 3/1989 | Marciniak et al. |
| 4,853,718 A | 8/1989 | El Hatem et al. |
| 4,935,751 A | 6/1990 | Hamlin |
| 4,977,413 A | 12/1990 | Yamanaka et al. |
| 4,984,449 A | 1/1991 | Caldwell et al. |
| 4,984,457 A | 1/1991 | Morris |
| 5,035,140 A | 7/1991 | Daniels et al. |
| 5,049,898 A | 9/1991 | Arthur et al. |
| 5,068,836 A | 11/1991 | Steel |
| 5,132,711 A | 7/1992 | Shinada et al. |
| 5,179,389 A | 1/1993 | Arai et al. |
| 5,233,369 A | 8/1993 | Carlotta et al. |
| 5,247,832 A | 9/1993 | Umezawa et al. |
| 5,264,831 A | 11/1993 | Pfeiffer |
| 5,315,317 A | 5/1994 | Terasawa et al. |
| 5,319,973 A | 6/1994 | Crayton et al. |
| 5,333,505 A | 8/1994 | Takahashi et al. |
| 5,353,631 A | 10/1994 | Woringer et al. |
| 5,410,518 A | 4/1995 | Birkett |
| 5,463,377 A | 10/1995 | Kronberg |
| 5,473,353 A | 12/1995 | Sourcemarianadin et al. |
| 5,506,611 A | 4/1996 | Ujita et al. |
| 5,524,486 A | 6/1996 | Hermann |
| 5,583,544 A | 12/1996 | Stamer et al. |
| 5,586,085 A | 12/1996 | Lichte |
| 5,610,635 A | 3/1997 | Murray et al. |
| 5,616,929 A | 4/1997 | Hara |
| 5,619,238 A | 4/1997 | Higuma et al. |
| 5,675,367 A | 10/1997 | Scheffelin et al. |
| 5,689,288 A | 11/1997 | Wimmer et al. |
| 5,694,156 A | 12/1997 | Hoisington et al. |
| 5,697,248 A | 12/1997 | Brown |
| 5,712,667 A | 1/1998 | Sato |
| 5,737,963 A | 4/1998 | Eckert et al. |
| 5,747,689 A | 5/1998 | Hampo et al. |
| 5,774,136 A | 6/1998 | Barbehenn et al. |
| 5,788,388 A | 8/1998 | Cowger et al. |
| 5,788,819 A | 8/1998 | Onishi et al. |
| 5,793,705 A | 8/1998 | Gazis et al. |
| 5,835,817 A | 11/1998 | Bullock et al. |
| 5,841,454 A | 11/1998 | Hall et al. |
| 5,877,997 A | 3/1999 | Fell |
| 5,900,888 A | 5/1999 | Kurosawa |
| 5,914,733 A | 6/1999 | Sato et al. |
| 5,949,447 A | 9/1999 | Arai et al. |
| 5,975,102 A | 11/1999 | Schalk |
| 6,003,966 A | 12/1999 | Ahn |
| 6,007,190 A | 12/1999 | Murray et al. |
| 6,012,793 A | 1/2000 | Haigo |
| 6,012,794 A | 1/2000 | Nakano et al. |
| 6,024,429 A | 2/2000 | Coffy et al. |
| 6,044,694 A | 4/2000 | Anderson et al. |
| 6,050,669 A | 4/2000 | Yano et al. |
| 6,089,686 A | 7/2000 | Thornton et al. |
| 6,089,688 A | 7/2000 | Froger et al. |
| 6,155,664 A | 12/2000 | Cook |
| 6,164,744 A | 12/2000 | Froger et al. |
| 6,254,212 B1 | 7/2001 | Coudray et al. |
| 6,302,527 B1 | 10/2001 | Walker |
| 6,312,074 B1 | 11/2001 | Walker |
| 6,312,106 B1 | 11/2001 | Walker |
| 6,312,115 B1 | 11/2001 | Hara et al. |
| 6,344,658 B1 | 2/2002 | Nakagawa et al. |
| 6,347,853 B1 | 2/2002 | Kato |
| 6,361,136 B1 | 3/2002 | Watanabe et al. |
| 6,390,590 B1 | 5/2002 | Hansburg |
| 6,416,152 B1 | 7/2002 | Matsuzaki et al. |
| 6,435,638 B1 | 8/2002 | Wilson et al. |
| 6,438,500 B1 | 8/2002 | Froger et al. |
| 6,470,744 B1 | 10/2002 | Usui et al. |
| 6,536,861 B1 | 3/2003 | Usui et al. |
| 2002/0012015 A1 | 1/2002 | Tsukada et al. |
| 2002/0015068 A1 | 2/2002 | Tsukada et al. |
| 2002/0015084 A1 | 2/2002 | Tsukada et al. |
| 2002/0105555 A1 | 8/2002 | Tsukada et al. |
| 2002/0135623 A1 | 9/2002 | Tsukada et al. |
| 2002/0170353 A1 | 11/2002 | Usui et al. |
| 2003/0043216 A1 | 3/2003 | Usui et al. |
| 2003/0071862 A1 | 4/2003 | Tsukada et al. |
| 2003/0117450 A1 | 6/2003 | Usui et al. |
| 2003/0117451 A1 | 6/2003 | Usui et al. |
| 2003/0140694 A1 | 7/2003 | Usui et al. |

FOREIGN PATENT DOCUMENTS

| | | |
|---|---|---|
| EP | 0 553 535 | 8/1993 |
| EP | 0 660 092 | 6/1995 |
| EP | 0 676 624 A2 | 10/1995 |
| EP | 0684136 A2 | 11/1995 |
| EP | 0684136 A3 | 11/1995 |
| EP | 0 803 364 A2 | 10/1997 |
| EP | 0 803 365 A2 | 10/1997 |
| EP | 0 853 236 | 7/1998 |
| EP | 0 860 284 A2 | 8/1998 |
| EP | 0 873 873 A2 | 10/1998 |
| EP | 0 881 079 | 12/1998 |
| EP | 0 881 079 A2 | 12/1998 |
| EP | 0 885 731 A2 | 12/1998 |
| EP | 0 956 964 A2 | 11/1999 |
| EP | 1 055 520 A1 | 11/2000 |
| EP | 1 088 668 | 4/2001 |
| FR | 2572519 A1 | 5/1986 |
| GB | 2 304 898 A | 3/1997 |
| JP | 54-3298 | 2/1979 |
| JP | 54-144233 U | 10/1979 |
| JP | 56-27625 | 3/1981 |
| JP | 56-39413 A | 4/1981 |
| JP | 56-039414 A | 4/1981 |
| JP | 56-053078 A | 5/1981 |
| JP | 56-59629 | 5/1981 |
| JP | 56-061421 U | 5/1981 |
| JP | 58-018125 A | 2/1983 |
| JP | 58-32332 | 3/1983 |
| JP | 58-201027 A | 11/1983 |
| JP | 205820/1983 A | 11/1983 |
| JP | 59-019816 A | 2/1984 |
| JP | 59-031417 A | 2/1984 |
| JP | 59-47829 | 3/1984 |
| JP | 59-052422 U | 4/1984 |
| JP | 59-187227 | 10/1984 |
| JP | 60-4820 A | 1/1985 |
| JP | 60-018350 A | 1/1985 |
| JP | 62-95225 | 5/1987 |
| JP | 62-184856 A | 8/1987 |
| JP | 63-151837 A | 6/1988 |
| JP | 63-247047 | 10/1988 |
| JP | 63-168826 A | 11/1988 |
| JP | 63-295266 A | 12/1988 |
| JP | 1-067530 U | 5/1989 |
| JP | 1-70128 | 5/1989 |
| JP | 02-034353 A | 2/1990 |
| JP | 02-102061 A | 4/1990 |
| JP | 02-279344 A | 11/1990 |

| | | | | | | |
|---|---|---|---|---|---|---|
| JP | 03-036037 A | 2/1991 | | JP | 09-220216 A | 8/1997 |
| JP | 03-067657 | 3/1991 | | JP | 09-267488 A | 10/1997 |
| JP | 03-169642 | 7/1991 | | JP | 09-272202 A | 10/1997 |
| JP | 03-169642 A | 7/1991 | | JP | 09-286121 | 11/1997 |
| JP | 03-190748 A | 8/1991 | | JP | 10026549 | 1/1998 |
| JP | 03-210427 A | 9/1991 | | JP | 10-038662 A | 2/1998 |
| JP | 03-211907 A | 9/1991 | | JP | 10-071724 A | 3/1998 |
| JP | 03-218847 A | 9/1991 | | JP | 10-151753 A | 6/1998 |
| JP | 04135862 | 5/1992 | | JP | 10-175312 | 6/1998 |
| JP | 04-187448 A | 7/1992 | | JP | 10-232157 A | 9/1998 |
| JP | 04-234670 A | 8/1992 | | JP | 10-244683 A | 9/1998 |
| JP | 04-241505 A | 8/1992 | | JP | 10-510353 A | 10/1998 |
| JP | 05-025325 U | 4/1993 | | JP | 10-305590 | 11/1998 |
| JP | 05-057628 U | 7/1993 | | JP | 10-305590 A | 11/1998 |
| JP | 05-254142 | 10/1993 | | JP | 10-323993 A | 12/1998 |
| JP | 5-254142 A | 10/1993 | | JP | 10-323997 A | 12/1998 |
| JP | 5-299671 A | 11/1993 | | JP | 11-010909 A | 1/1999 |
| JP | 05-318757 A | 12/1993 | | JP | 11-014486 A | 1/1999 |
| JP | 06-143610 A | 5/1994 | | JP | 11-020162 A | 1/1999 |
| JP | 06-155762 A | 6/1994 | | JP | 11-020188 A | 1/1999 |
| JP | 06-218942 A | 8/1994 | | JP | 11-048490 A | 2/1999 |
| JP | 06-226990 A | 8/1994 | | JP | 11-058774 A | 3/1999 |
| JP | 6-297726 | 10/1994 | | JP | 11-503820 A | 3/1999 |
| JP | 07-081290 A | 3/1995 | | JP | 11-277760 A | 10/1999 |
| JP | 07-101127 A | 4/1995 | | JP | 11-277761 A | 10/1999 |
| JP | 07-137291 A | 5/1995 | | JP | 11-334107 A | 12/1999 |
| JP | 07137276 | 5/1995 | | JP | 2000-043266 A | 2/2000 |
| JP | 08-034123 A | 2/1996 | | JP | 2000-043287 A | 2/2000 |
| JP | 08-106585 A | 4/1996 | | JP | 2000-190523 A | 7/2000 |
| JP | 08-112912 A | 5/1996 | | JP | 2000318183 | 11/2000 |
| JP | 08-201265 A | 8/1996 | | JP | 2001-146030 | 5/2001 |
| JP | 08-250958 A | 9/1996 | | WO | 98/09139 A1 | 3/1998 |
| JP | 08-258280 A | 10/1996 | | WO | WO 98/09139 A | 3/1998 |
| JP | 09-020013 A | 1/1997 | | WO | WO 98/31548 | 7/1998 |
| JP | 09-029989 | 2/1997 | | WO | WO 99/42293 | 8/1999 |
| JP | 9-29989 A | 2/1997 | | | | |
| JP | 09-029991 A | 2/1997 | | | | |
| JP | 09-039263 A | 2/1997 | | | | |
| JP | 09-064682 A | 3/1997 | | | | |
| JP | 09-085964 A | 3/1997 | | | | |
| JP | 09-178642 A | 7/1997 | | | | |
| JP | 09-193410 A | 7/1997 | | | | |

OTHER PUBLICATIONS

Patent Abstracts of Japan, Publication No. 020343553; Feb. 5, 1990; Canon, Inc.

*Patent Abstracts of Japan*, vol. 1999, No. 04 (Apr. 30, 1999) as it relates to JP 11-020162 A (Fuji Xerox Co., Ltd. (Jan. 26, 1999).

US 5,635,961, 06/1997, Sato (withdrawn)

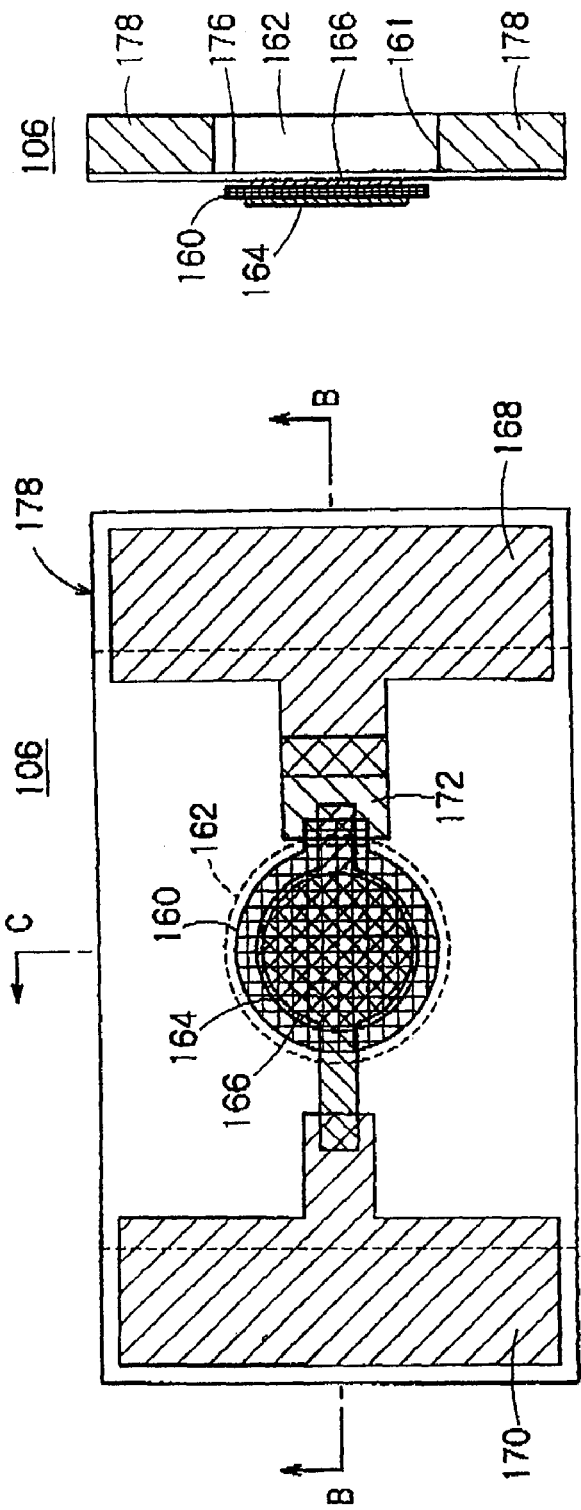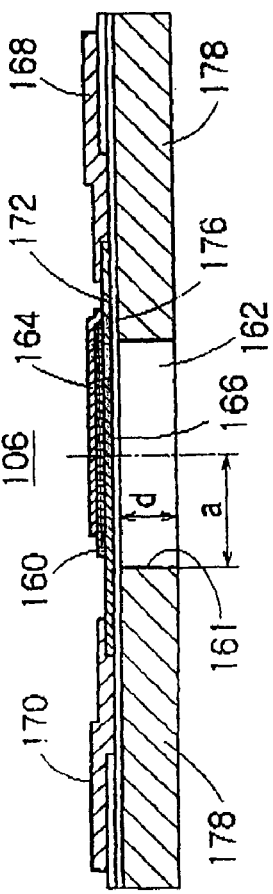

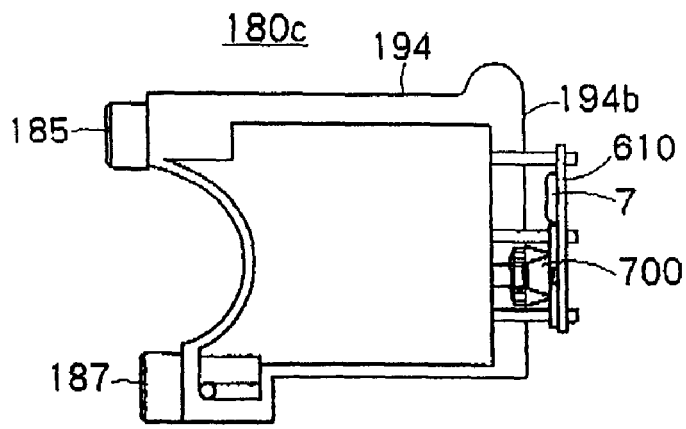
F I G. 17A
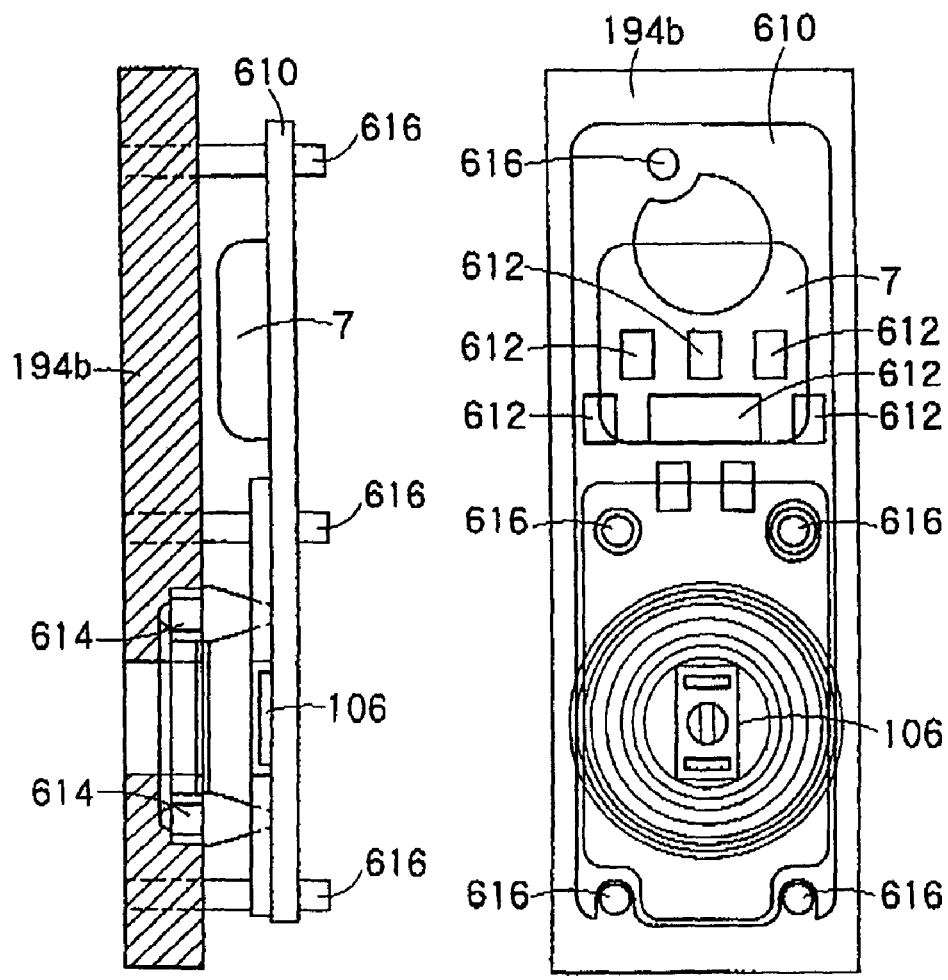
F I G. 17B  F I G. 17C

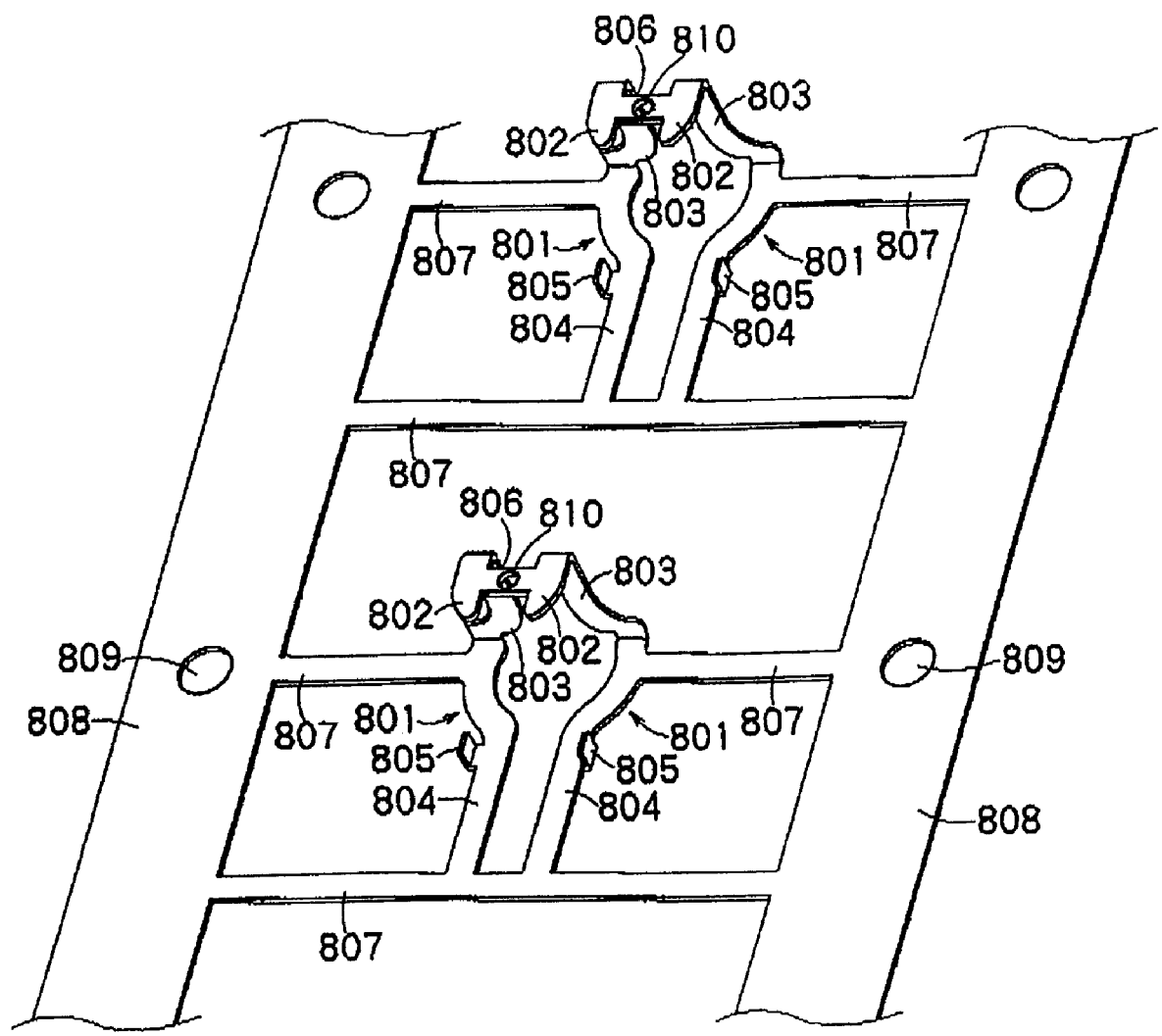
F I G. 22

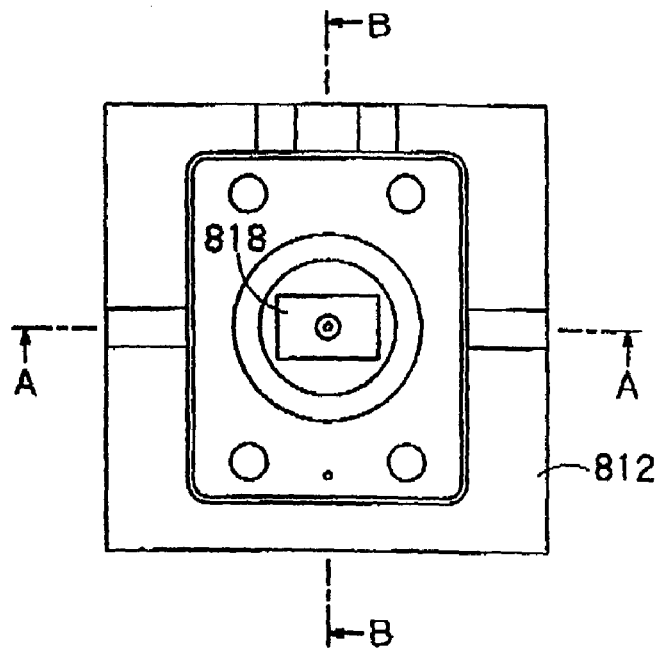
F I G. 27A
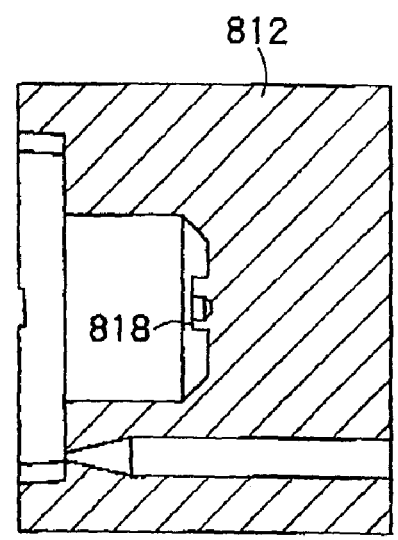
F I G. 27B
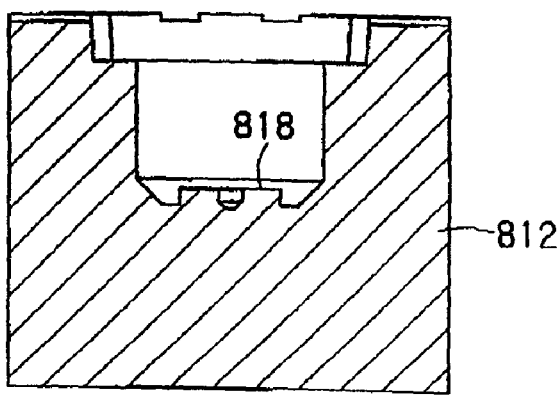
F I G. 27C

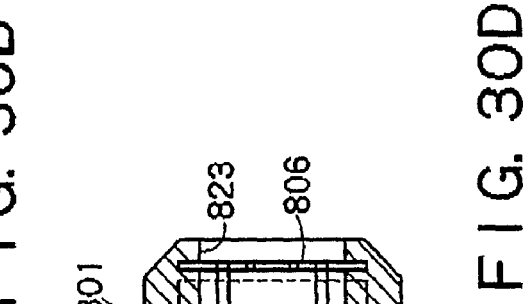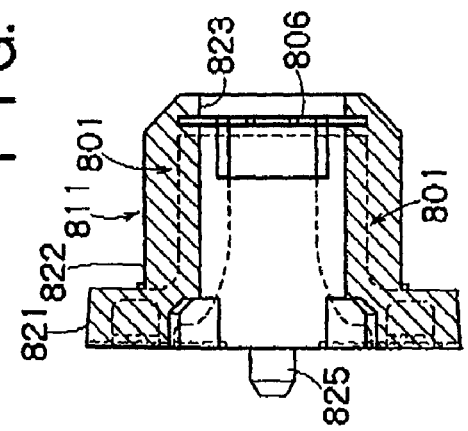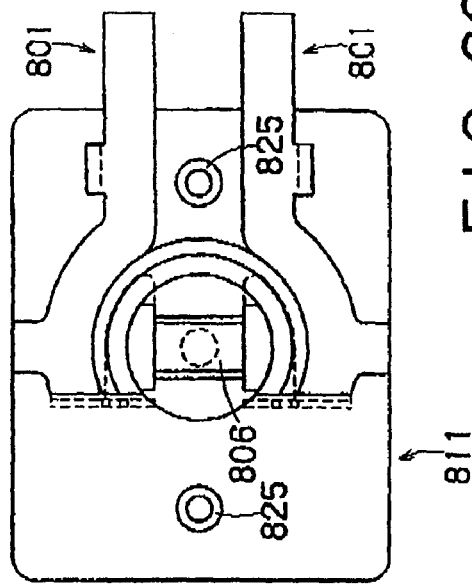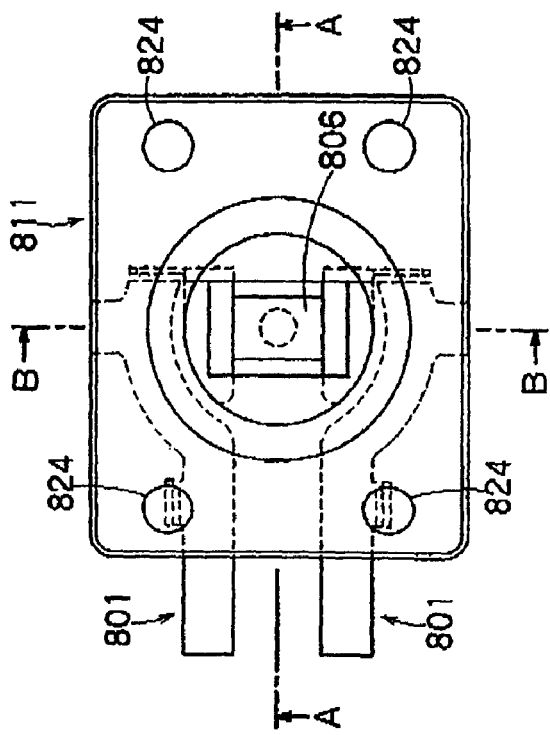

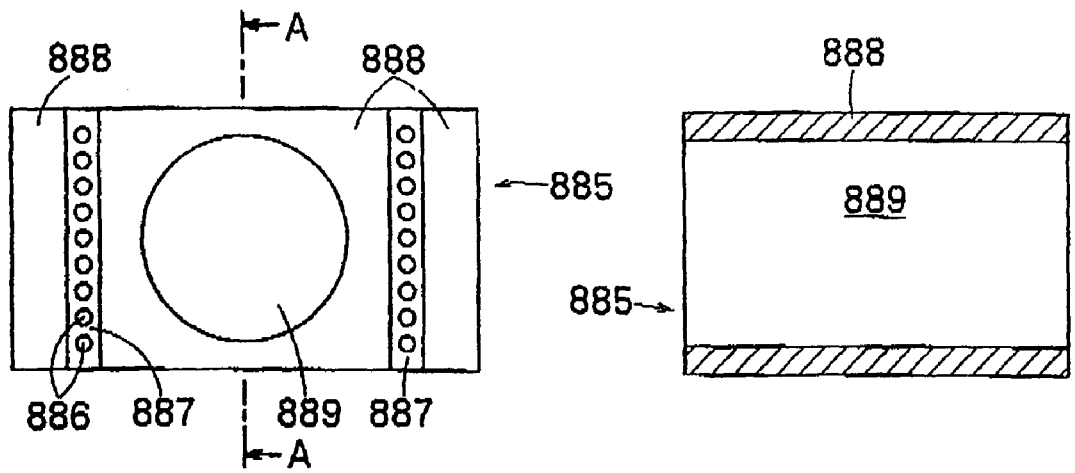
FIG. 36A
FIG. 36B
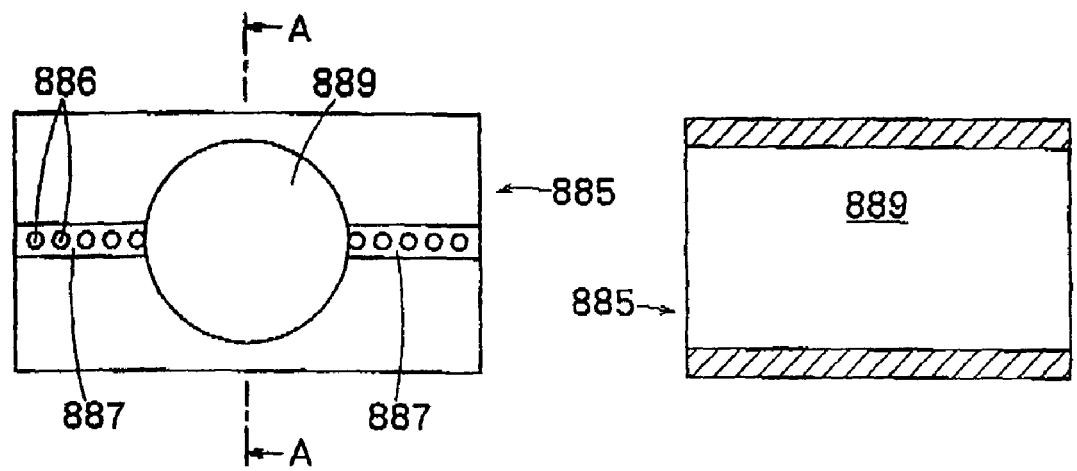
FIG. 37A
FIG. 37B

MOUNTING STRUCTURE, MODULE, AND LIQUID CONTAINER

CROSS-REFERENCE TO RELATED APPLICATIONS

This is a divisional of U.S. application Ser. No. 09/858,888, filed May 17, 2001, which is incorporated herein by reference in its entirety.

BACKGROUND OF THE INVENTION

1. Field of the Invention

The present invention relates to a mounting structure for mounting a piezo-electric device for detecting a liquid consumption condition in a liquid container by detecting changes in an acoustic impedance and particularly detecting changes in a resonance frequency, a module having the mounting structure and the piezo-electric device, and a liquid container having the module and a container body.

2. Description of the Related art

An ink cartridge to be mounted in an ink jet recording apparatus will be explained as an example of a liquid container of a related art. Generally, the ink jet recording apparatus has a pressure generating means for pressurizing a pressure generating chamber, a carriage mounting an ink jet recording head with nozzle openings for injecting pressurized ink as ink drops, and an ink tank for containing ink to be fed to the recording head via a flow path and is structured so as to permit continuous printing. The ink tank is generally structured as a cartridge attached to the recording apparatus in a removable state so as to be simply exchanged by a user when ink is consumed.

Conventionally, as an ink consumption control method of an ink cartridge, a method for totalizing the count of ink drops injected by the recording head and the ink amount sucked at the maintenance step of the printing head by the software and controlling the ink consumption from calculation and a method for attaching two electrodes for direct liquid level detection to the ink cartridge, detecting the point of time when ink is actually consumed in a predetermined amount, thereby controlling the ink consumption are known.

However, the method for totalizing the injection count of ink drops and sucked ink amount by the software and controlling the ink consumption from calculation imposes a problem that the pressure inside the ink cartridge and ink viscosity are varied with the use environment, for example, the magnitude of temperature and humidity in the use room, the elapsed time after opening the ink cartridge, and differences in the use frequency on the user side and an unnegligible error is caused between the ink consumption from calculation and the actual consumption. Further, there is another problem imposed that when the same cartridge is removed once and mounted again, the totalized count is reset once, so that the actual residual quantity of ink cannot be seen at all.

On the other hand, the method for controlling the point of time of ink consumption by the electrodes can detect the actual amount of ink consumption at a certain point, so that it can control the residual quantity of ink with high reliability. However, ink should be conductive so as to detect the ink level, accordingly the kind of ink to be used is limited. Further, a problem arises that the liquid tight structure between the electrodes and the ink cartridge is complicated. Furthermore, as a material of the electrodes, a noble metal which is conductive and highly corrosion-resistant is ordinarily used, so that a problem also arises that the manufacturing cost of an ink cartridge is increased. Furthermore, the two electrodes must be mounted respectively at different locations of the ink cartridge, so that a problem also arises that many manufacturing steps are required and increasing in the manufacturing cost results.

Further, as mentioned above, in the method for controlling the point of time of ink consumption by the electrodes, the holes for mounting the electrodes to the ink cartridge should be formed in the ink cartridge. Therefore, a problem also arises that when the cartridge is made of plastics, the injection molding process is complicated.

Furthermore, the electrodes have a particular sealing structure so as to keep liquid tightness, so that it is difficult to separate them from the ink cartridge. As a result, a problem also arises that it is difficult to exchange or recycle the electrodes or ink cartridge.

In order to solve the aforementioned problems, a piezo-electric device to be mounted to a liquid container and a module which can correctly detect the residual quantity of liquid and requires no complicated sealing structure are proposed.

Therefore, an object of the present invention is to provide a mounting structure for mounting a piezo-electric device having a function for detecting the consumption condition of a liquid in a liquid container to the liquid container and facilitate mounting and demounting the piezo-electric device from the liquid container.

SUMMARY OF THE INVENTION

Namely, according to an aspect of the present invention, a mounting structure for mounting a piezo-electric device used to detect the consumption condition of a liquid in a liquid container to the liquid container is characterized in that it has a receiving portion to which the piezo-electric device is mounted and a mount portion to be mounted to the liquid container. It is possible that the receiving portion has an opening and the vibrating portion of the piezo-electric device comes in contact with the liquid in the liquid container via the opening. It is also possible that the receiving portion additionally has a mounting plate having an opening and the piezo-electric device is mounted to the receiving portion via the mounting plate. The piezo-electric device may be structured so that it has a piezo-electric element having a piezo-electric layer held between electrodes and a vibrating plate on one side of which the piezo-electric element is arranged, and a cavity forming member having a formed cavity is arranged on the other side of the vibrating plate, and the vibrating plate can come in contact with the liquid in the liquid container via the cavity. The cavity forming member may be a substrate on which the piezo-electric element and vibrating plate are formed integrally. The cavity forming member may be a mounting plate to be mounted to the piezo-electric device. It may additionally have a mounting plate having an opening and the cavity of the substrate and the opening of the mounting plate may be arranged so as to be interconnected. The receiving portion may be formed on the top of the mount portion. On the side of the receiving portion formed so as to project from the mount portion, the piezo-electric device may be mounted. The piezo-electric device may have a piezo-electric element and may have an insulating portion for insulating the piezo-electric element from the liquid of the liquid container. The piezo-electric device may additionally have a molding portion for molding the mounting part between the receiving portion and the piezo-electric device. The mount portion may have a column fitting into the liquid container. The mount portion may have a substrate integrally formed with the column. The fitting part of the mount portion to the liquid container may have a sealing structure. Counter electromotive force may be generated by residual vibration remaining in the piezo-electric device. The mounting structure may additionally have a circuit board. The receiving portion may be formed so as to be inclined to the liquid surface in the liquid container.

Further, according to another aspect of the present invention, a mounting structure for mounting a piezo-electric device used to detect the consumption condition of a liquid in a liquid container to the liquid container as an integral structure is characterized in that the mounting structure has a molding portion for molding the junction between the lead wire in contact with the electrode of the piezo-electric device and the liquid container. The mounting structure may have a leg for projecting the piezo-electric device into the liquid container.

Further, still another aspect of the present invention is characterized in that the mounting structure aforementioned is arranged in the liquid container. The receiving portion may be arranged so as to be projected into the liquid container. Furthermore, the receiving portion may be formed so as to be inclined to the liquid surface inside the liquid container. The mounting part between the mount portion and the liquid container may be molded. The mounting structure aforementioned may be attached in a removable state.

Further, another aspect of the present invention is characterized in that a mounting structure for mounting a piezo-electric device used to detect the consumption condition of a liquid in a liquid container to the liquid container has a pair of conductive members for supplying a drive signal to the piezo-electric device and a resin-molded part molded integrally with the pair of conductive members, and the pair of conductive members respectively include distal ends electrically connected to the piezo-electric device, proximal ends electrically connected to the circuit board, and intermediate parts for connecting the distal ends and proximal ends, and at least a part of the intermediate parts is embedded in the molded part.

It is preferable that the pair of distal ends are arranged on the same plane and the pair of proximal ends are arranged on another same plane different from the same plane on which the pair of distal ends are arranged.

It is preferable that each of the pair of conductive members is formed by bending elongated members made of a conductive material, and the same plane on which the pair of distal ends are arranged and the another same plane on which the pair of proximal ends are arranged are parallel with each other, and the elongated members positioned on the same plane and the elongated members positioned on the another same plane are not overlaid with each other in the perpendicular direction to the same plane and the another same plane.

It is preferable that when the molded part is to be resin-molded, the pair of distal ends are connected with a connection member and the connection member is removed after resin molding.

It is preferable that, in the connection member, to position the pair of conductive members to the die to be used for resin molding of the molded part, a positioning hole through which a part of the die is to be inserted is formed.

It is preferable that the positioning hole is formed in a position corresponding to the vibration part of the piezo-electric device.

It is preferable that, for resin molding of the molded part, a female die and a male die to be fitted to the female die are used and a part of the pair of conductive members connected with the connection member has a contour corresponding to a partial structure of the male die so as to position the pair of conductive members to the male die.

It is preferable that at the time of resin molding of the molded part, at least a part of the pair of distal ends is held by a pair of dies, thereby at least a part of the pair of distal ends is exposed without being embedded in the resin and the exposed part of the pair of distal ends forms an electric contact point.

It is preferable that a concavity for receiving the piezo-electric device is formed in the molded part and the pair of distal ends are arranged on the bottom of the concavity.

A still further aspect of the present invention is characterized in that the module has a mounting structure aforementioned and the piezo-electric device embedded in the concavity of the mounting structure, and the piezo-electric device has a piezo-electric element having a piezo-electric layer held by a pair of electrodes and a vibrating plate on one side of which the piezo-electric element is arranged, and a cavity forming member having a formed cavity is arranged on the other side of the vibrating plate, and the liquid in the liquid container comes in contact with the vibrating plate via the cavity.

It is preferable that the piezo-electric device has a pair of electrodes electrically connected to the pair of distal ends of the mounting structure with a conductive adhesive and the periphery of the piezo-electric device is sealed with resin so as to prevent liquid from moving toward the back of the piezo-electric device.

A further aspect of the present invention is characterized in that a mounting structure for mounting a piezo-electric device used to detect the consumption condition of a liquid in a liquid container to the liquid container has a base having electrical wires electrically connected to the piezo-electric device and a projection projected from the base to which the piezo-electric device is mounted and the electrical wires electrically connected to the piezo-electric device are formed three-dimensionally by two-color molding resin plating.

It is preferable that a concavity for receiving the piezo-electric device is formed on the end of the projection, and on the bottom of the concavity, parts electrically connected to the pair of electrodes of the piezo-electric device are formed by at least a part of the electrical wires.

It is preferable that the projection has a tube member projected from the base and a sealing part for sealing the opening at the top of the tube member, and the concavity is formed on the surface of the sealing part, and a through-hole passing through the sealing part is formed at the bottom of the concavity, and the electrical wires electrically connected to the pair of electrodes of the piezo-electric device are continuously formed from the bottom of the concavity to the back side of the sealing part via the inner surface of the through-hole.

Yet a further aspect of the present invention is characterized in that the module has a piezo-electric device used to detect the consumption condition of a liquid in a liquid container, a circuit board electrically connected to the piezo-electric device, and a pressed-and-held connector which is pressed and held between the circuit board and the piezo-electric device so as to electrically connect the pair of electrodes formed on the circuit board and the pair of electrodes of the piezo-electric device.

It is preferable that the pressed-and-held connector has an insulating elastic member which is held and elastically compressed between the circuit board and the piezo-electric device and a plurality of conductors extending inside the elastic member in the compression direction.

It is preferable that the pressed-and-held connector has a pair of conductive rubber members arranged between the pair of electrodes formed on the circuit board and the pair of electrodes of the piezo-electric device and an insulating rubber member for mutually connecting the pair of conductive rubber members.

It is preferable that the piezo-electric device is structured so that it has a piezo-electric element having a piezo-electric layer held between a pair of electrodes and a vibrating plate on one side of which the piezo-electric element is arranged, and a cavity forming member having a formed cavity is arranged on the other side of the vibrating plate, and the vibrating plate comes in contact with the liquid in the liquid container via the cavity.

In any of the above-mentioned embodiments, the piezo-electric device may be supported by a pair of conductive members which are connected to the piezo-electric device.

BRIEF DESCRIPTION OF THE DRAWINGS

FIGS. 1A, 1B and 1C are drawings showing details of the actuator 106.

FIGS. 17A, 17B and 17C are drawings showing other examples of the ink cartridge 180.

FIG. 22 is a perspective view showing the state that the plate member shown in FIG. 21 is bent.

FIGS. 27A, 27B and 27C are drawings showing the constitution of a female die used for processing the molded part shown in FIG. 24.

FIGS. 30A, 30B, 30C and 30D are drawings showing an integrated molded product that the branch parts are cut off at the cutting parts shown in FIG. 21.

FIGS. 36A and 36B are drawings showing an example of a pressed-and-held connector of the module shown in FIG. 35.

FIGS. 37A and 37B are drawing showing another example of a pressed-and-held connector of the module shown in FIG. 35.

DESCRIPTION OF THE PREFERRED EMBODIMENTS

Figure 2:
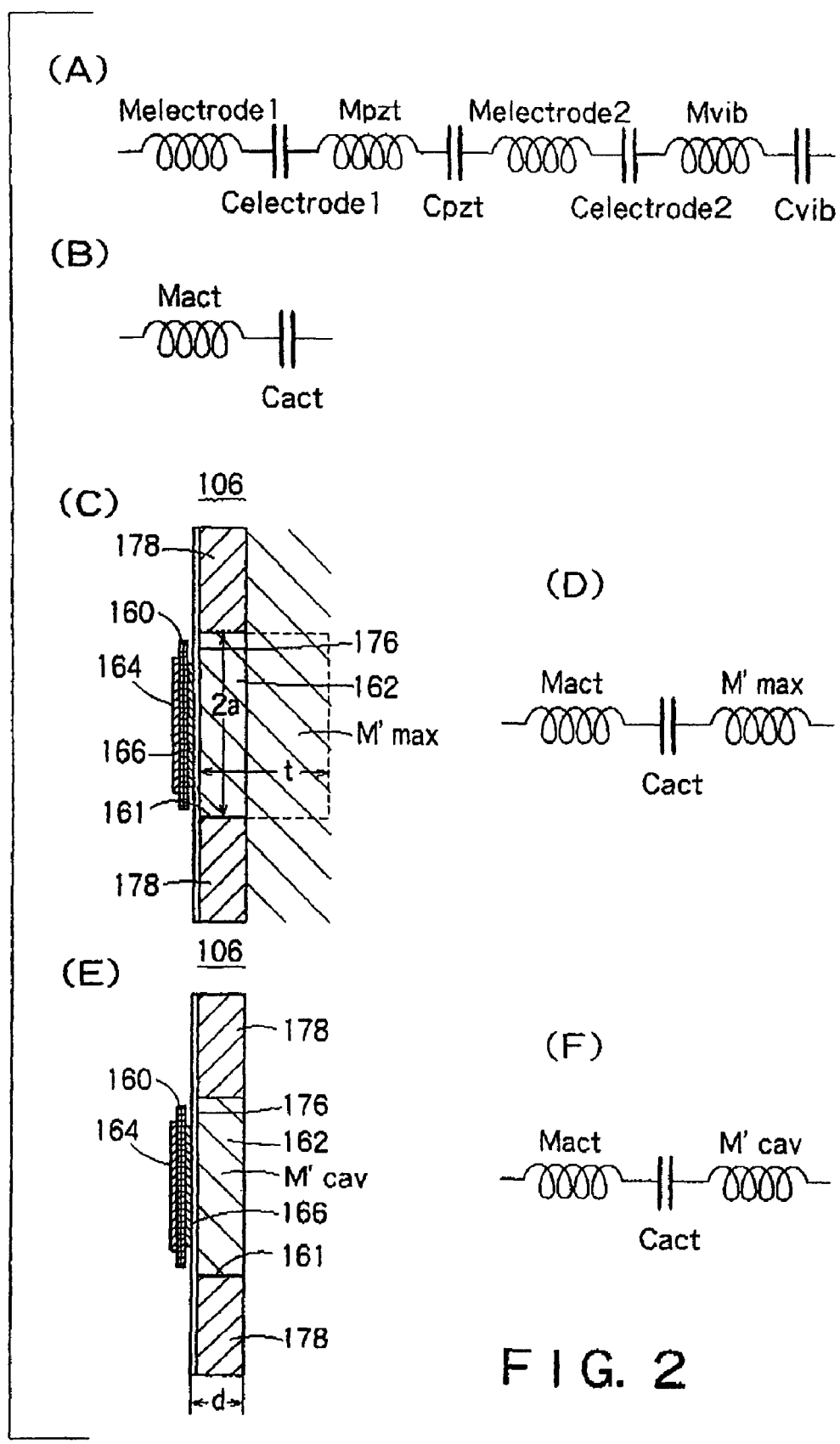
FIG. 2 is a drawing showing the constitution of the actuator 106 and an equivalent circuit.

The present invention will be explained hereunder with reference to the embodiments of the present invention. However, the present invention recited in the claims is not limited to the embodiments described below and the combinations of the characteristics explained in the embodiments are not always necessary to the solving means of the inventions.

In the embodiments, the present invention is applied to the art of a mounting structure for mounting a piezo-electric device for detecting the consumption condition of ink in an ink cartridge to the ink cartridge.

The embodiments of the present invention will be explained concretely hereunder by referring to the accompanying drawings. In the drawings, firstly, the basic art of a piezo-electric device for detecting the consumption condition of ink will be explained (FIGS. 1A to 4B). Then, in FIG. 5 and the subsequent drawings, a mounting structure for mounting the piezo-electric device to an ink cartridge, its exploded view, variations of the mounting structure, and application examples to the ink cartridge will be explained.

In the embodiments, an "actuator" is indicated as an example of the piezo-electric device. However, the configuration of the piezo-electric device is not limited to an actuator and it may bean "elastic wave generation means" or a "piezo-electric element". The components of the piezo-electric device are not limited to the embodiments. As a configuration for realizing the mounting structure, terms of "module" and "module structure" are used.

FIGS. 1A to 2 show details and an equivalent circuit of an actuator 106 which is an embodiment of the piezo-electric device. The actuator aforementioned is used to a method for detecting at least changes in the acoustic impedance and detecting the consumption condition of a liquid in a liquid container. Particularly, the actuator is used to a method for detecting the resonance frequency by the residual vibration, thereby detecting at least changes in the acoustic impedance, and detecting the consumption condition of a liquid in a liquid container. FIG. 1A is an enlarged plan view of the actuator 106. FIG. 1B is a cross sectional view of B-B of the actuator 106. FIG. 1C is a cross sectional view of C-C of the actuator 106. Furthermore, FIG. 2, (A) and (B) show equivalent circuits of the actuator 106. FIG. 2, (C) and (D) respectively show the periphery including the actuator 106 and its equivalent circuit when an ink cartridge is full of ink and FIG. 2, (E) and (F) respectively show the periphery including the actuator 106 and its equivalent circuit when the ink cartridge contains no ink.

The actuator 106 has a substrate 178 having a circular opening 161 almost at its center, a vibrating plate 176 arranged on one side (hereinafter referred to as the surface) of the substrate 178 so as to cover the opening 161, a piezo-electric layer 160 arranged on the surface side of the vibrating plate 176, an upper electrode 164 and a lower electrode 166 holding the piezo-electric layer 169 on both sides, an upper electrode terminal 168 electrically connecting with the upper electrode 164, a lower electrode terminal 170 electrically connecting with the lower electrode 166, and an auxiliary electrode 172 which is arranged between the upper electrode 164 and the upper electrode terminal 168 and electrically connects the two. The piezo-electric layer 160, the upper electrode 164, and the lower electrode 166 have a circular part as an essential section respectively. The respective circular parts of the piezo-electric layer 160, the upper electrode 164, and the lower electrode 166 form a piezo-electric element.

The vibrating plate 176 is formed on the surface of the substrate 178 so as to cover the opening 161. A cavity 162 is formed by the part of the vibrating plate 176 facing on the opening 161 and the opening 161 in the substrate 178. The surface (hereinafter referred to as the back) of the substrate 178 on the opposite side of the piezo-electric element faces on the liquid container side and the cavity 162 is structured so as to come in contact with a liquid. The vibrating plate 176 is attached to the substrate 178 liquid-tightly so as to prevent a liquid leak on the surface side of the substrate 178 even if a liquid enters inside the cavity 162.

The lower electrode 166 is positioned on the surface of the vibrating plate 176, that is, on the surface on the opposite side of the liquid container and attached so that the center of the circular part which is a main part of the lower electrode 166 and the center of the opening 161 almost coincide with each other. The area of the circular part of the lower electrode 166 is set so as to be smaller than the area of the opening 161. On the other hand, on the surface side of the lower electrode 166, the piezo-electric layer 160 is formed so that the center of the circular part thereof and the center of the opening 161 almost coincide with each other. The area of the circular part of the piezo-electric layer 160 is set so as to be smaller than the area of the opening 161 and larger than the area of the circular part of the lower electrode 166.

On the other hand, on the surface side of the piezo-electric layer 160, the upper electrode 164 is formed so that the center of the circular part which is a main part thereof and the center of the opening 161 almost coincide with each other. The area of the circular part of the upper electrode 164 is set so as to be smaller than the areas of the opening 161 and of the circular part of the piezo-electric layer 160 and larger than the area of the circular part of the lower electrode 166.

Therefore, the main part of the piezo-electric layer 160 is structured so as to be held respectively from the surface side and back side by the main part of the upper electrode 164 and the main part of the lower electrode 166, so that the piezo-electric layer 160 can be effectively deformed and driven. The circular parts of the piezo-electric layer 160, the upper electrode 164, and the lower electrode 166 which are the respective main parts form a piezo-electric element of the actuator 106. As mentioned above, the piezo-electric element is in contact with the vibrating plate 176. Among the circular part of the upper electrode 164, the circular part of the piezo-electric layer 160, the circular part of the lower electrode 166, and the opening 161, the area of the opening 161 is the largest. By use of such a structure, the vibration area of the vibrating plate 176 which vibrates actually is defined by the opening 161. The circular part of the upper electrode 164, the circular part of the piezo-electric layer 160, and the circular part of the lower electrode 166 are smaller in the area than the opening 161, so that the vibrating plate 176 vibrates more easily. Furthermore, among the circular part of the lower electrode 166 and the circular part of the upper electrode 164 which are electrically connected to the piezo-electric layer 160, the circular part of the lower electrode 166 is smaller. Therefore, the circular part of the lower electrode 166 defines the part of the piezo-electric layer 160 which generates a piezo-electric effect.

The upper electrode terminal 168 is formed on the surface side of the vibrating plate 176 so as to be electrically connected to the upper electrode 164 via the auxiliary electrode 172. On the other hand, the lower electrode terminal 170 is formed on the surface side of the vibrating plate 176 so as to be electrically connected to the lower electrode 166. The upper electrode 164 is formed on the surface side of the piezo-electric layer 160, so that, in the middle of connection to the upper electrode terminal 168, the upper electrode 164 must have a level difference equal to the sum of the thickness of the piezo-electric layer 160 and the thickness of the lower electrode 166. It is difficult that only the upper electrode 164 forms this level difference, and even if it can do, the connection condition between the upper electrode 164 and the upper electrode terminal 168 becomes weak, and there is a risk of cutting. Accordingly, the auxiliary electrode 172 is used as an auxiliary member and the upper electrode 164 and the upper electrode terminal 168 are connected. By doing this, also the piezo-electric layer 160 and also the upper electrode 164 are structured so as to be supported by the auxiliary electrode 172 and desired mechanical strength can be obtained and furthermore, the upper electrode 164 and the upper electrode terminal 168 can be connected surely.

The piezo-electric element and the vibration area of the vibrating plate 176 facing the piezo-electric element are the vibration parts of the actuator that vibrate actually. Further, it is preferable that the members included in the actuator 106 are calcined and formed integrally mutually. When the actuator 106 is formed integrally, it can be handled easily. Furthermore, when the strength of the substrate 178 is increased, the vibration characteristic is improved. Namely, when the strength of the substrate 178 is increased, only the vibration part of the actuator 106 vibrates and the parts of the actuator 106 other than the vibration part do not vibrate. Further, preventing the parts of the actuator 106 other than the vibration part from vibration can be realized by increasing the strength of the substrate 178 and inversely making the piezo-electric element of the actuator 106 thinner and smaller and making the vibrating plate 176 thinner.

As a material of the piezo-electric layer 160, it is preferable to use lead zirconate titanate (PZT), lead lanthanum zirconate titanate (PLZT), or a leadless piezo-electric film using no lead and as a material of the substrate 178, it is preferable to use zirconia or alumina. It is preferable to use the same material for the vibrating plate 176 as the material of the substrate 178. For the upper electrode 164, the lower electrode 166, the upper electrode terminal 168, and the lower electrode terminal 170, a conductive material, for example, a metal such as gold, silver, copper, platinum, aluminum, or nickel may be used.

The actuator 106 structured as mentioned above can be applied to a container containing a liquid. For example, it can be mounted to an ink cartridge or ink tank to be used for an ink jet recording apparatus or a container for containing a cleaning liquid for cleaning a recording head.

The actuator 106 shown in FIGS. 1A to 2 is mounted at a predetermined location of the liquid container so that the cavity 162 comes in contact with a liquid contained in the liquid container. When a liquid is sufficiently contained in the liquid container, the cavity 162 and the outside thereof are full of liquid. On the other hand, when the liquid of the liquid container is consumed and the liquid level lowers below the actuator mounting location, a condition that no liquid exists in the cavity 162 or a liquid remains only in the cavity 162 and air exists outside thereof is generated. The actuator 106 detects at least a difference in the acoustic impedance caused by this change in the condition. Thereby, the actuator 106 can detect whether a liquid is sufficiently contained in the liquid container or a fixed amount of liquid or more is consumed. Furthermore, the actuator 106 can detect also the kind of liquid contained in the liquid container.

Next, the principle of liquid level detection by the actuator will be explained.

To detect changes in the acoustic impedance of a medium, the impedance characteristic or admittance characteristic of the medium is measured. At the time of measurement of the impedance characteristic or admittance characteristic, for example, the transmission circuit can be used. The transmission circuit impresses a fixed voltage to the medium, changes the frequency, and measures the current flowing through the medium. Or, the transmission circuit supplies a fixed current to the medium, changes the frequency, and measures the voltage impressed to the medium. Changes in the current or voltage measured by the transmission circuit indicate changes in the acoustic impedance. Changes in the frequency fm at which the current or voltage is maximized or minimized also indicates changes in the acoustic impedance.

Separately from the method aforementioned, the actuator can detect changes in the acoustic impedance of a liquid using changes only in the resonance frequency. As a method using changes in the acoustic impedance of a liquid, at the time of using a method for detecting the resonance frequency by vibrating the vibration part of the actuator and then measuring counter electromotive force caused by the residual vibration remaining in the vibration part, for example, the piezo-electric element can be used. The piezo-electric element is an element for generating counter electromotive force by the residual vibration remaining in the vibration part of the actuator and the magnitude of the counter electromotive force varies with the amplitude of the vibration part of the actuator. Therefore, as the amplitude of the vibration part of the actuator increases, the detection becomes easier. Further, the changing cycle of magnitude of the counter electromotive force varies with the frequency of the residual vibration remaining in the vibration part of the actuator. Therefore, the frequency of the vibration part of the actuator corresponds to the frequency of the counter electromotive force. Here, the resonance frequency is referred to as a frequency in a resonance state between the vibration part of the actuator and a medium in contact with the vibration part.

To obtain the resonance frequency fs, the waveform obtained by measurement of the counter electromotive force when the vibration part and medium are in a resonance state is subjected to the Fourier transformation. The vibration of the actuator is accompanied by various deformations such as deflection and extension instead of deformation only in one direction and has various frequencies including the resonance frequency fs. Therefore, the waveform of the counter electromotive force when the piezo-electric element and medium are in a resonance state is subjected to the Fourier transformation and the most dominant frequency component is identified, there by the resonance frequency fs is judged.

The frequency fm is a frequency when the admittance characteristic of a medium is maximum or the impedance characteristic thereof is minimum. When the resonance frequency fs is used, the frequency fm may cause a slight error for the resonance frequency fs due to a dielectric loss of a medium or a mechanical loss thereof. However, it requires a great deal of time to derive the resonance frequency fs from the frequency fm to be measured, so that the frequency fm is generally used instead of the resonance frequency. Then, when the output of the actuator 106 is input to the transmission circuit, the actuator 106 can detect at least the acoustic impedance.

The experiment proves that there is little difference in the resonance frequency identified by the method for measuring the impedance characteristic of a medium or admittance characteristic thereof and measuring the frequency fm and the method for measuring the resonance frequency fs by measuring the counter electromagnetic force caused by the residual vibration in the vibration part of the actuator.

The vibration area of the actuator 106 is the part of the vibrating plate 176 constituting the cavity 162 defined by the opening 161. When a liquid is sufficiently contained in the liquid container, the cavity 162 is full of liquid and the vibration area is in contact with the liquid in the liquid container. On the other hand, when no liquid is sufficiently contained in the liquid container, the vibration area is in contact with a liquid remaining in the cavity in the liquid container or in contact with gas or a vacuum instead of a liquid.

The actuator 106 of the present invention is provided with the cavity 162, so that a liquid in the liquid container remains in the vibration area of the actuator 106. The reason thereof is indicated below.

Depending on the mounting position or mounting angle of the actuator to the liquid container, a liquid may be adhered to the vibration area of the actuator, though the liquid level in the liquid container is lower than the mounting position of the actuator. When the actuator detects existence of a liquid only by existence of a liquid in the vibration area, a liquid adhered to the vibration area of the actuator disturbs precise detection of existence of a liquid.

For example, when the liquid level is lower than the mounting position of the actuator, if the liquid container rocks due to the reciprocating motion of the carriage, and the liquid waves, and a liquid is adhered to the vibration area, the actuator misjudges that a liquid is sufficiently contained in the liquid container. Therefore, when a cavity designed so as to precisely detect existence of a liquid even if a liquid remains there inversely is positively installed, the actuator can be prevented from malfunctions even if the liquid container rocks and the liquid level waves. When an actuator having a cavity is used like this, malfunctions can be prevented.

Further, as shown in FIG. 2, (E), a case that there is no liquid in the liquid container and a liquid in the liquid container remains in the cavity 162 of the actuator 106 is set as a threshold value of existence of a liquid. Namely, when there is no liquid around the cavity 162 and the liquid in the cavity is smaller than the threshold value, the actuator judges that there is no ink and when there is a liquid around the cavity 162 and the liquid in the cavity is larger than the threshold value, the actuator judges that there is ink. For example, when the actuator 106 is mounted on the side wall of the liquid container, if the liquid in the liquid container is positioned lower than the mounting position of the actuator, the actuator judges that there is no ink and if the liquid in the liquid container is positioned higher than the mounting position of the actuator, the actuator judges that there is ink. When the threshold value is set like this, even when the ink in the cavity is dried and exhausted, the actuator judges that there is no ink and even if ink is adhered to the cavity again due to rocking of the carriage though the ink in the cavity is exhausted, the amount does not exceed the threshold value, so that the actuator can judge that there is no ink.

Next, the operation and principle for detecting the liquid condition in the liquid container from the resonance frequency between a medium and the vibration part of the actuator 106 by measurement of the counter electromotive force will be explained by referring to FIGS. 1A to 2. In the actuator 106, a voltage is impressed to the upper electrode 164 and the lower electrode 166 respectively via the upper electrode terminal 168 and the lower electrode terminal 170. An electric field is generated in the part of the piezo-electric layer 160 held by the upper electrode 164 and the lower electrode 166. The piezo-electric layer 160 is deformed by this electric field. When the piezo-electric layer 160 is deformed, the vibration area of the vibrating plate 176 is bent and vibrates. For a little while after the piezo-electric layer 160 is deformed, the bending vibration remains in the vibration part of the actuator 106.

The residual vibration is free vibration of the vibration part of the actuator 106 and the medium. Therefore, when the voltage to be impressed to the piezo-electric layer 160 is set to a pulse waveform or a square waveform, the resonance state can be easily obtained between the vibration part and the medium after voltage impression. The residual vibration vibrates the vibration part of the actuator 106, so that it also deforms the piezo-electric layer 160. Therefore, the piezo-electric layer 160 generates counter electromotive force. The counter electromotive force is detected via the upper electrode 164, the lower electrode 166, the upper electrode terminal 168, and the lower electrode terminal 170. The resonance frequency can be identified by the counter electromotive force detected, so that the liquid state in the liquid container can be detected.

Generally, the resonance frequency fs is expressed by the following formula:

$$fs=1/(2*\pi*(M*Cact)^{1/2})$$ Formula 1

In this case, M indicates the sum of inertance Mact of the vibration part and additional inertance M' and Cact indicates compliance of the vibration part.

FIG. 1C is a cross sectional view of the actuator 106 of this embodiment when no ink remains in the cavity. FIG. 2, (A) and (B) show equivalent circuits of the vibration part of the actuator 106 and the cavity 162 when no ink remains in the cavity.

Mact is a value obtained by dividing the product of the thickness and density of the vibration part by the area of the vibration part and more in detail, it is expressed by the following formula as shown in FIG. 2, (A).

$$Mact=Mpzt+Melectrode1+Melectrode2+Mvib$$ Formula 2

In this case, Mpzt is a value obtained by dividing the product of the thickness and density of the piezo-electric layer 160 in the vibration part by the area of the piezo-electric layer 160. Melectrode1 is a value obtained by dividing the product of the thickness and density of the upper electrode 164 in the vibration part by the area of the upper electrode 164. Melectrode2 is a value obtained by dividing the product of the thickness and density of the lower electrode 166 in the vibration part by the area of the lower electrode 166. Mvib is a value obtained by dividing the product of the thickness and density of the vibrating plate 176 in the vibration part by the area of the vibration area of the vibrating plate 176. However, since Mact can be calculated from the thickness, density, and area of the whole vibration part, it is preferable in this embodiment that although the areas of the piezo-electric layer 160, the upper electrode 164, the lower electrode 166, and the vibration area of the vibrating plate 176 have the magnitude relations aforementioned, the mutual differences between the areas are minute. According to this embodiment, in the piezo-electric layer 160, the upper electrode 164, and the lower electrode 166, it is preferable that the parts other than the circular parts which are the main parts thereof are so minute as to be ignored for the main parts.

Therefore, in the actuator 106, Mact is the sum of inertance of each of the upper electrode 164, the lower electrode 166, the piezo-electric layer 160, and the vibration area of the vibrating plate 176. The compliance Cact is compliance of the part formed by the upper electrode 164, the lower electrode 166, the piezo-electric layer 160, and the vibration area of the vibrating plate 176.

FIG. 2, (A), (B), (D), and (F) indicate equivalent circuits of the vibration part of the actuator 106 and the cavity 162 and in the equivalent circuits, Cact indicates the compliance of the vibration part of the actuator 106. Cpzt, Celectrode1, Celectrode2, and Cvib respectively indicate compliance of the vibration part of the piezo-electric layer 160, the upper electrode 164, the lower electrode 166, and the vibrating plate 176. Cact is expressed by Formula 3 indicated below.

$$1/Cact=(1/Cpzt)+(1/Celectrode1)+(1/Celectrode2)+(1/Cvib)$$ Formula 3

By Formulas 2 and 3, FIG. 2, (A) can be indicated as FIG. 2, (B).

The compliance Cact indicates a volume for receiving a medium by deformation when pressure is applied to a unit area of the vibration part. The compliance Cact may be said to indicate deformation easiness.

FIG. 2, (C) indicates a cross sectional view of the actuator 106 when a liquid is sufficiently contained in the liquid container and the periphery of the vibration part of the actuator 106 is full of liquid. M' max shown in FIG. 2, (C) indicates a maximum value of the additional inertance when a liquid is sufficiently contained in the liquid container and the periphery of the vibration part of the actuator 106 is full of liquid. M' max is indicated as follows:

$$M'\text{max}=(\pi*\rho/(2*k^3))*(2*(2*k*a)^3/(3*\pi))/(\pi*a^2)^2 \quad \text{Formula 4}$$

where a indicates a radius of the vibration part, ρ density of the medium, and k a wave-number. Formula 4 is held when the vibration area of the actuator 106 is a circle with a diameter of a. The additional inertance M' is a value indicating that the mass of the vibration part is apparently increased by the action of a medium existing in the neighborhood of the vibration part. Formula 4 shows that M' max greatly varies with the radius a of the vibration part and the density ρ.

The wave-number k is expressed by the following:

$$k=2*\pi*\text{fact}/c \quad \text{Formula 5,}$$

where fact indicates a resonance frequency of the vibration part when it is not in contact with an liquid and c indicates an acoustic speed propagating through the medium.

FIG. 2, (D) shows an equivalent circuit of the vibration part of the actuator 106 and the cavity 162 shown in FIG. 2, (C) when a liquid is sufficiently contained in the liquid container and the periphery of the vibration part of the actuator 106 is full of liquid.

FIG. 2, (E) indicates a cross sectional view of the actuator 106 when the liquid in the liquid container is consumed and there is no liquid remaining around the vibration part of the actuator 106, though a liquid remains in the cavity 162 of the actuator 106. Formula 4 is a formula indicating maximum inertance M' max decided from the ink density ρ, for example, when the liquid container is full of liquid. On the other hand, when the liquid in the liquid container is consumed, and a liquid remains in the cavity 162, and the liquid around the vibration area of the actuator 106 is changed to air or a vacuum, it can be indicated as follows:

$$M'=\rho*t/S \quad \text{Formula 6,}$$

where t indicates a thickness of a medium relating to vibration and S indicates an area of the vibration area of the actuator 106. When the vibration area is a circle with a radius of a, $S=\pi*a^2$. Therefore, the additional inertance M' follows Formula 4 when a liquid is sufficiently contained in the liquid container and the periphery of the vibration part of the actuator 106 is full of liquid. On the other hand, when the liquid is consumed, and a liquid remains in the cavity 162, and the liquid around the vibration area of the actuator 106 is changed to air or a vacuum, the additional inertance M' follows Formula 6.

Here, as shown in FIG. 2, (E), the additional inertance M' when the liquid in the liquid container is consumed and there is no liquid remaining around the vibration part of the actuator 106, though a liquid remains in the cavity 162 of the actuator 106 is indicated by M' cav for convenience so as to distinguish it from the additional inertance M' max when the periphery of the vibration part of the actuator 106 is full of liquid.

FIG. 2, (F) shows an equivalent circuit of the vibration part of the actuator 106 and the cavity 162 shown in FIG. 2, (E) when the liquid in the liquid container is consumed and there is no liquid remaining around the vibration part of the actuator 106, though a liquid remains in the cavity 162 of the actuator 106.

In this case, the parameters concerning the medium condition are the medium density ρ and medium thickness t in Formula 6. When a liquid is sufficiently contained in the liquid container, the liquid is in contact with the vibration part of the actuator 106 and when a liquid is not sufficiently contained in the liquid container, a liquid remains in the cavity or gas or a vacuum is in contact with the vibration part of the actuator 106. When the liquid around the actuator 106 is consumed and the additional inertance in the process of moving from M' max shown in FIG. 2, (C) to M' cav shown in FIG. 2, (E) is assumed as M' var, the medium thickness t is changed depending on the liquid containing condition in the liquid container, so that the additional inertance M' var is changed and the resonance frequency fs is also changed. Therefore, by identifying the resonance frequency fs, the existence of liquid in the liquid container can be detected. In this case, when t=d is set as shown in FIG. 2, (E) and M' cav is expressed using Formula 6, by substituting the depth d of the cavity for t given in Formula 6, the following is obtained:

$$M'\text{cav}=\rho*d/S \quad \text{Formula 7.}$$

A medium which is a liquid different in the kind is different in the density ρ depending on the difference in the composition, so that the additional inertance M' is changed and the resonance frequency fs is also changed. Therefore, by identifying the resonance frequency fs, the kind of liquid can be detected.

Figure 3A:
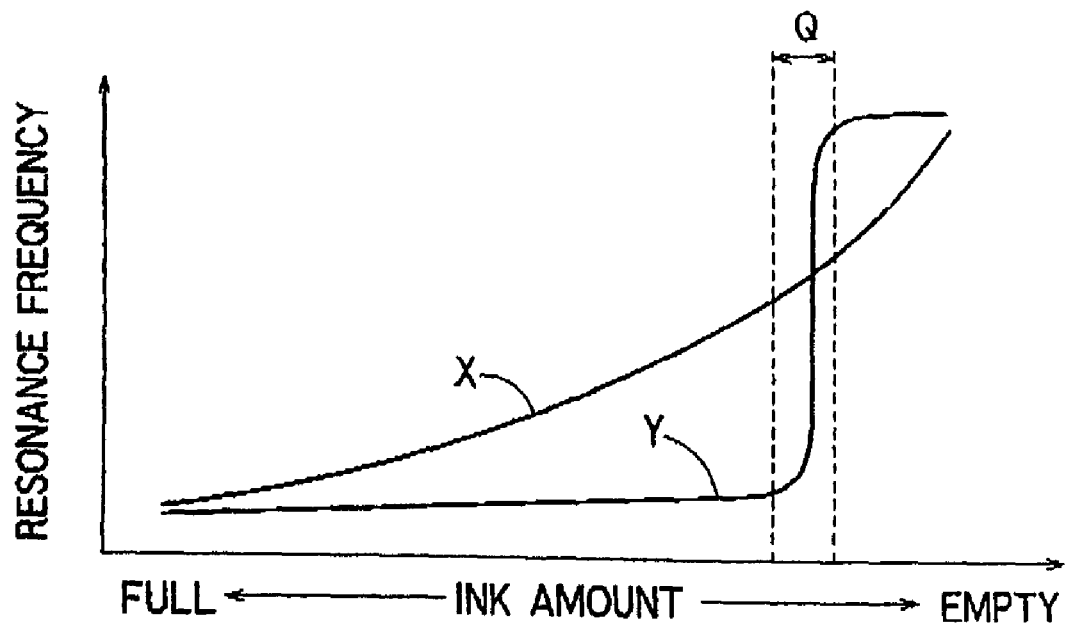
FIGS. 3A and 3B are drawings showing the relationship between the ink density and the resonance frequency of ink detected by the actuator 106.

FIG. 3A shows graphs indicating the relationship between the ink amount, ink, and resonance frequency fs of a vibration part in an ink tank. Here, ink will be explained as an example of a liquid. The ordinate axis indicates the resonance frequency fs and the transverse axis indicates an ink amount. When the ink composition is fixed, as the residual amount of ink reduces, the resonance frequency fs increases.

When ink is sufficiently contained in the ink container and the periphery of the vibration area of the actuator 106 is full of ink, the maximum additional inertance M' max is the value expressed by Formula 4. On the other hand, when the ink is consumed, and a liquid remains in the cavity 162, and the periphery of the vibration area of the actuator 106 is not full of ink, the additional inertance M' var is calculated from Formula 6 on the basis of the medium thickness t. "t" in Formula 6 is the thickness of the medium relating to vibration, so that when the thickness d (FIG. 1B) of the cavity 162 of the actuator 178 is reduced, that is, the substrate 178 is made sufficient thin, the process that ink is gradually consumed can be detected (FIG. 2, (C)). Here, t ink is assumed as an ink thickness relating to vibration and t ink-max is assumed as t ink in M' max. For example, the actuator 106 is arranged on the bottom of the ink cartridge almost horizontally with the ink level. When the ink is consumed and the ink level reaches the height t ink-max or less from the actuator 106, M' var is slowly changed according to Formula 6 and the resonance frequency fs is slowly changed according to Formula 1. Therefore, as long as the ink level is within the range of t, the actuator 106 can detect slowly the ink consumption condition.

When the vibration area of the actuator 106 is made larger or longer and arranged length ways, S in Formula 6 is changed according to the position of ink level due to ink consumption. Therefore, the actuator 106 can detect also the process of slow consumption of ink. For example, the actuator 106 is arranged on the side wall of the ink cartridge almost perpendicularly to the ink level. When the ink is consumed and the ink level reaches the vibration area of the actuator 106, the additional inertance M' reduces as the ink level lowers, so that the resonance frequency fs slowly increases according to Formula 1. Therefore, so long as the ink level is within the range of the diameter 2a (FIG. 2, (C)) of the cavity 162, the actuator 106 can slowly detect the ink consumption condition.

The curve X shown in FIG. 3A shows the relationship between the ink amount, ink, and resonance frequency fs of the vibration part in the ink tank when the cavity 162 of the actuator 106 is made sufficiently shallow or the vibration area of the actuator 106 is made sufficiently large or long. The situation that the ink amount in the ink tank slowly reduces and the ink and resonance frequency fs of the vibration part change slowly can be understood.

More in detail, a case that the process of slow consumption of ink can be detected is a case that a liquid and a gas different in density from each other coexist around the vibration area of the actuator 106 and are related to vibration. As ink is consumed slowly, with the media relating to vibration around the vibration area of the actuator 106, the liquid reduces, while the gas increases. For example, when the actuator 106 is arranged horizontally with the ink level and t ink is smaller than t ink-max, the media relating to vibration of the actuator 106 include both ink and gas. Therefore, assuming the area of the vibration area of the actuator 106 as S, when the condition less than M' max in Formula 4 is expressed by the additional masses of ink and gas, the following formula is obtained.

$$M'=M'\text{air}+M'\text{ink}=\rho\text{air}*t\text{air}/S+\rho\text{ink}*t\text{ink}/S \qquad \text{Formula 8,}$$

where M' air indicates inertance of air and M' ink indicates inertance of ink. ρ air indicates air density and ρ ink indicates ink density. t air indicates the thickness of air relating to vibration and t ink indicates the thickness of ink relating to vibration. Among the media relating to vibration around the vibration area of the actuator 106, as the liquid reduces and the gas increases, when the actuator 106 is arranged almost horizontally with the ink level, t air increases and t ink decreases. Thereby, M' var reduces slowly and the resonance frequency increases slowly. Therefore, the ink amount remaining in the ink tank or the ink consumption amount can be detected. The reason that Formula 7 is a formula of only the liquid density is that a case that the air density is so small as to be ignored for the liquid density is supposed.

When the actuator 106 is arranged almost perpendicularly to the ink level, among the vibration area of the actuator 106, an equivalent circuit (not shown in the drawing) parallel with the region where the medium relating to vibration of the actuator 106 is only ink and the region where the medium relating to vibration of the actuator 106 is gas is considered. Assuming the area of the region where the medium relating to vibration of the actuator 106 is only ink as S ink and the area of the region where the medium relating to vibration of the actuator 106 is only gas as S air, the following formula is obtained.

$$1/M'=1/M'\text{air}+1/M'\text{ink}=S\text{air}/(\rho\text{air}*t\text{air})+S\text{ink}/(\rho\text{ink}*t\text{ink}) \qquad \text{Formula 9}$$

Formula 9 is applied when no ink is held in the cavity of the actuator 106. When ink is held in the cavity of the actuator 106, Formulas 7, 8, and 9 are used for calculation.

The vibration of the actuator is changed from the depth of t ink-max to the depth of remaining of ink. Therefore, when the actuator is arranged on the bottom so that the ink residual depth is slightly smaller than t ink-max, the process that ink slowly reduces cannot be detected. From vibration changes of the actuator in slight changes in the ink amount from t ink-max to the residual depth, it is detected that the ink amount is changed. When the actuator is arranged on the side and the diameter of the opening (cavity) is small, the vibration change of the actuator passing through the opening is very little, so that it is difficult to detect the ink amount in the passing process. For example, the curve Y shown in FIG. 3A shows the relationship between the ink amount, ink, and resonance frequency fs of the vibration part in the ink tank in a small circular vibration area. The situation that the ink and resonance frequency fs of the vibration part change strongly between the ink amounts Q before and after the ink level in the ink tank passes the mounting position of the actuator is indicated. From this, whether a predetermined amount of ink remains in the ink tank can be detected.

Figure 3B:
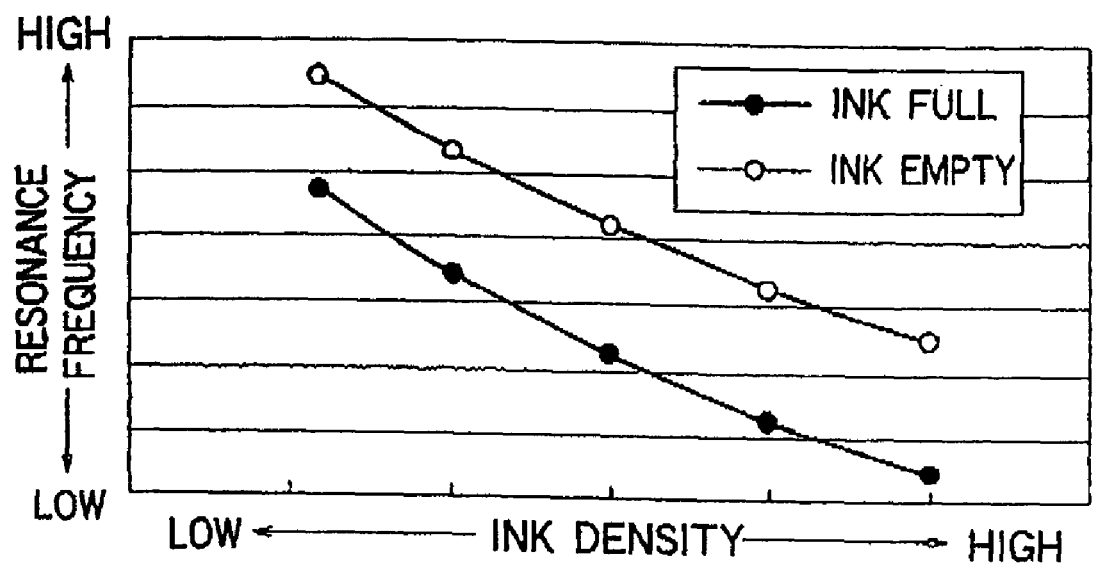

FIG. 3B shows the relationship between the ink density, ink, and resonance frequency fs of the vibration part in the curve Y shown in FIG. 3A. As shown in FIG. 3B, as the ink density increases, the additional inertance increases, so that the resonance frequency fs reduces. Namely, the resonance frequency fs varies with the ink kind. Therefore, when the resonance frequency fs is measured, at the time of recharging of ink, whether ink having different density is mixed in can be ascertained. Namely, an ink tank for containing a different kind of ink can be discriminated.

Next, the condition for precisely detecting the liquid condition when the size and form of the cavity are set so that a liquid remains in the cavity 162 of the actuator 106 even when the liquid container contains no liquid will be described in detail. If the actuator 106 can detect the liquid condition when the cavity 162 is full of liquid, it can detect the liquid condition even when the cavity 162 is not full of liquid.

The resonance frequency fs is a function of inertance M. The inertance M is the sum of inertance Mact of the vibration part and the additional inertance M'. The inertance M' is related to the liquid condition. The inertance M' is a quantity showing that the mass of the vibration part is apparently increased by the action of a medium existing in the neighborhood of the vibration part. Namely, it means an increase in the mass of the vibration part by apparently absorbing the medium by vibration of the vibration part.

Therefore, when M' cav is larger than M' max shown in Formula 4, the medium apparently absorbing is all a liquid remaining in the cavity 162. Therefore, it is the same condition as that when the liquid container is full of liquid. In this case, M' does not change, so that the resonance frequency fs neither changes. Namely, the medium relating to vibration does not become smaller than M' max, so that, even if ink is consumed, changes cannot be detected. Therefore, the actuator 106 cannot detect the liquid condition in the liquid container.

On the other hand, when M' cav is smaller than M' max shown in Formula 4, the medium apparently absorbing is a liquid remaining in the cavity 162 and gas or a vacuum in the liquid container. In this case, M' changes unlike the condition that the liquid container is full of liquid, so that the resonance frequency fs changes. Therefore, the actuator 106 can detect the liquid condition in the liquid container.

Namely, when the liquid container contains no liquid and a liquid remains in the cavity 162 of the actuator 106, the condition under which the actuator 106 can precisely detect the liquid condition is that M' cav is smaller than M' max. The condition M' max>M' cav under which the actuator 106 can precisely detect the liquid condition is independent of the shape of the cavity 162.

M' cav indicates mass inertance of a liquid in almost the same volume as that of the cavity 162. Therefore, from the inequality M' max>M' cav, the condition under which the actuator 106 can precisely detect the liquid condition can be expressed as a condition of the volume of the cavity 162. For example, assuming the radius of the opening 161 of the circular cavity 162 as a and the depth of the cavity 162 as d, the following formula is held:

$$M'max > \rho * d/\pi a^2 \quad \text{Formula 10.}$$

When Formula 10 is expanded, the following condition is obtained:

$$a/d > 3*\pi/8 \quad \text{Formula 11}$$

Formulas 10 and 11 are held only when the shape of the cavity 162 is circular. When the formula of M' max when the cavity 162 is not circular is used and $\pi a^2$ in Formula 10 is substituted for the area thereof, the relationship of the width and length of the cavity with the depth thereof can be derived.

Therefore, when the cavity 162 of the actuator 106 has the diameter a of the opening 161 and the depth d of the cavity 162 which satisfy Formula 11, even if the liquid container contains no liquid and a liquid remains in the cavity 162, the actuator 106 can detect the liquid condition free of malfunctions.

The additional inertance M' affects the acoustic impedance characteristic, so that it may be said that the method for measuring counter electromotive force generated in the actuator 106 by the residual vibration detects at least changes in the acoustic impedance.

According to this embodiment, the actuator 106 generates vibration and then counter electromotive force generated in the actuator 106 by the residual vibration is measured. However, it is not always necessary that the vibration part of the actuator 106 gives vibration to a liquid by its own vibration by a drive signal. Namely, even if the vibration part itself does not vibrate, it vibrates together with a liquid in contact with it within a certain range, thereby the piezo-electric layer 160 is bent and deformed. This residual vibration generates counter electromotive force in the piezo-electric layer 160 and transfers the counter electromotive force to the upper electrode 164 and the lower electrode 166. The liquid condition may be detected using this phenomenon. For example, in an ink jet recording apparatus, using vibration of the periphery of the vibration part of the actuator generated by vibration by the reciprocating motion of the carriage by scanning of a print head during printing, the condition of the ink tank or the ink condition therein may be detected.

Figure 4A:
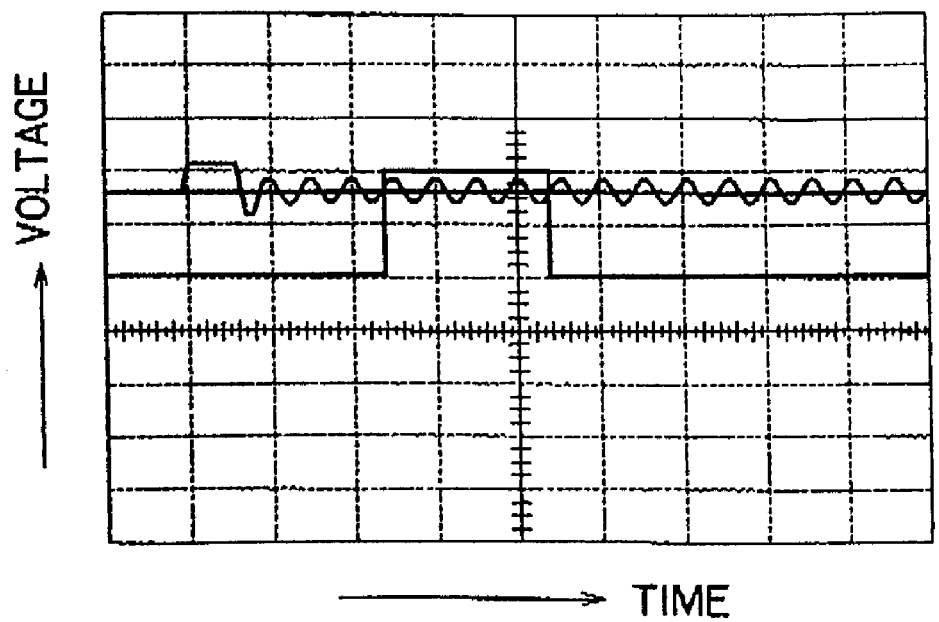
FIGS. 4A and 4B are drawings showing the counter electromotive force waveform of the actuator 106.
Figure 4B:
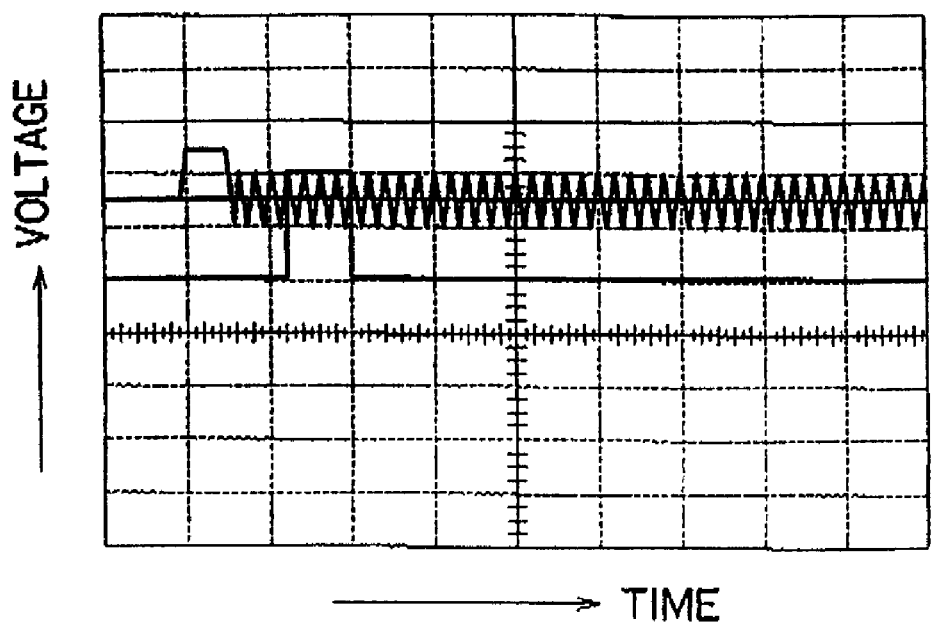

FIGS. 4A and 4B show a measuring method for the waveform of residual vibration of the actuator 106 and the residual vibration after vibrating the actuator 106. The vertical position of the ink level for the mounting position level of the actuator 106 in the ink cartridge can be detected by changes in the frequency of the residual vibration after the actuator 106 vibrates or changes in the amplitude. In FIGS. 4A and 4B, the ordinate axis indicates voltage of counter electromotive force generated by residual vibration of the actuator 106 and the transverse axis indicates time. By the residual vibration of the actuator 106, as shown in FIGS. 4A and 4B, the waveform of an analog signal of voltage is generated. Next, the analog signal is converted to a digital value corresponding to the signal frequency.

In the examples shown in FIGS. 4A and 4B, by measuring the time required to generate four pulses from the fourth pulse of the analog signal to the eighth pulse, the existence of ink can be detected.

More in detail, after vibration of the actuator 106, the count of crossing a predetermined reference voltage from the low voltage side to the high voltage side is counted. A digital signal is made high between the 4th count and the 8th count and the time from the 4th count to the 8th count is measured by a predetermined clock pulse.

FIG. 4A shows the waveform when the ink level is positioned above the mounting position level of the actuator 106. On the other hand, FIG. 4B shows the waveform when there is no ink on the mounting position level of the actuator 106. The comparison of FIG. 4A with FIG. 4B shows that the time from the 4th count to the 8th count in FIG. 4A is longer than that in FIG. 4B. In other words, the time from the 4th count to the 8th count varies with the existence of ink. By use of the difference in time, the consumption condition of ink can be detected. Starting to count from the 4th count of the analog wave form means starting measurement after stabilization of vibration of the actuator 106. Starting from the 4th count is just an example and the time may be counted from any count. In this case, a signal from the 4th count to the 8th count is detected and the time from the 4th count to the 8th count is measured by a predetermined clock pulse. Thereby, the resonance frequency is obtained. It is preferable that the clock pulse is a clock pulse equal to the clock for controlling a semiconductor storage device attached to the ink cartridge. There is no need to measure the time up to the 8th count and the time up to any count may be measured. In FIGS. 4A and 4B, the time from the 4th count to the 8th count is measured. However, according to the circuit constitution for detecting the frequency, the time within a different time range may be detected.

For example, when the quality of ink is stabilized and the peak of the amplitude varies little, to increase the detection speed, the time from the 4th count to the sixth count is detected, thereby the resonance frequency may be obtained. Or, when the quality of ink is unstable and the pulse amplitude varies greatly, to precisely detect the residual vibration, the time from the 4th count to the 12th count may be detected.

Further, in another embodiment, the wave-number of the voltage waveform of counter electromotive force within a predetermined period may be counted (not shown in the drawing). Also by this method, the resonance frequency can be determined.

More in detail, after vibration of the actuator 106, a digital signal is made high for a predetermined period and the count of crossing a predetermined reference voltage from the low voltage side to the high voltage side is counted. By measuring the count, the existence of ink can be detected.

Furthermore, the comparison of FIG. 4A with FIG. 4B shows that the amplitude of the counter electromotive force waveform is different between a case that the ink cartridge is full of ink and a case that the ink cartridge contains no ink. Therefore, by measuring the amplitude of the counter electromotive force waveform without obtaining the resonance frequency, the consumption condition of ink in the ink cartridge may be detected. More in detail, for example, a reference voltage is set between the peak of the counter electromotive force waveform shown in FIG. 4A and the peak of the counter electromotive force waveform shown in FIG. 4B. When the actuator 106 vibrates, and then a digital signal is made high at a predetermined time, and the counter electromotive force waveform crosses the reference voltage, the actuator 106 judges that there is no ink. When the counter electromotive force waveform does not cross the reference voltage, the actuator 106 judges that there is ink.

The above is the explanation of the "actuator" which is an example of a piezo-electric device and the detection art of the ink consumption condition using it. Next, an embodiment of the mounting structure of the present invention will be explained.

Figure 5:
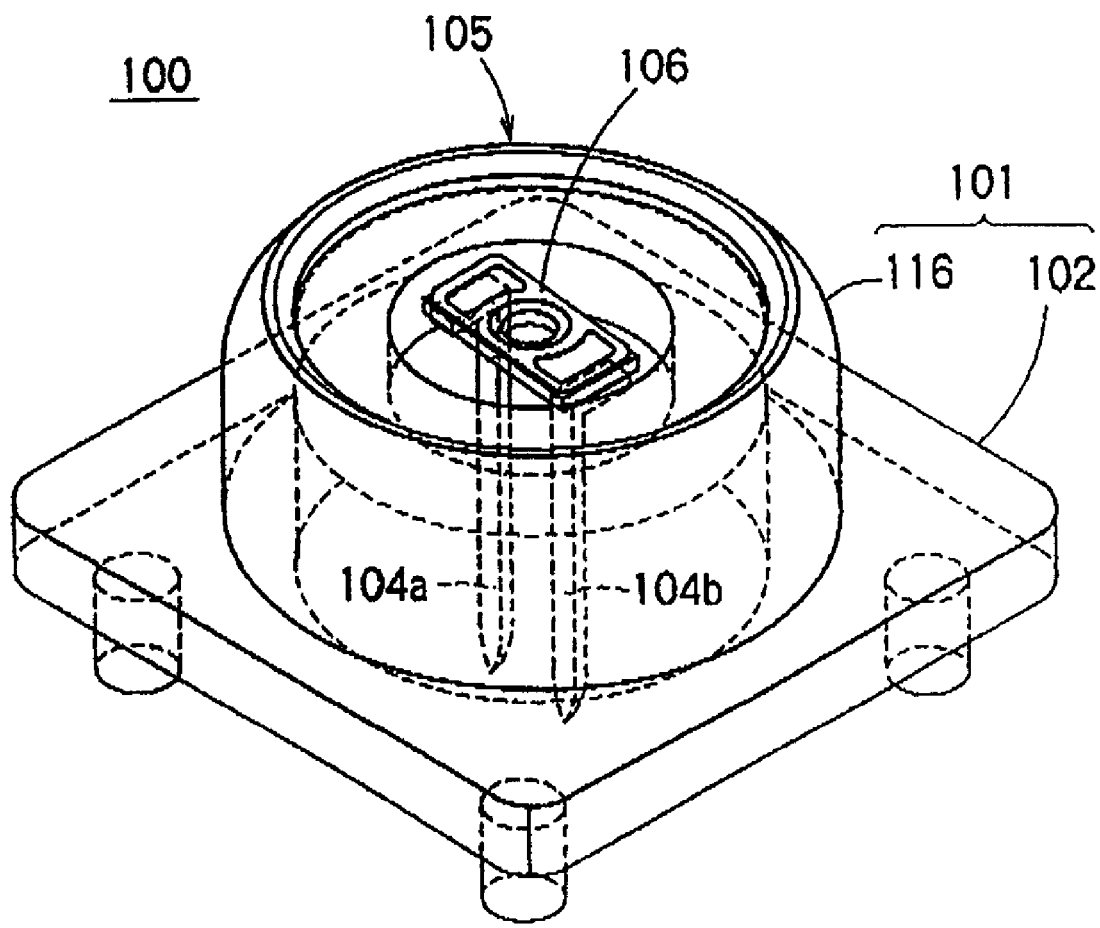
FIG. 5 is a perspective view showing the module 100.

FIG. 5 is a perspective view showing the constitution that the actuator 106 is formed integrally as a module 100. The module 100 is mounted at a predetermined location of a container (container body) 1 of the ink cartridge shown in FIG. 10. The module 100 is structured so as to detect at least changes in the acoustic impedance in an ink solution, thereby detect the consumption condition of the liquid in the container 1. The module 100 of this embodiment has a mount portion 101 for mounting the actuator 106 to the container 1. The mount portion 101 is structured so as to mount a column 116 containing the actuator 106 vibrated by a drive signal on a substrate 102 having an almost rectangular surface. When the module 100 is mounted on the ink cartridge, the actuator 106 of the module 100 is disposed so as not to be touched from outside, so that the actuator 106 can be protected from external touch. The edge of the column 116 on the top side is rounded, so that it can be easily fit at the time of mounting into the through hole formed in the ink cartridge.

When the outer periphery of the mounting structure is formed so as to have a sealing structure like an elastic member, it can be appropriately held liquid-tightly with the container. In this drawing, the mounting structure has the substrate 102 and the column 116. However, the shape of the mounting structure is not limited to it. For example, it may be a cylindrical structure that the side of the column 116 is extended.

Figure 6:
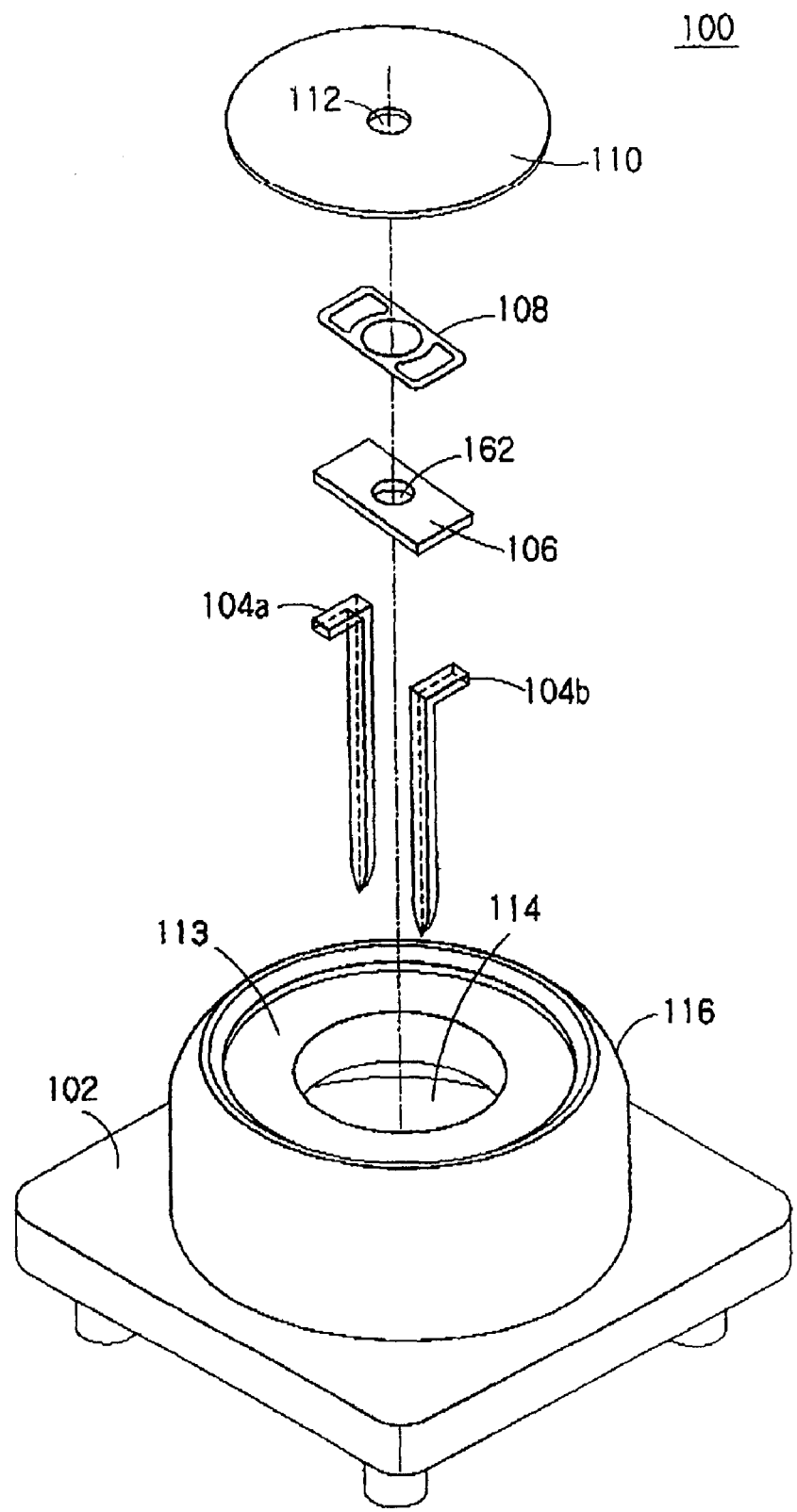
FIG. 6 is an exploded view showing the constitution of the module 100 shown in FIG. 5.

FIG. 6 is an exploded view showing the constitution of the module 100 shown in FIG. 5. The module 100 includes the mount portion 101 made of resin, a plate 110, and a receiving portion 105 having a concavity 113. Furthermore, the module 100 has lead wires 104a and 104b, the actuator 106, and a film 108. It is preferable that the plate 110 is formed from a rust-proof material such as stainless steel or stainless steel alloy. In the column 116 and the substrate 102 included in the mount portion 101, an opening 114 is formed at the center thereof so as to house the lead wires 104a and 104b and the concavity 113 is formed so as to house the actuator 106, the film 108, and the plate 110. The actuator 106 is joined to the plate 110 via the film 108 and the plate 110 and the actuator 106 are fixed to the mount portion 101. Therefore, the lead wires 104a and 104b, the actuator 106, the film 108, and the plate 110 are attached integrally to the mount portion 101.

The lead wires 104a and 104b are respectively joined to the upper electrode and lower electrode of the actuator 106, transfer a drive signal to the piezo-electric layer, and transfer a signal of resonance frequency detected by the actuator 106 to the recording apparatus. The actuator 106 vibrates temporarily on the basis of a drive signal transferred from the lead wires 104a and 104b. After vibration, the actuator 106 executes residual vibration and generates counter electromotive force by the vibration. At this time, by detecting the vibration cycle of the counter electromotive force waveform, the resonance frequency corresponding to the consumption condition of liquid in the liquid container can be detected. The film 108 bonds the actuator 106 to the plate 110 so as to make the actuator liquid-tight. It is preferable to form the film 108 by polyolefin and bond by thermal fusion.

Preferably, the lead wires 104a, 104b are formed by conductive members of relatively high rigidity so that the actuator (piezo-electric device) 106 is supported by the lead wires 104a, 104b.

The plate 110 is circular and the opening 114 of the substrate 102 is formed cylindrically. The actuator 106 and the film 108 are formed rectangularly. The lead wires 104, the actuator 106, the film 108, and the plate 110 may be attached to the substrate 102 in a removable state. The substrate 102, the lead wires 104, the actuator 106, the film 108, and the plate 110 are arranged symmetrically about the central axis of the module 100. Further, the centers of the substrate 102, the actuator 106, the film 108, and the plate 110 are arranged almost on the central axis of the module 100.

The area of the opening 114 of the substrate 102 is formed larger than the area of the vibration area of the actuator 106. At the position, which is the center of the plate 110, facing the vibration part of the actuator 106, a through hole 112 is formed. As shown in FIGS. 1A to 2, the cavity 162 is formed in the actuator 106 and the through hole 112 and the cavity 162 form an ink reservoir respectively. It is preferable that the thickness of the plate 110 is smaller than the diameter of the through hole 112 so as to reduce the effect of residual ink. For example, it is preferable that the depth of the through hole is equal to or less than ⅓ of the diameter thereof. The through hole 112 is in an almost circular shape symmetrical about the central axis of the module 100. The area of the through hole 112 is larger than the area of the opening of the cavity 162. The periphery of the section of the through hole 112 may be tapered or stepped. The module 100 is mounted to the side, top, or bottom of the container 1 so that the through hole 112 is directed inward the container 1. When ink is consumed and ink around the actuator 106 is exhausted, the resonance frequency of the actuator 106 is changed greatly, so that changes in the ink level can be detected.

Figure 7:
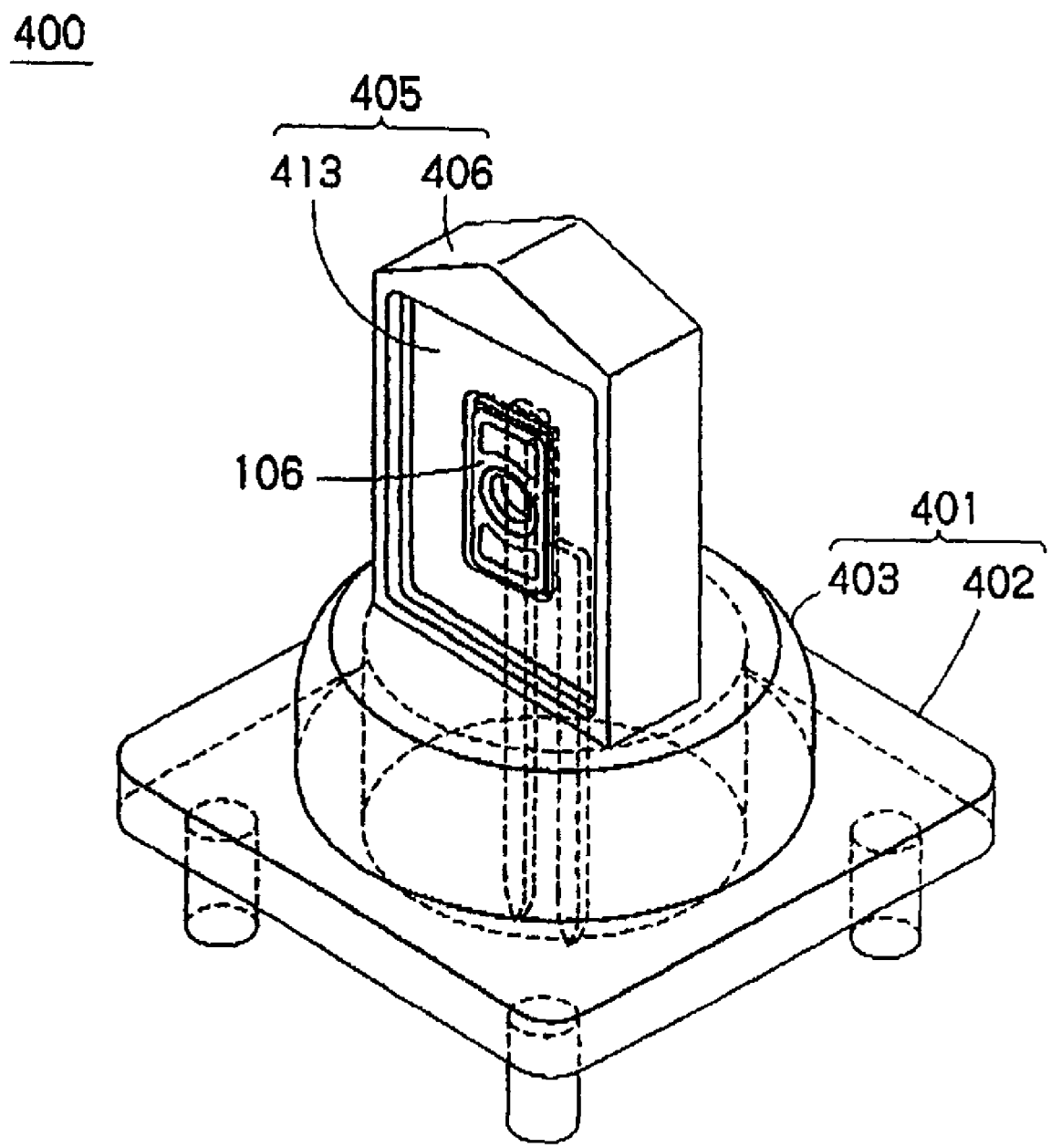
FIG. 7 is a perspective view showing another embodiment of the module.

FIG. 7 is a perspective view showing another embodiment of the module. In the module 400 of this embodiment, a receiving portion 405 is formed on a mount portion 401. In the mount portion 401, a cylindrical column 403 is formed on a substrate 402 having an almost square surface with round corners. Further, the receiving portion 405 includes a plate element 406 erected on the column 403 and a concavity 413. In the concavity 413 formed on the side of the plate element 406, the actuator 106 is arranged. The end of the plate element 406 is chamfered at a predetermined angle so as to be easily fit at the time of mounting in the through hole formed in the ink cartridge.

Figure 8:
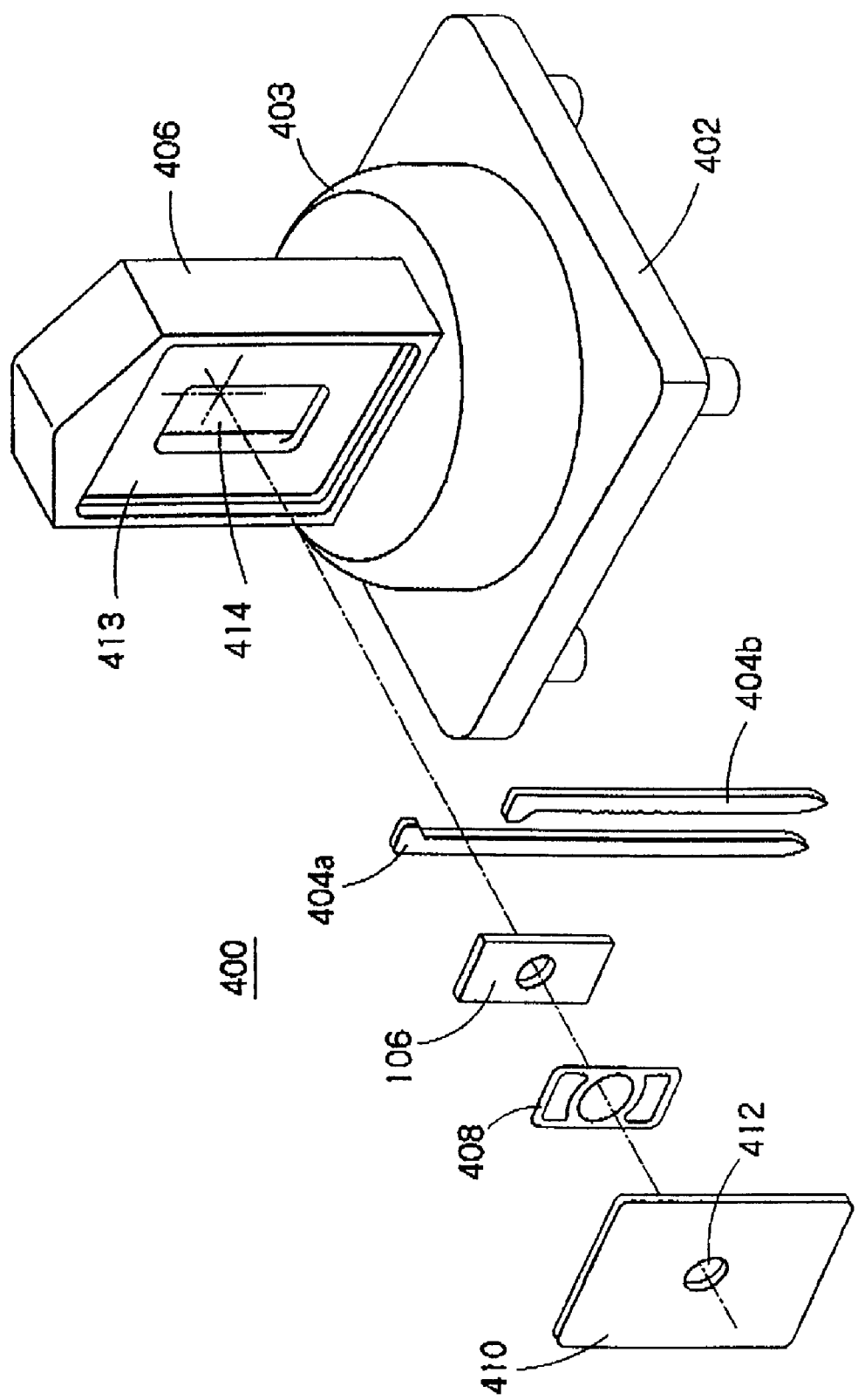
FIG. 8 is an exploded view showing the constitution of the module shown in FIG. 7.

FIG. 8 is an exploded perspective view showing the constitution of the module 400 shown in FIG. 7. In the same way as with the module 100 shown in FIG. 5, the module 400 includes the mount portion 401 and the receiving portion 405. The mount portion 401 has the substrate 402 and the column 403 and the receiving portion 405 has the plate element 406 and the concavity 413. The actuator 106 is joined to a plate 410 and fixed to the concavity 413. The module 400 additionally has lead wires 404a and 404b, the actuator 106, and a film 408.

Preferably, the lead wires 404a, 404b are formed by conductive members of relatively high rigidity so that the actuator (piezo-electric device) 106 is supported by the lead wires 404a, 404b.

According to this embodiment, the plate 410 is rectangular and an opening 414 formed in the plate element 406 is rectangular. The lead wires 404a and 404b, the actuator 106, the film 408, and the plate 410 may be attached to the substrate 402 in a removable state. The actuator 106, the film 408, and the plate 410 pass the center of the opening 414 and are arranged symmetrically about the central axis extending perpendicularly to the surface of the opening 414. Further, the centers of the actuator 406, the film 408, and the plate 410 are arranged almost on the central axis of the opening 414.

The area of a through hole 412 formed at the center of the plate 410 is larger than the area of the opening of the cavity 162 of the actuator 106. The cavity 162 of the actuator 106 and the through hole 412 form an ink reservoir respectively. It is preferable that the thickness of the plate 410 is smaller than the diameter of the through hole 412 and for example, set to ⅓ or less of the diameter of the through hole 412. The through hole 412 is an almost circle symmetrical about the central axis of the module 400. The periphery of the section of the through hole 412 may be tapered or stepped. The module 400 can be mounted to the bottom of the container 1 so that the through hole 412 is arranged in the container 1. The actuator 106 is arranged in the container 1 so as to extend in the perpendicular direction, so that by changing the height of the substrate 402 and changing the height of the actuator 106 when it is arranged in the container 1, the setting of the point of time of ink end can be changed.

Figure 9A:
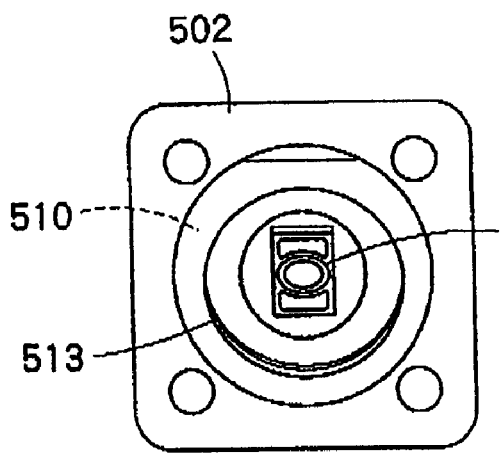
FIGS. 9A to 9C show still another embodiment of the module.
Figure 9C:
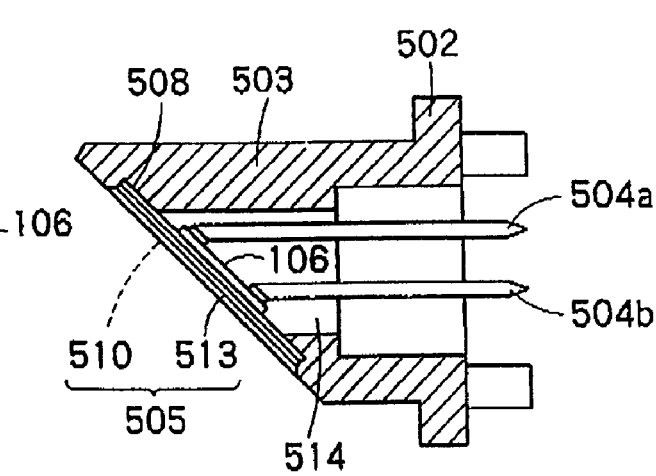
Figure 9B:
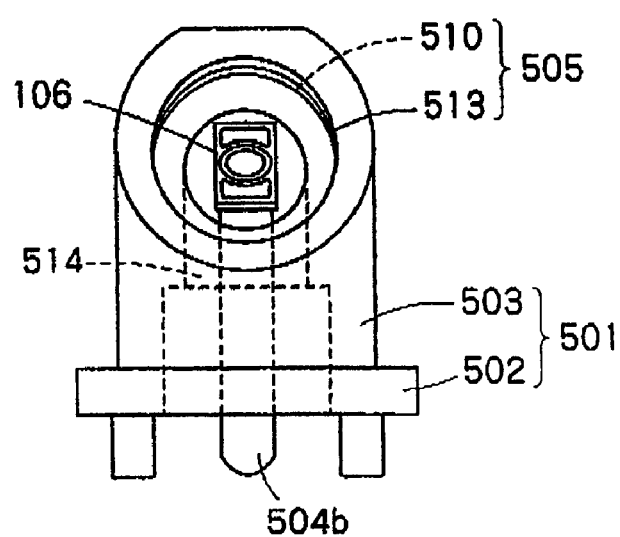

FIGS. 9A to 9C show still another embodiment of the module. In the same way as with the module 100 shown in FIG. 5, a module 500 shown in FIGS. 9A to 9C includes a mount portion 501 having a substrate 502 and a column 503. The module 500 additionally has lead wires 504a and 504b, the actuator 106, a film 508, and a plate 510. In the substrate 502 included in the mount portion 501, an opening 514 is formed at the center so as to house the lead wires 504a and 504b and a concavity 513 is formed so as to house the actuator 106, the film 508, and the plate 510. The actuator 106 is fixed to a receiving portion 505 via the plate 510. Therefore, the lead wires 504a and 504b, the actuator 106, the film 508, and the plate 510 are integrally attached to the mount portion 501. In the module 500 of this embodiment, the column 503 having a top inclined vertically is formed on the substrate having an almost square surface with round corners. The actuator 106 is arranged on the concavity 513 which is installed on the top of the column 503 slantwise in the vertical direction.

Preferably, the lead wires 504a, 504b are formed by conductive members of relatively high rigidity so that the actuator (piezo-electric device) 106 is supported by the lead wires 504a, 504b.

The end of the module 500 is inclined and the actuator 106 is mounted on the inclined surface thereof. Therefore, when the module 500 is mounted on the bottom or side of the container 1, the actuator 106 is inclined against the vertical direction of the container 1. It is desirable to set the inclination angle of the end of the module 500 between about 30° and 60° from the viewpoint of the detection capacity.

The module 500 is mounted on the bottom or side of the container 1 so that the actuator 106 is arranged in the container 1. When the module 500 is mounted on the side of the container 1, the actuator 106 is attached to the container 1 so that it is directed toward the top side, bottom side, or side of the container 1 in an inclined state. On the other hand, when the module 500 is mounted on the bottom of the container 1, it is preferable that the actuator 106 is attached to the container 1 so that it is directed toward the ink feed port side of the container 1 in an inclined state.

Since the actuator 106 is mounted on the inclined surface of the inclined cylindrical end, the diameter of the column can be made smaller than that of the module 100 shown in FIG. 5. Namely, the module can be made thin, so that it is also suited to mounting of an ink container having a narrow mounting place of the module. Furthermore, the diameter of the hole of the module mounting part of the ink container can be made smaller. Therefore, an ink leak can be reduced.

Figure 10:
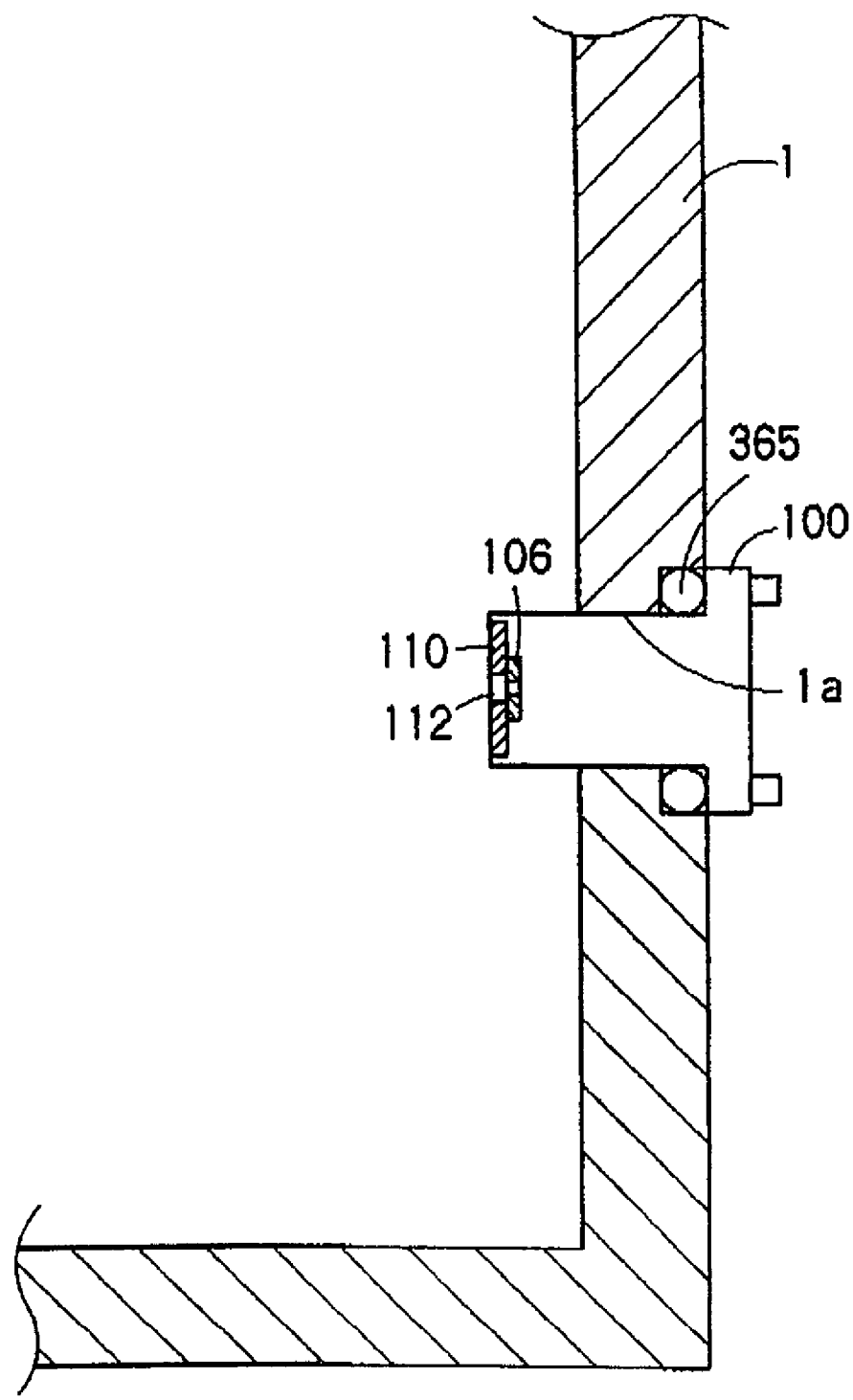
FIG. 10 is a drawing showing an example of the cross section when the module 100 shown in FIG. 5 is mounted to the ink container 1.

FIG. 10 is a cross sectional view of the neighborhood of the bottom of the ink container when the module 100 shown in FIG. 5 is mounted to a through hole 1a of the container 1. The module 100 is mounted so as to pass through the side wall of the container 1. At the junction between the side wall of the container 1 and the module 100, an O-ring 365 is provided so as to keep the module 100 and the container 1 liquid-tight. It is preferable that the module 100 has a column as explained in FIG. 5 so as to seal it by the O-ring 365. When the end of the module 100 is inserted into the container 1, ink in the container 1 comes in contact with the actuator 106 via the through hole 112 of the plate 110. The resonance frequency of residual vibration of the actuator 106 varies with whether the medium around the vibration part of the actuator 106 is a liquid or a gas, so that the consumption condition of ink can be detected using the module 100. In addition to the module 100, the module 400 shown in FIG. 7, the module 500 shown in FIGS. 9A to 9C, or modules 700A and 700B and a molded structure 600 which will be shown in FIGS. 11A to 11C next may be mounted in the container 1 and the existence of ink may be detected.

By use of the module 100 mentioned above, it can be removed from the container 1. Therefore, the actuator 106 can be appropriately attached to or removed from the container 1. By doing this, the actuator 106 can be easily recycled.

Figure 11:
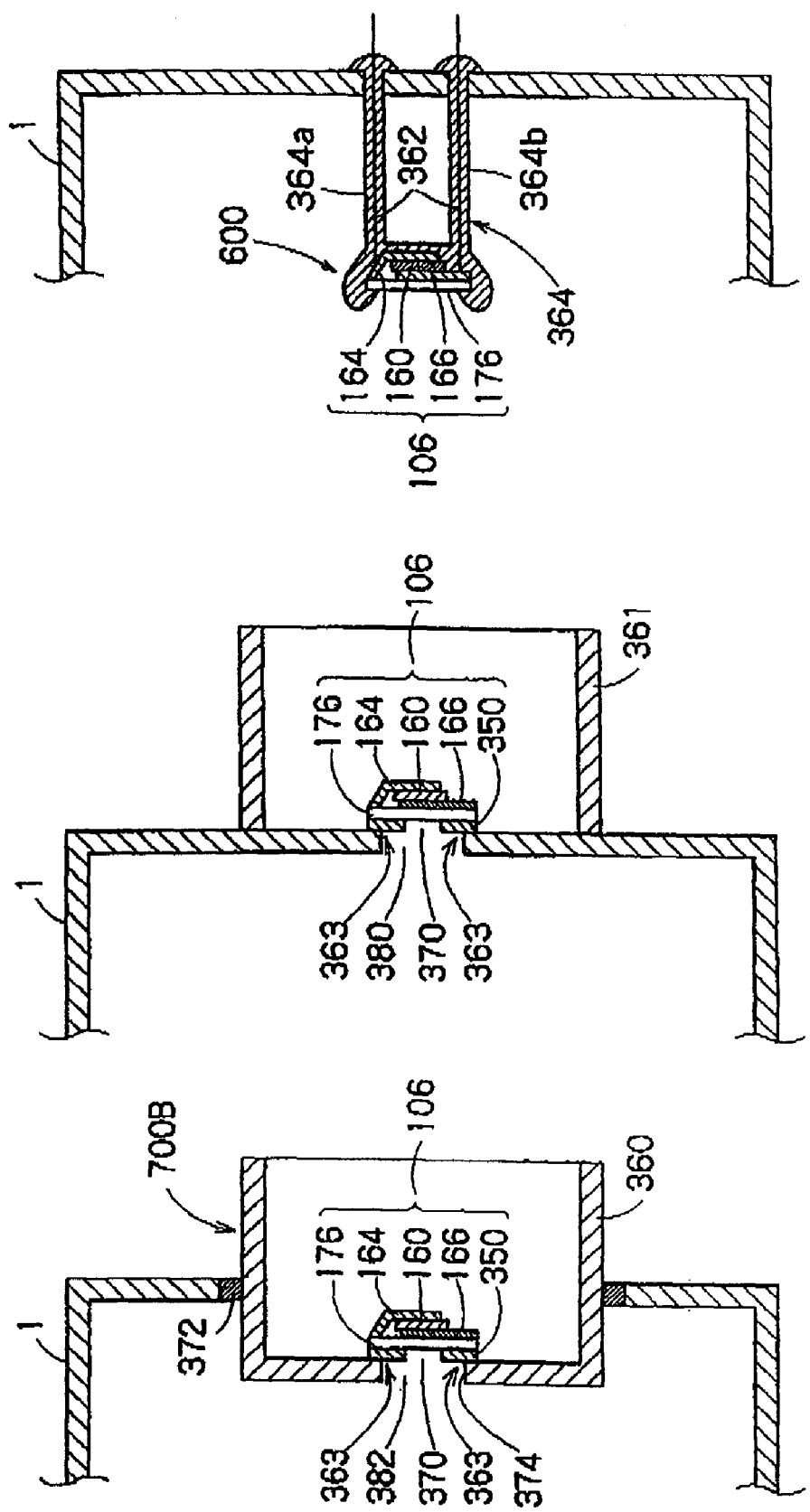
FIGS. 11A, 11B and 11C are other embodiments of the module.

FIG. 11A shows a cross sectional view of the ink container when the module 700B is mounted in the container 1. In this embodiment, the module 700B is used as one of the mounting structures. The module 700B is mounted to the container 1 so that a mount portion 360 is projected into the container 1. A through hole 370 is formed in a mounting plate 350 and the through hole 370 and the vibration part of the actuator 106 are opposite to each other. Further, a hole 382 is formed in the bottom wall of the module 700B and a receiving portion 363 is formed. The actuator 106 is arranged so as to block one end of the hole 382. Therefore, ink is in contact with the vibrating plate 176 via the hole 382 of the receiving portion 363 and the through hole 370 of the mounting plate 350. The hole 382 of the receiving portion 363 and the through hole 370 of the mounting plate 350 form a ink reservoir respectively. The receiving portion 363 and the actuator 106 are fixed by the mounting plate 350 and film member. At the connection of the mount portion 360 and the container 1, a sealing structure 372 is installed. The sealing structure 372 may be formed by a plastic material such as synthetic resin or formed by an O-ring. Furthermore, a molding part for sealing the connection of the receiving portion 363 and the actuator 106 may be provided. The module 700B and the container 1 shown in FIG. 11A are formed independently with each other. However, as shown in FIG. 11B, the receiving portion of the module 700B may be composed of a part of the container 1.

The module 700B shown in FIG. 11A does not require embedding of the lead wires shown in FIGS. 5 to 9C into the module. As a result, the molding step is simplified. Further, the module 700B can be exchanged and recycled.

If ink adheres to the top or side of the container 1 when the ink cartridge vibrates and ink dropping from the top or side of the container 1 comes in contact with the actuator 106, the actuator 106 may malfunction. However, in the module 700B, since the mount portion 360 is projected in to the container 1, the actuator 106 will not malfunction due to ink dropping from the top or side of the container 1.

According to the embodiment shown in FIG. 11A, the vibrating plate 176 and a part of the mounting plate 350 are mounted in the container 1 so that they alone come in contact with ink in the container 1. By the insulating part composed of the vibrating plate 176 and the mounting plate 350 like this, the piezo-electric element can be insulated from liquid in the container 1. Since the actuator 106 is fixed by the mounting plate 350, only the vibration part of the vibrating plate 176 can be vibrated appropriately.

According to the embodiment shown in FIG. 11A, embedding of the electrodes of the lead wires 104a, 104b, 404a, 404b, 504a, and 504b shown in FIGS. 5 to 9C into the module is not required. As a result, the molding step is simplified. Further, the module 700B can be exchanged and recycled.

FIG. 11B shows a cross sectional view of an ink container of an embodiment when the actuator 106 is mounted in the container 1. In the ink cartridge of the embodiment shown in FIG. 11B, a protective member 361 is attached to the container 1 separately from the actuator 106. Therefore, the protective member 361 and the actuator 106 are not integrated as a module. The protective member 361 can protect the actuator 106 from touching by user's hand. A hole 380 formed on the front of the actuator 106 is arranged in the side wall of the container 1. The actuator 106 includes the piezo-electric layer 160, the upper electrode 164, the lower electrode 166, the vibrating plate 176, and the mounting plate 350. The vibrating plate 176 is formed on the top of the mounting plate 350 and the lower electrode 166 is formed on the top of the vibrating plate 176. The piezo-electric layer 160 is formed on the top of the lower electrode 166 and the upper electrode 164 is formed on the top of the piezo-electric layer 160. Therefore, the main part of the piezo-electric layer 160 is formed so as to be held by the main part of the upper electrode 164 and the main part of the lower electrode 166. The circular parts, which are the respective main parts of the piezo-electric layer 160, the upper electrode 164, and the lower electrode 166, form a piezo-electric element. The piezo-electric element is formed on the vibrating plate 176. The piezo-electric element and the vibration part of the vibrating plate 176 are the vibration part where the actuator actually vibrates. The through hole 370 is formed in the mounting plate 350. Further, the through hole 380 is formed in the side wall of the container 1. Therefore, ink is in contact with the vibrating plate 176 via the hole 380 of the container 1 and the through hole 370 of the mounting plate 350. The hole 380 of the container 1 and the through hole 370 of the mounting plate 350 form an ink reservoir respectively. According to the embodiment shown in FIG. 11B, the actuator 106 is protected by the protective member 361, so that the actuator 106 is protected from contact with the outside.

The actuator 106 and the mounting plate 350 shown in the examples in FIGS. 11A and 11B can be replaced with the actuator 106 having the substrate 178 shown in FIGS. 1A to 1B.

FIG. 11C shows an embodiment having the molded structure 600 including the actuator 106. This embodiment uses the molded structure 600 as a mounting structure. The molded structure 600 has the actuator 106 and a molding part 364. The actuator 106 and the molding part 364 are integrally formed. The molding part 364 is formed with a plastic material such as silicone resin. The molding part 364 has a lead wire 362 inside. The molding part 364 is formed so as to have two legs 364a, 364b extended from the actuator 106. To fix the molding part 364 and the container 1 liquid-tightly, the ends of the two legs of the molding part 364 are formed semispherically. The molding part 364 is mounted to the container 1 so that the actuator 106 is projected into the container 1 and the vibration part of the actuator 106 comes in contact with ink in the container 1. The upper electrode 164, the piezo-electric layer 160, and the lower electrode 166 of the actuator 106 are protected from ink by the molding part 364.

The molded structure 600 shown in FIG. 11C does require the sealing structure 372 between the molding part 364 and the container 1, so that ink hardly leaks from the container 1. Further, the molded structure 600 is not projected outward from the container 1, the actuator 106 is protected from contact with the outside. When the ink cartridge vibrates, ink is adhered to the top or side of the container 1 and ink dropping from the top or side of the container 1 touches the actuator 106, thereby the actuator 106 may malfunction. In the molded structure 600, the molding part 364 is projected into the container 1, so that the actuator 106 will not malfunction by ink dropping from the top or side of the container 1.

Figure 12:
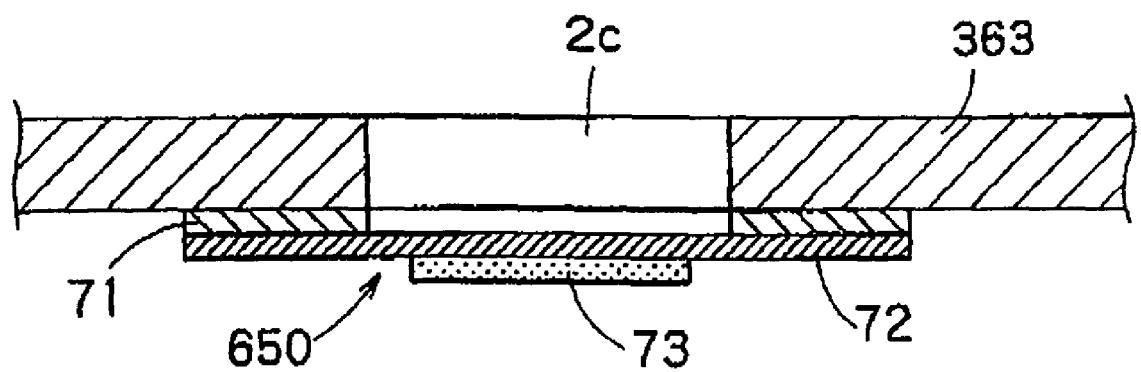
FIG. 12 is a drawing showing an example of the cross section of the opening of the mounting structure shown in FIGS. 11A to 11C.

FIG. 12 shows an enlarged view of the opening of the mounting structure of this embodiment. More concretely, it is an example of an enlarged view of the opening of the mounting structure shown in FIGS. 11A and 11B. A through hole 2c is formed in the receiving portion 363. An actuator 650 has a vibrating plate 72 and a piezo-electric element 73 fixed to the vibrating plate 72. The actuator 650 is fixed to the receiving portion 363 so that the piezo-electric element 73 is opposite to the through hole 2c via the vibrating plate 72 and a substrate 71. The vibrating plate 72 can be elastically deformed and is ink-resistant. The diameter of the plate 71 is not limited to this drawing. The mounting structure may be composed of a part of the wall of the container 1 as shown in FIG. 11B, so that the through hole may be formed in the wall of the container 1.

The amplitude and frequency of counter electromotive force generated by the residual vibration of the piezo-electric element 73 and the vibrating plate 72 are changed depending on the ink amount in the container 1. The through hole 2c is formed in the position opposite to the actuator 650 and a minimum fixed amount of ink is reserved in the through hole 2c. Therefore, when the vibration characteristic of the actuator 650 defined by the ink amount reserved in the through hole 2c is measured beforehand, the ink end of the container 1 can be detected surely.

Figure 13A:
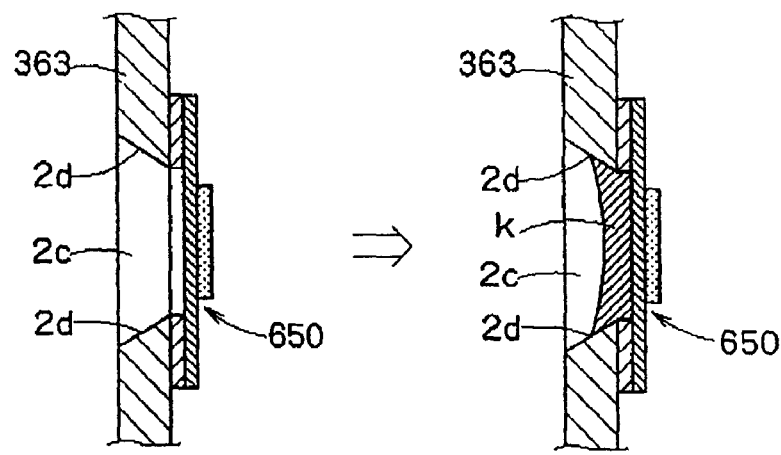
FIGS. 13A, 13B and 13C are drawings showing other embodiments of the through hole 2c.
Figure 13B:
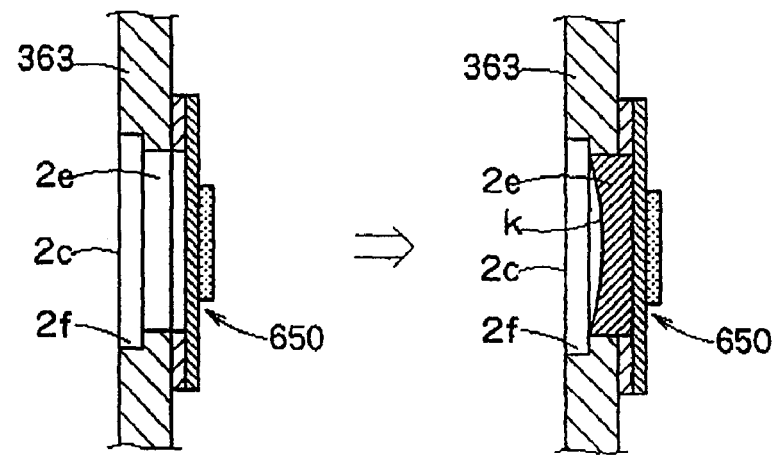
Figure 13C:
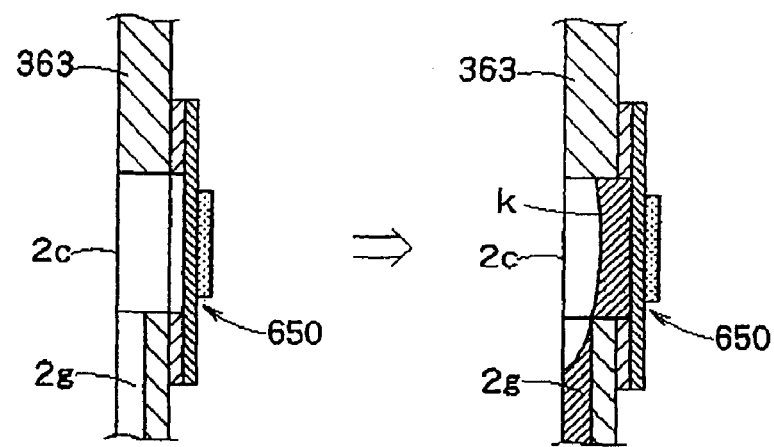

FIGS. 13A to 13C show other embodiments of the through hole 2c. In FIGS. 13A, 13B, and 13C, each drawing on the left indicates a condition that there is no ink K in the through hole 2c and each drawing on the right indicates a condition that there is ink K remaining in the through hole 2c. In the embodiment shown in FIG. 12, both sides of the through hole 2c are formed as perpendicular walls. In FIG. 13A, the sides 2d of the through hole 2c are oblique in the vertical direction and enlarged and opened outward. In FIG. 13B, different level parts 2e and 2f are formed on the side of the through hole 2c. The different level part 2f positioned above is wider than the different level part 2e positioned below. In FIG. 13C, the through hole 2c has a slit 2g extending in the direction of easy ejection of ink K, that is, in the direction of an ink feed port 2 shown in FIG. 18.

Depending on each shape of the through hole 2c shown in FIGS. 13A to 13C, the amount of ink K in the ink reservoir can be reduced. Therefore, M' cav explained in FIGS. 1A and 2 can be made smaller than M' max, so that the vibration characteristic of the actuator 650 at the time of ink end can be made different from that when ink K in a printable amount remains in the container 1. Therefore, the ink end can be detected more surely. The mounting structure may be composed of a part of the wall of the container 1 as shown in FIG. 11B, so that the through hole may be formed in the wall of the container 1.

Figure 14A:
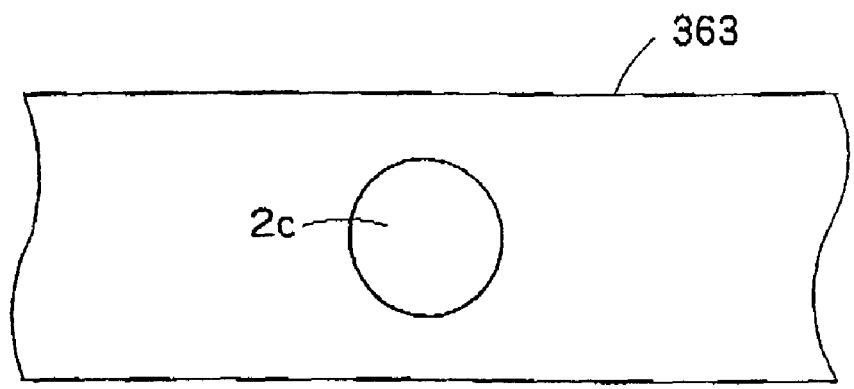
FIGS. 14A, 14B and 14C are drawings showing the planes of other embodiments of the through hole 2c.
Figure 14B:
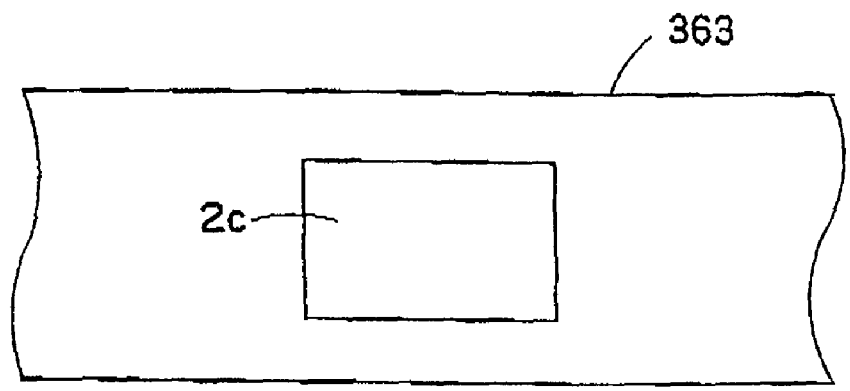
Figure 14C:
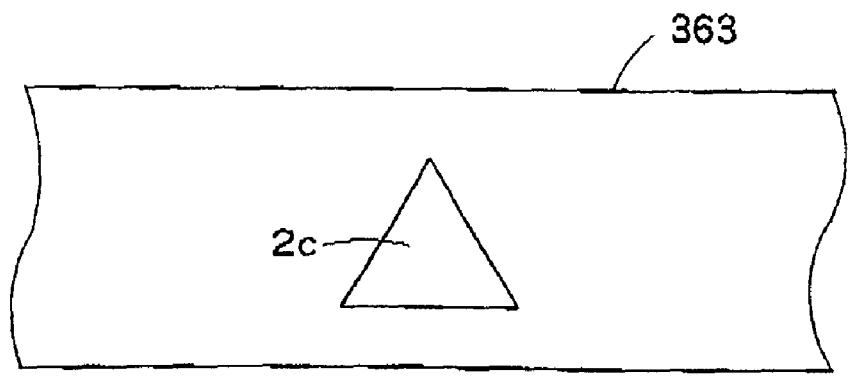

FIGS. 14A to 14B show plan views of still other embodiments of the through hole 2c. As shown in FIGS. 14A to 14C, the plane shape of the through hole 2c can be any shape as long as it does not have negative effects on the vibration characteristic of the actuator. It may be an optional shape such as a circle, a rectangle, or a triangle. The through hole 2c is formed in the receiving portion 363. However, the mounting structure may be composed of a part of the wall of the container 1 as shown in FIG. 11B, so that the through hole may be formed in the wall of the container 1.

Figure 15:
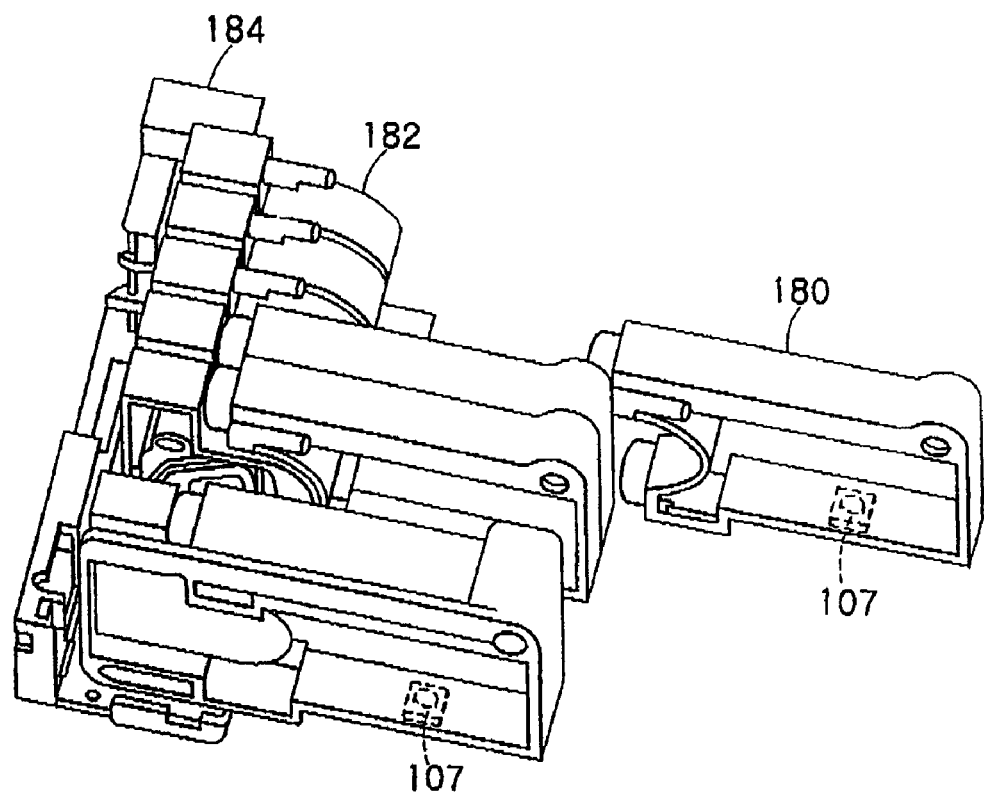
FIG. 15 is a drawing showing an ink cartridge having a mounting structure and an ink jet recording apparatus.

FIG. 15 shows an embodiment of an ink cartridge to which the mounting structure 107 with an actuator is attached and an ink jet recording apparatus. A plurality of ink cartridges are mounted to ink jet recording apparatus having a plurality of ink inlets 182 and head plates 184 corresponding to the respective ink cartridges 180. The plurality of ink cartridges 180 contain different kinds, for example, different colors of ink. On the respective bottoms of the plurality of ink cartridges 180, the mounting structures 107 having actuators which are means for detecting at least acoustic impedance are installed. When each mounting structure 107 with an actuator is attached to each ink cartridge 180, the residual amount of ink in the ink cartridge 180 can be detected.

Figure 16:
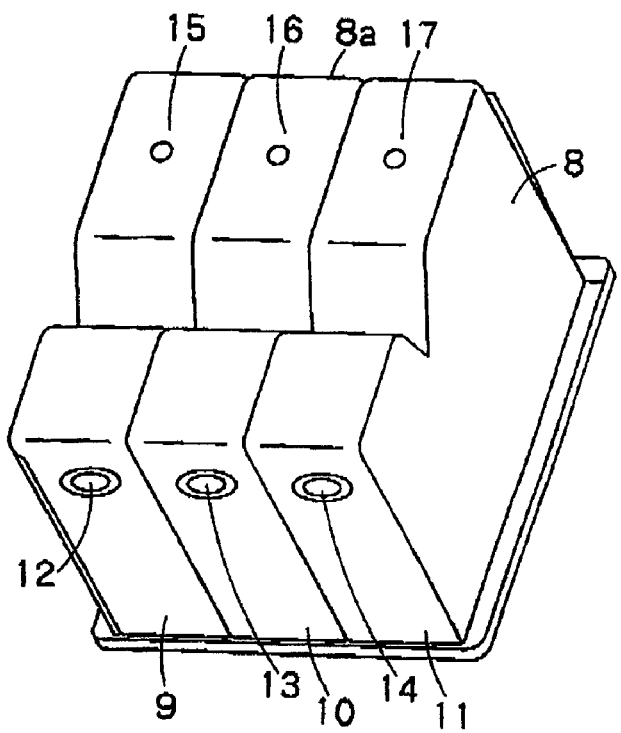
FIG. 16 is a drawing showing an ink cartridge containing a plurality of kinds of ink.

FIG. 16 is a perspective view showing an embodiment of an ink cartridge containing a plurality of kinds of ink which is viewed from the back. A container 8 is divided into three ink chambers 9, 10, and 11 by partitions. Ink feed ports 12, 13, and 14 are formed in the respective ink chambers. To the bottoms 8a of the respective ink chambers 9, 10, and 11, mounting structures 15, 16, and 17 with actuators are attached so as to detect the consumption condition of ink contained in each ink chamber. Division of the container 8 into ink chambers by partitions is not limited to 3. The kind of ink contained in each ink chamber may be different from each other or may be the same.

FIGS. 17A to 17C show a further embodiment of the ink cartridge 180. FIG. 17A is a cross sectional view of an ink cartridge 180C, and FIG. 17B is an enlarged cross sectional view of a side wall 194b of the ink cartridge 180C shown in FIG. 17A, and FIG. 17C is a perspective view from the front thereof. A mounting structure 700 is attached to the ink cartridge 180C. The mounting structure 700 has a circuit board 610. A semiconductor storage means 7 and the actuator 106 are formed on the same circuit board 610. As shown in FIGS. 17B and 17C, the semiconductor storage means 7 is formed above the circuit board 610 and the actuator 106 is formed under the semiconductor storage means 7 on the same circuit board 610. A non-standard O-ring 614 is mounted to the side wall 194b so as to enclose the periphery of the actuator 106. On the side wall 194b, a plurality of caulking parts 616 for joining the circuit board 610 to an ink container 194 are formed. When the circuit board 610 is joined to the ink container 194 by the caulking parts 616 and the non-standard O-ring 614 is pressed against the circuit board 610, the vibration part of the actuator 106 can come in contact with ink and the outside and inside of the ink cartridge are kept liquid-tight.

When a predetermined concavity is formed in the side wall 194b and the caulking parts 616 are fit, the mounting structure 700 having the circuit board 610 can be attached at a predetermined position and connection of terminals 612 which will be described later and attaching of the actuator can be carried out at appropriate positions respectively.

In the semiconductor storage means 7 and in the neighborhood of the semiconductor storage means 7, the terminals 612 are formed. The terminals 612 transfer a signal between the semiconductor storage means 7 and the outside such as the ink jet recording apparatus. The semiconductor storage means 7 may be composed of a rewritable semiconductor memory such as EEPROM. Since the semiconductor storage means 7 and the actuator 106 are formed on the same circuit board 610, at the time of attaching the actuator 106 and the semiconductor storage means 7, only a single attaching step may be required. Further, the operation step at the time of manufacture and recycle of the ink cartridge 180C can be simplified. Further, the number of parts is reduced, so that the manufacturing cost of the ink cartridge 180C can be reduced.

The actuator 106 detects the consumption condition of ink in the ink container 194. The semiconductor storage means 7 stores ink information such as the residual amount of ink detected by the actuator 106. Namely, the semiconductor storage means 7 stores information concerning the characteristic parameters such as the characteristics of the ink and ink cartridge. The semiconductor storage means 7 stores the resonance frequency when the ink container 194 is full of ink, that is, the ink container 194 is filled with ink, or the ink is exhausted, that is, the ink in the ink container 194 is consumed as a characteristic parameter. The resonance frequency when the ink container 194 is full of ink or the ink is exhausted may be stored when the ink container is mounted in the ink jet recording apparatus first. Further, the resonance frequency when the ink container 194 is full of ink or the ink is exhausted may be stored during manufacturing of the ink container 194. The resonance frequency when the ink container 194 is full of ink or the ink is exhausted is stored in the semiconductor storage means 7 beforehand, and the data of resonance frequency is read by the ink jet recording apparatus side, thereby variations at the time of detection of the residual amount of ink can be corrected, so that it can be precisely detected that the residual amount of ink is reduced to the reference value.

Figure 18:
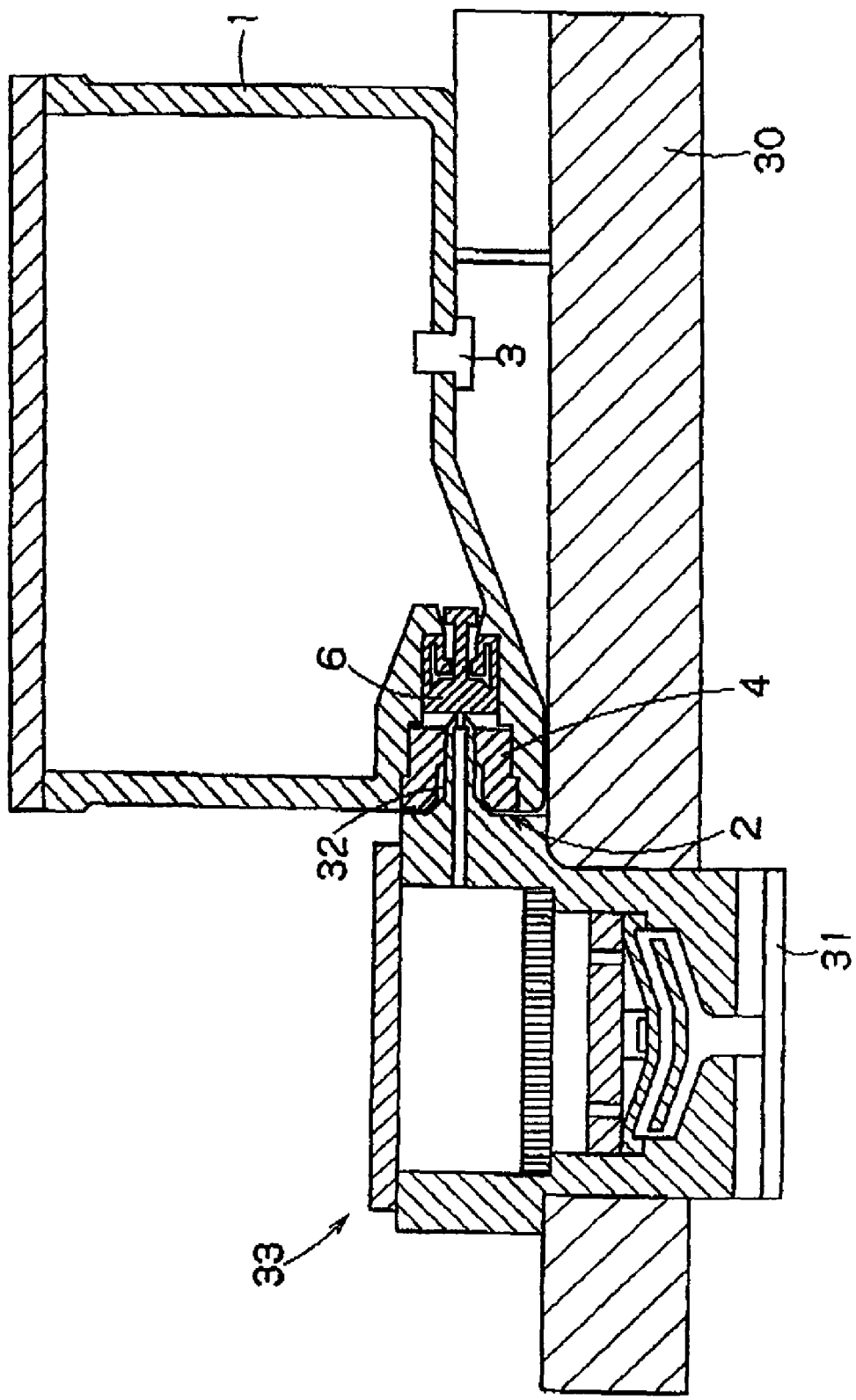
FIG. 18 is a drawing showing an ink jet recording apparatus suited to the ink cartridge shown in FIGS. 17A to 17C.

FIG. 18 is a cross sectional view of the essential section of an ink jet recording apparatus with an ink cartridge having a mounting structure. A carriage 30 moving back and forth in the direction of the width of a recording paper has a sub-tank unit 33. A recording head 31 is installed on the bottom of the sub-tank unit 33. An ink feed needle 32 is installed on the ink cartridge mounting surface side of the sub-tank unit 33.

In the container 1 for containing ink, an ink feed port 2 joining with the ink feed needle of the recording apparatus is installed. A mounting structure 3 is attached to the bottom of the container 1.

The ink feed port 2 is provided with a packing 4 and a valve body 6. The packing 4 is liquid-tightly connected to the ink feed needle 32 interconnecting to the recording head 31. The valve body 6 is always connected elastically to the packing 4 by a spring 5. When the ink feed needle 32 is inserted, the valve body 6 is pressed by the ink feed needle 32 so as to open the ink flow path and ink in the container 1 is fed to the recording head 31 via the ink feed port 2 and the ink feed needle 32.

The carriage 30 moving back and forth in the direction of the width of a recording paper has the sub-tank unit 33 and the recording head 31 is installed on the bottom of the sub-tank unit 33. The ink feed needle 32 is installed on the ink cartridge mounting surface side of the sub-tank unit 33. A mounting structure with a piezo-electric device mounted may be attached to the sub-tank 33 so as to judge ink shortage. Since the sub-tank side detects the consumption condition of ink after the ink of the ink cartridge is exhausted, the ink cartridge can be exchanged at timing close to ink shortage. Furthermore, to make the detection of the consumption condition of ink surer, a mounting structure having a piezo-electric device may be attached to each of the ink cartridge and sub-tank.

Not only the mounting structure is attached to the ink cartridge installed on the carriage 30 as mentioned above but also the ink tank other than the ink cartridge may be installed on a predetermined printer fixing part other than on the carriage 30.

Figure 19:
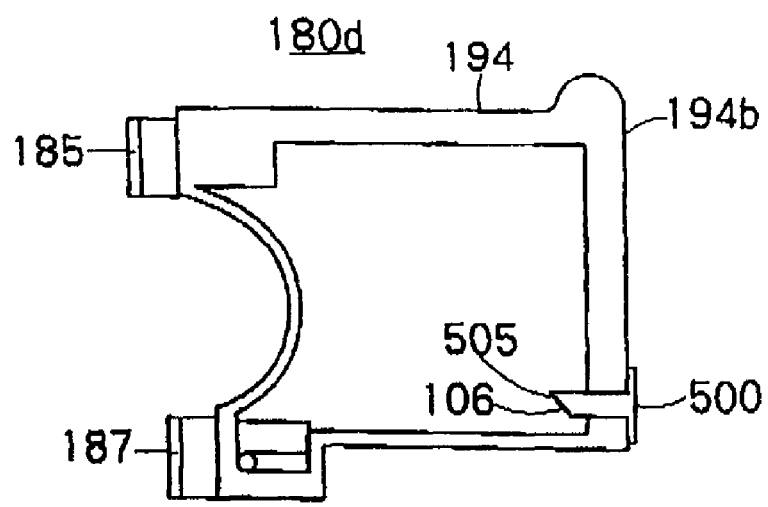
FIG. 19 is a cross sectional view of the ink cartridge 180d to which the module 500 shown in FIGS. 9A to 9C is attached.

FIG. 19 is a cross sectional view of the ink cartridge 180d showing another embodiment of the ink cartridge 180. In FIG. 10 mentioned above, the module 100 shown in FIG. 5 is attached to the side wall of the container 1. In FIG. 19, the module 500 shown in FIGS. 9A to 9C is attached to the side wall 194b of the ink container 194 of the ink cartridge 180d.

The end of the module 500 is inclined and the actuator 106 is mounted on the receiving portion 505 inclined. As a result, when the module 500 is attached to the side wall 194b, the actuator 106 is inclined to the vertical direction of the ink container 194. The actuator 106 is also inclined to the ink surface in the ink container 194.

Therefore, even if the ink surface passes the module 500 or the ink container vibrates and ink is adhered in the neighborhood of the receiving portion 505, ink in the neighborhood of the receiving portion 505 flows and drops. By use of such an inclined receiving portion 505, ink in the neighborhood of the actuator 106 is well drained. Therefore, ink unnecessary for measurement of the actuator 106 is prevented from staying in the receiving portion 505 and maldetection of measurement of the actuator 106 can be reduced.

In FIG. 19, the module 500 is attached to the ink container 194 so that the receiving portion 505 of the module 500 is directed toward the bottom of the ink container 194. However, the mounting direction of the module 500 is not limited to the drawing and the module 500 may be attached to the ink container 194 so that the receiving portion 505 is directed toward the top of the ink container 194. The mounting position of the module 500 on the side wall 194b and the number thereof are not limited to the drawing and the length of projection of the module 500 into the ink container 194 is neither limited to the drawing.

Figure 20:
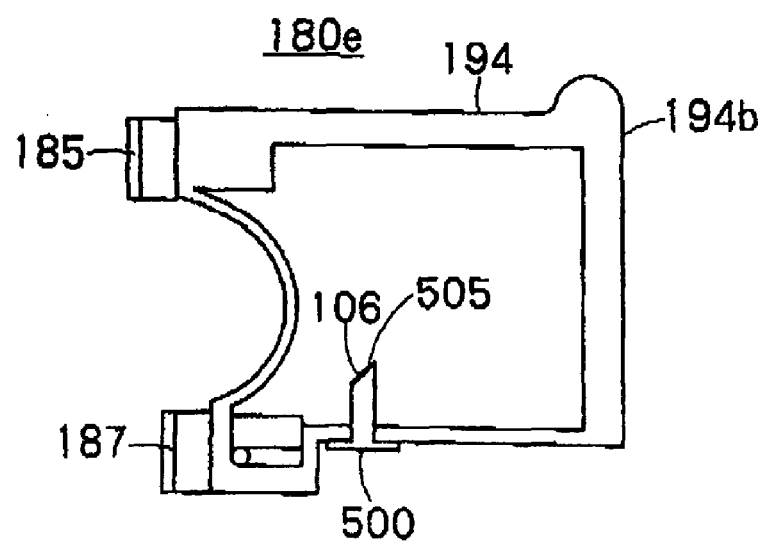
FIG. 20 is a cross sectional view of another ink cartridge 180e to which the module 500 shown in FIGS. 9A to 9C is attached.

FIG. 20 is a cross sectional view of the ink cartridge 180e showing different embodiment from that shown in FIG. 19. In FIG. 20, unlike FIG. 19, the module 500 is attached to the bottom of the ink container 194 in the neighborhood of an ink feed port 187. Also in this case, in the same way as with FIG. 19, the receiving portion 505 of the module 500 is inclined, so that ink is well drained. Therefore, the maldetection of the actuator 106, which is a detection of ink though there is no ink actually, can be reduced.

In this case, it is preferable that the module 500 is attached in the neighborhood of the ink feed port 187. The reason is that even if the ink cartridge 180e is mounted to the ink jet recording apparatus in an inclined state, it can be detected appropriately whether ink remains in the neighborhood of the ink feed port 187 or not. The mounting position of the module 500 on the bottom of the ink container 194 and the direction and number thereof are not limited to the drawing and the length of projection of the module 500 into the ink container 194 is neither limited to the drawing.

In this embodiment, the mounting structure with the actuator for detecting the consumption condition of ink is mainly explained. However, a mounting structure with a piezo-electric device for generating an elastic wave and a mounting structure with a piezo-electric device for receiving a reflected wave may be attached to the liquid container. Therefore, the number of mounting structures to be attached to the liquid container is not limited to one. Further, the mounting position of the mounting structure to the liquid container is neither limited to the bottom of the liquid container.

Next, a mounting structure and a module having the mounting structure and a piezo-electric device of another embodiment of the present invention will be explained with reference to FIGS. 21 to 33D.

Figure 21:
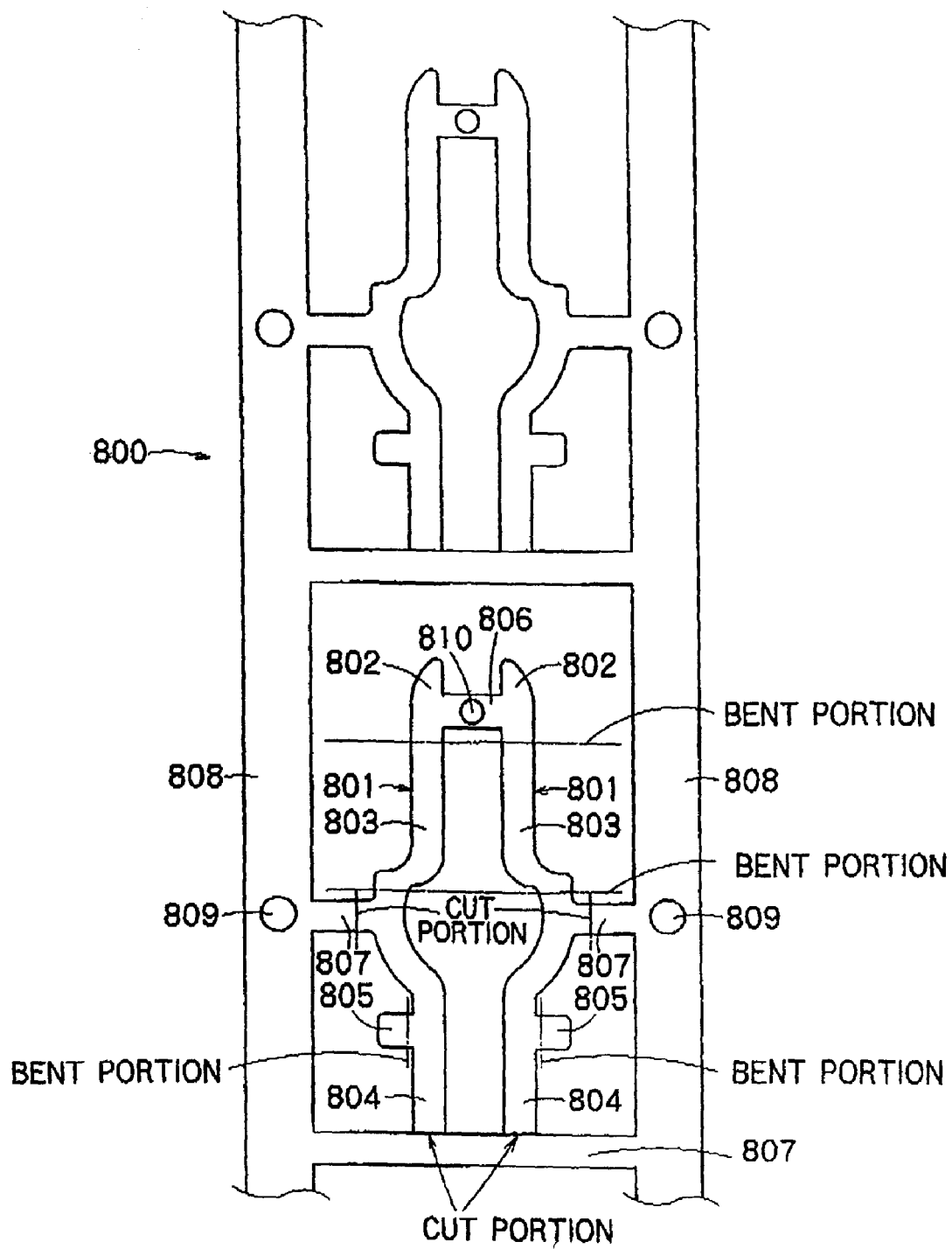
FIG. 21 is a plan view showing a plate member for manufacturing a mounting structure of an embodiment of the present invention.

FIG. 21 shows a plate member for manufacturing the mounting structure of this embodiment and a plate member 800 is formed by pressing a thin metal sheet with a thickness of about 0.1 to 0.2 mm into a predetermined shape. It is preferable that the thin metal sheet to be used has quality of low electric resistance and suited to soldering and pressing, though the thin metal sheet may be plated so as to lower the electric resistance and soldered. Numeral 801 shown in FIG. 21 indicates an elongated member for forming a conductive member constituting a part of the mounting structure and a pair of elongated members 801 are formed for each mounting structure. Each elongated member 801 has an distal end 802, an intermediate part 803, a proximal end 804, and a projection 805 and the distal ends 802 of the pair of elongated members 801 are connected by a tie bar (a connection member) 806. At the center of the tie bar 806, a positioning hole 810 is formed. The positioning hole 810 is formed at the position corresponding to the vibration part (sensor part) of the piezoelectric device. Each elongated member 801 is connected to a support part 808 via a branch part 807. In the support part 808, pilot holes 809 used to transport the plate member 800 by a manufacturing machine are formed.

As shown in FIG. 22, the elongated members 801 are bent along the bending parts shown in FIG. 21. By doing this, the pair of distal ends 802 of the pair of elongated members 801 are arranged in the same plane. On the other hand, the pair of proximal ends 804 are arranged in another same plane different from the plane where the pair of distal ends 802 are arranged. The projections 805 are erected by bending and the erected projections 805 act to stick to resin.

Figure 23A:
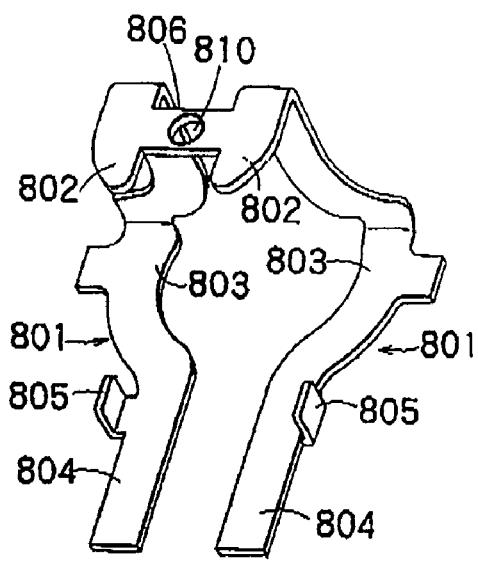
FIGS. 23A, 23B and 23C are enlarged views showing the pair of bent elongated members shown in FIG. 22.
Figure 23B:
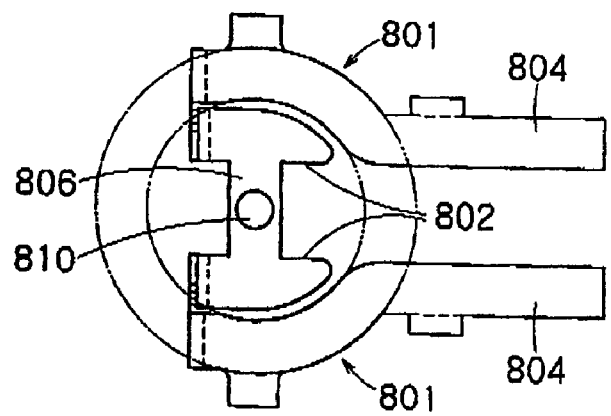
Figure 23C:
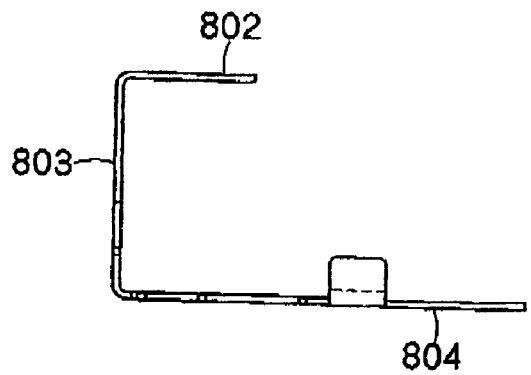

FIGS. 23A to 23C are drawings showing the enlarged pair of elongated members 801 and as shown in FIG. 23C, the same plane where the pair of distal ends 802 are arranged are parallel with another same plane where the pair of proximal ends 804 are arranged. As shown in FIG. 23B, the elongated member 801 at the part (the distal end 802 included) positioned in the same plane and the elongated member 801 at the part (the proximal end 804 included) positioned in another same plane are not overlaid with each other in the perpendicular direction to the same plane and another same plane. Therefore, at the time of bending the elongated members 801 shown in FIG. 21 by bending dies, the bending dies do not interfere with each other and the bending operation can be performed easily.

Next, by referring to FIGS. 24 to 28C, a procedure that a molded part is integrally formed in the elongated members 801 shown in FIG. 22 by insertion molding will be explained.

Figure 24:
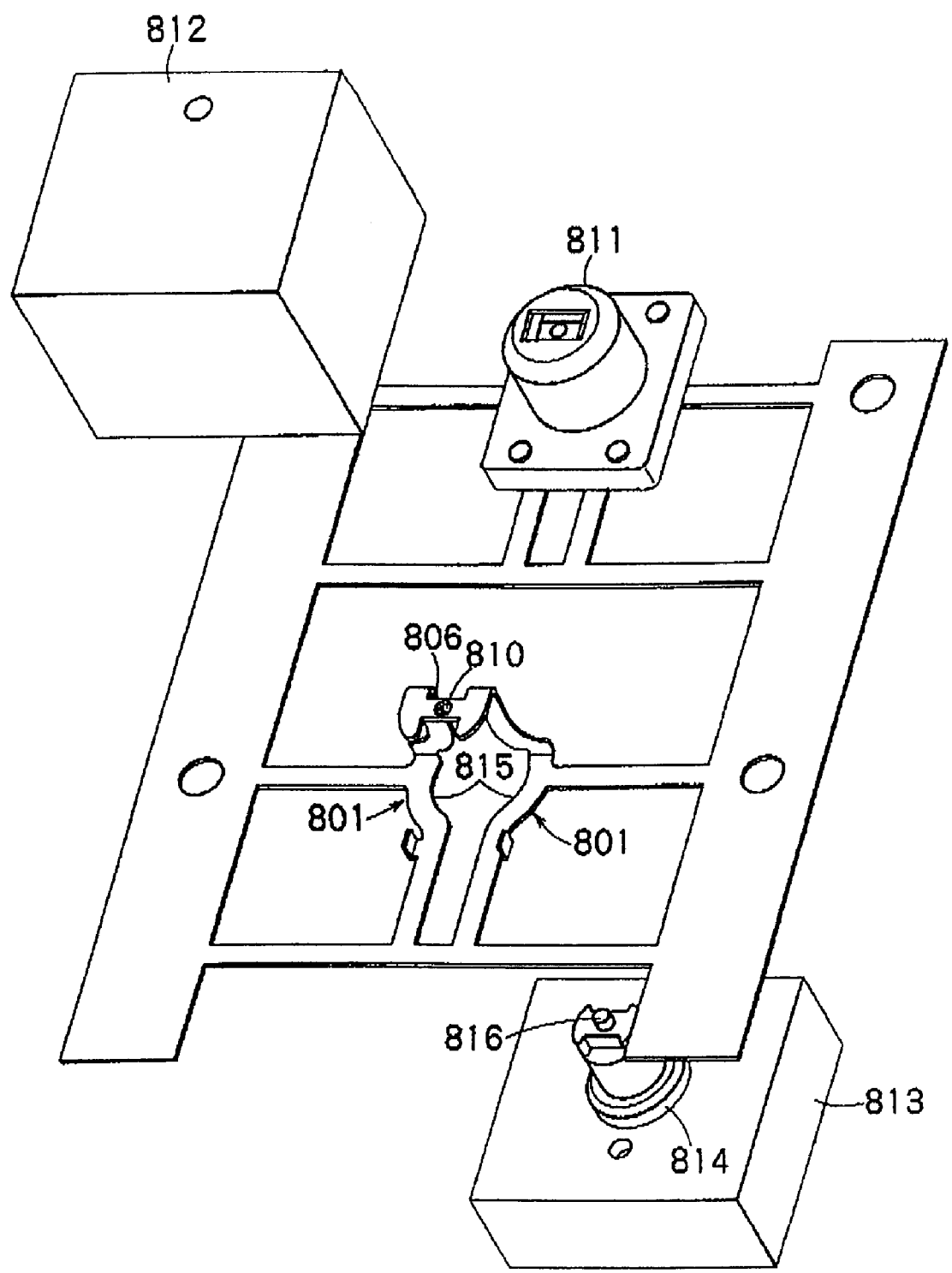
FIG. 24 is a perspective view showing the state that a molded part is integrally formed with the pair of bent elongated members shown in FIG. 22 by insertion molding.
Figure 28A:
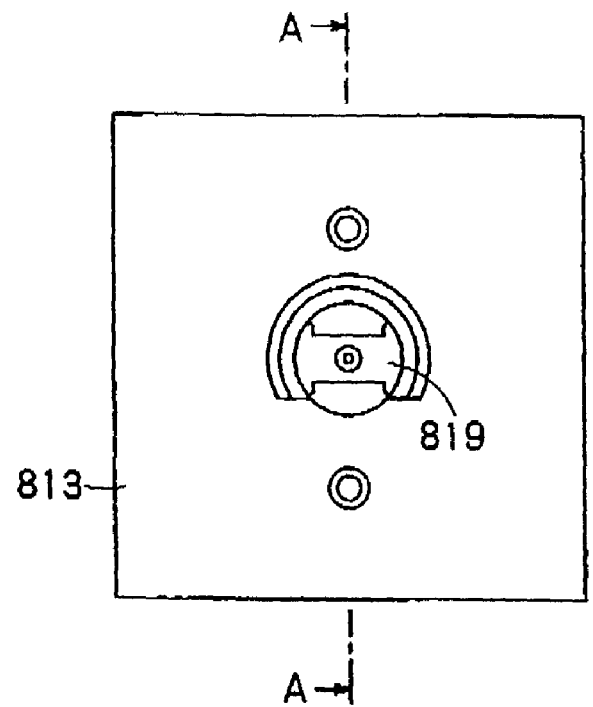
FIGS. 28A, 28B and 28C are drawings showing the constitution of a male die used for processing the molded part shown in FIG. 24.
Figure 28B:
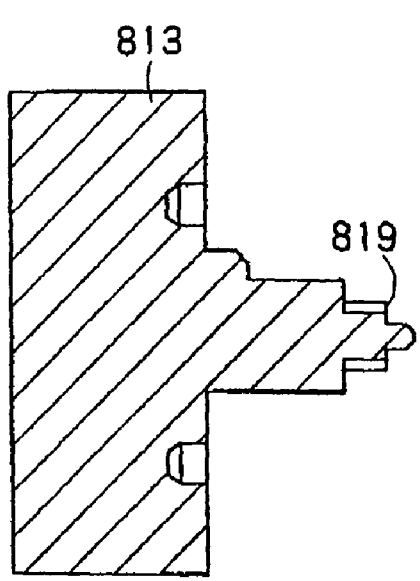
Figure 28C:
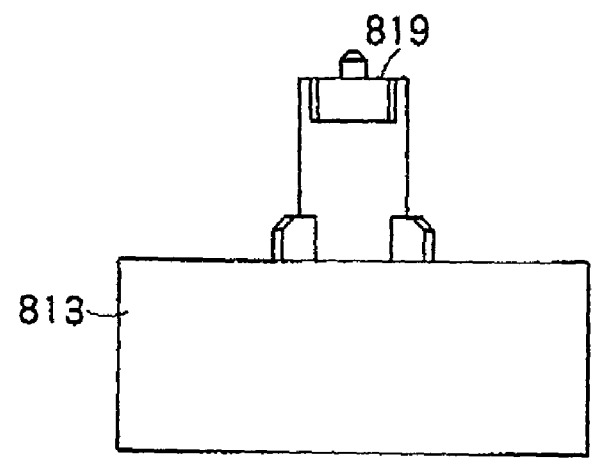

As shown in FIG. 24, to form a molded part 811 by insertion molding, a female die 812 and a male die 813 fit into it are used. The female die 812 is shown in FIGS. 27A to 27C in detail and the male die 813 is shown in FIGS. 28A to 28C in detail. A positioning column 814 is formed on the male die 813 and a positioning R part 815 having a contour corresponding to the structure of the positioning column 814 is formed on the pair of elongated members 801. The contour of the positioning R part 815 and the structure of the positioning column 814 form concentric circles. Furthermore, at the end of the male die 813, a positioning convexity 816 is formed and the positioning convexity 816 can be inserted into the positioning hole 810 of the connection member 806.

Figure 25:
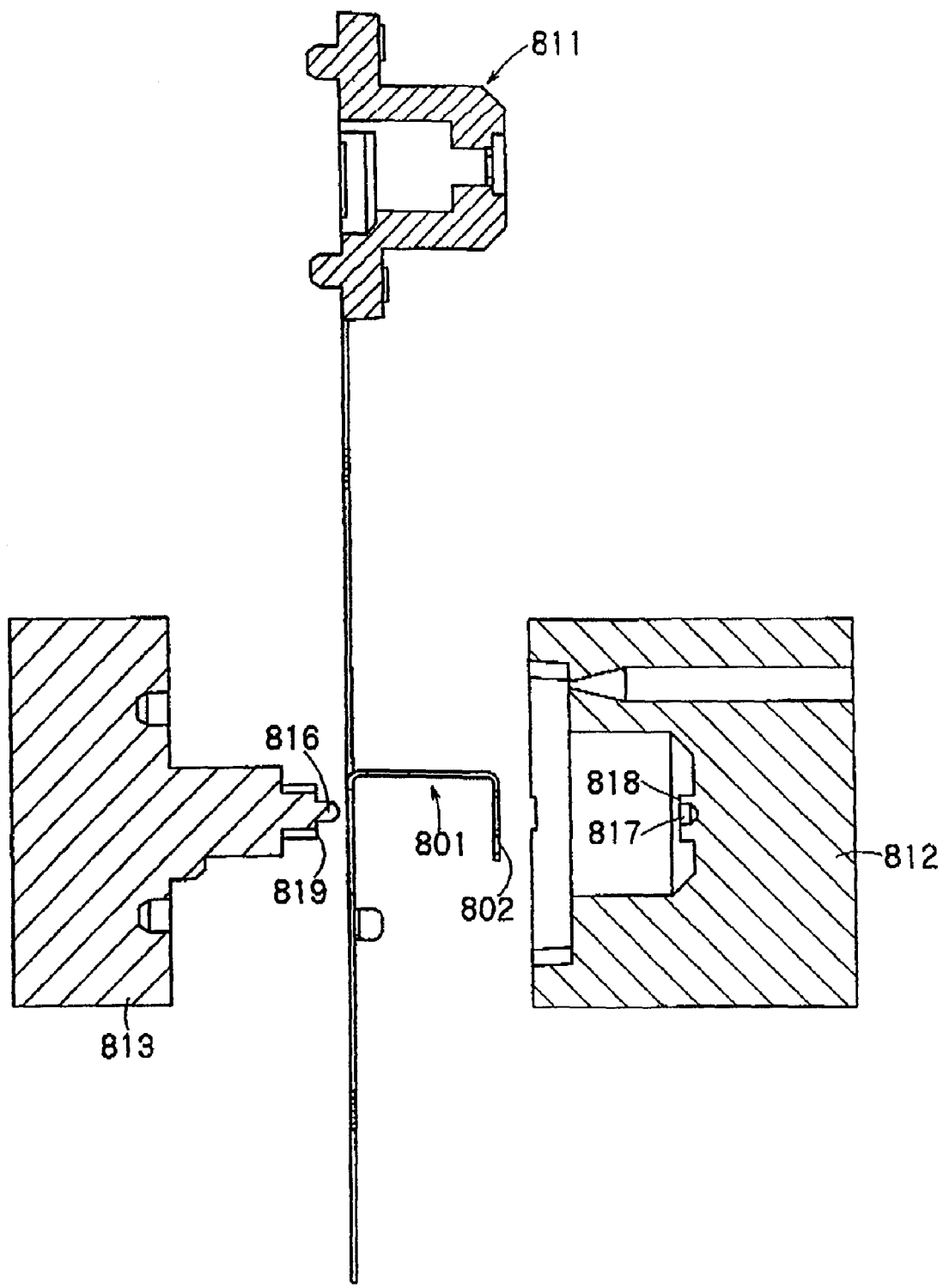
FIG. 25 is a cross sectional view showing the state that a molded part is integrally formed with the pair of bent elongated members shown in FIG. 22 by insertion molding and shows the state before a male die and a female die are fit into each other.
Figure 26:
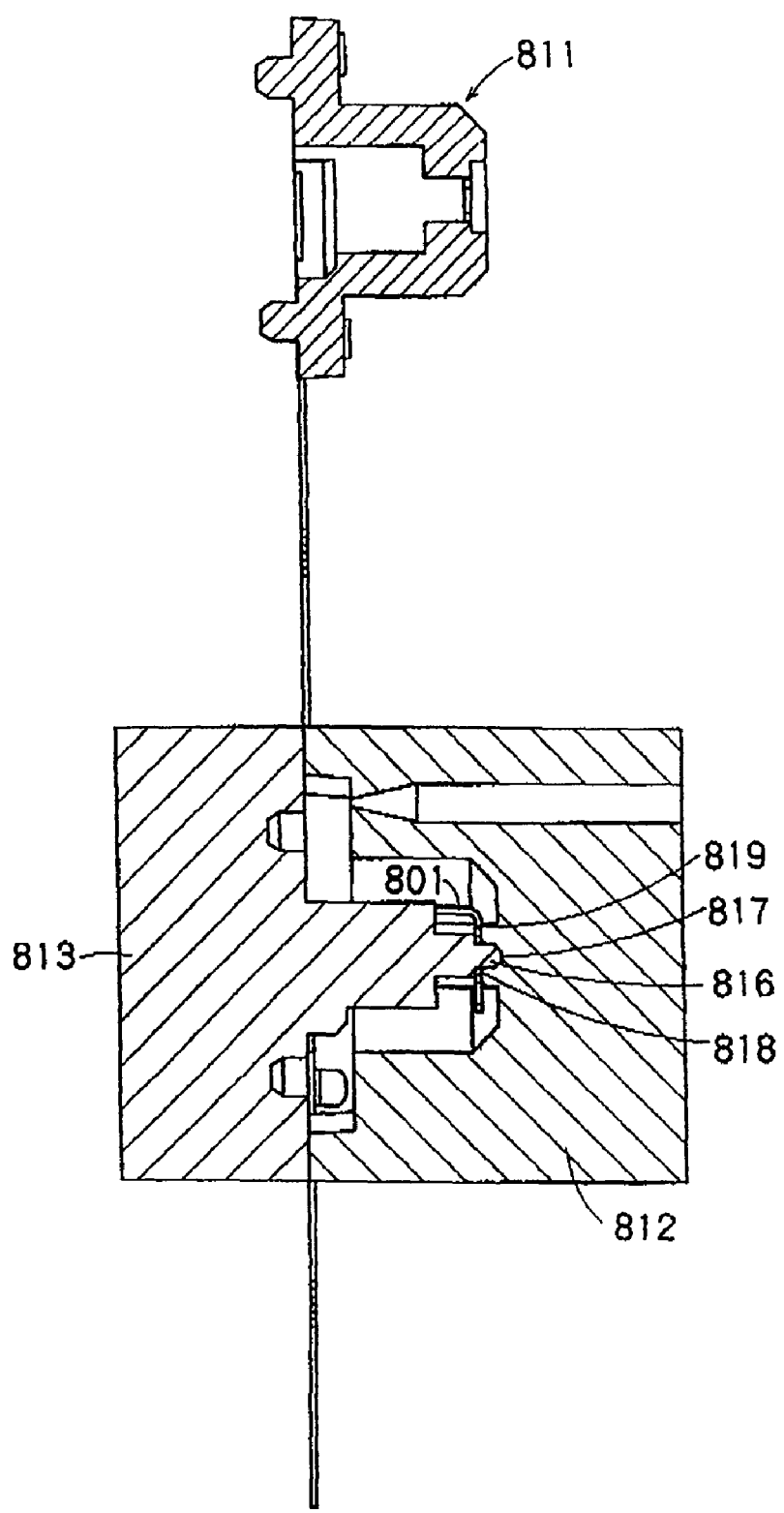
FIG. 26 is a cross sectional view showing the state that a molded part is integrally formed with the pair of bent elongated members shown in FIG. 22 by insertion molding and shows the state after a male die and a female die are fit into each other.

Then, in the state shown in FIG. 25, when the positioning column 814 is fit into the positioning R part 815 and the positioning convexity 816 is inserted into the positioning hole 810, the pair of elongated members 801 are positioned to the male die 813. Furthermore, as shown in FIG. 26, when the positioning convexity 816 of the male die 813 is inserted into the positioning concavity 817 of the female die 812, the male die 813 is positioned to the female die 812. By doing this, the pair of elongated members 801 are precisely positioned inside the female die 812 and the male die 813.

Further, as shown in FIG. 25, a contact surface 818 is formed around a positioning concavity 817 of the female die 812 and a contact surface 819 is also formed around a positioning convexity 816 of the male die 813. As shown in FIG. 26, at least a part of the distal end 802 of each elongated member 801 is held from both sides by the contact surface 818 on one side and the contact surface 819 on the other side.

No resin is fed to the distal end 802 at the part held by the contact surfaces 818 and 819, so that the distal end 802 at the part is not embedded in resin and exposed and the electrical contact is ensured. Therefore, an additional step of removing resin so as to ensure the electrical contact at the distal end 802 is not required and the manufacturing process is simplified.

Figure 29:
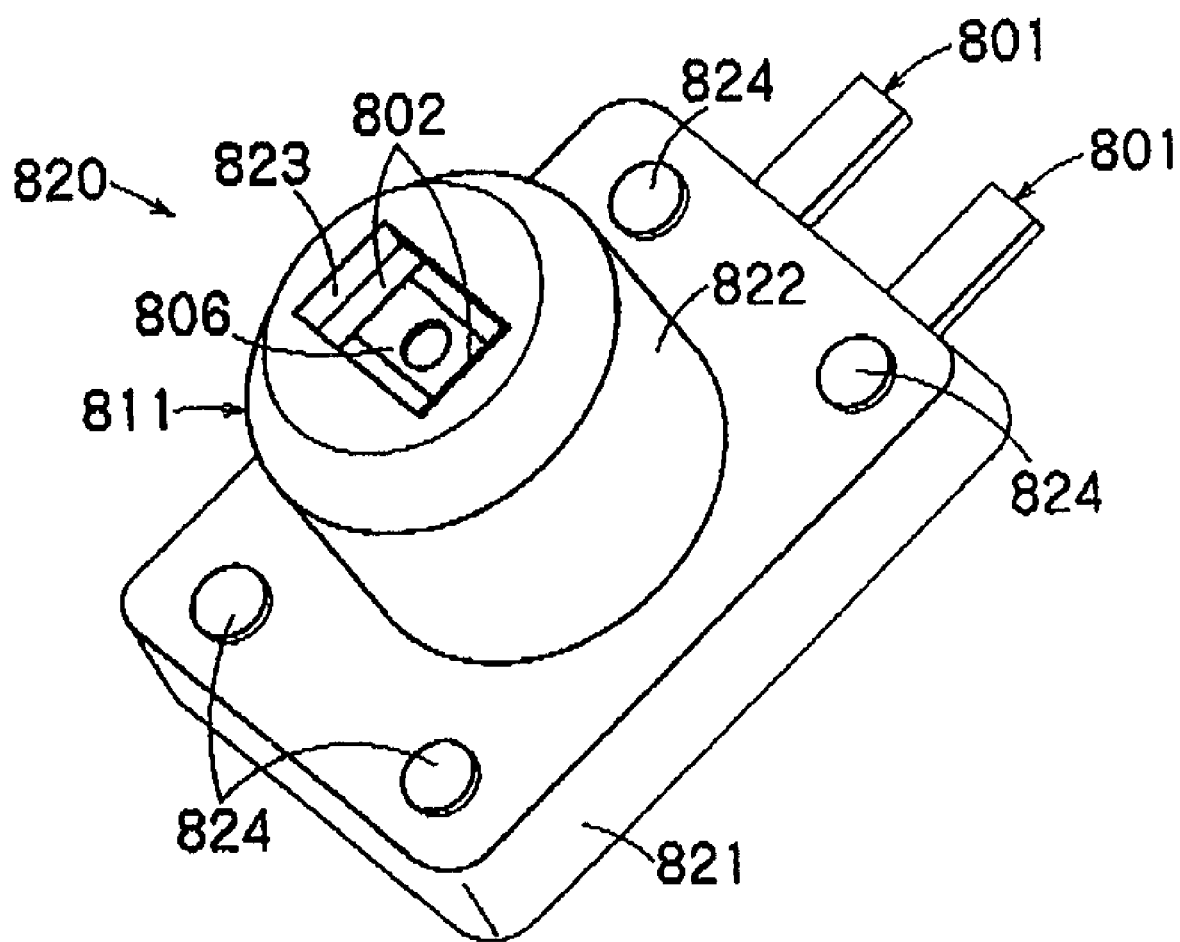
FIG. 29 is a perspective view showing an integrated molded product that the branch parts are cut off at the cutting parts shown in FIG. 21.
Figure 31:
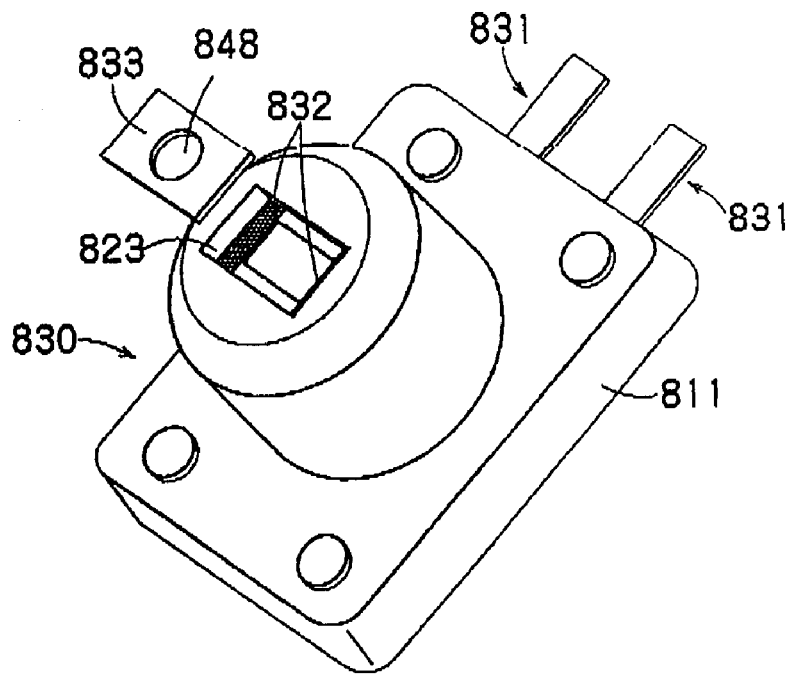
FIG. 31 is a perspective view showing the situation that an actuator is attached to a mounting structure of an embodiment of the present invention.

When the molded part 811 is integrally formed on the pair of elongated members 801, the branch parts 807 are cut at the cutting parts shown in FIG. 21 and as shown in FIGS. 29 to 30D, an integrated molded product 820 of the pair of elongated members 801 and the molded part 811 is manufactured.

As shown in FIGS. 29 to 30D, the molded part 811 has a square plate base 821 and a column 822 projected from the base 821, and a concavity 823 for receiving the piezo-electric device is formed on the end surface of the column 822, and the pair of distal ends 802 and the connecting member 806 for connecting them are arranged on the bottom of the concavity 823. As shown in FIG. 29, on one side of the base 821, seats 824 in contact with the side wall of the liquid container are formed in the four corners. As shown in FIG. 30B, on the other side of the base 821, two projections 825 for positioning the molded part 811 to the circuit board are formed.

Next, in the integrated molded product 820 shown in FIGS. 29 to 30D, the connection member 806 connecting the distal ends 802 of the pair of elongated members 801 is cut, bent, or resected, thereby the distal ends 802 are electrically separated. When the distal ends 802 are electrically separated like this, as indicated by numeral 830 in FIG. 31, the mounting structure of this embodiment is manufactured and the mounting structure 830 has a pair of conductive members 831 composed of the pair of elongated members 801 separated from each other. Each of the pair of conductive members 831 has an electrical contact 832 composed of the exposed part of the distal end 802 of the elongated member 801. A drive signal is applied to an actuator 833 via the pair of conductive members 831 constituting a three-dimensional circuit.

Figure 32:
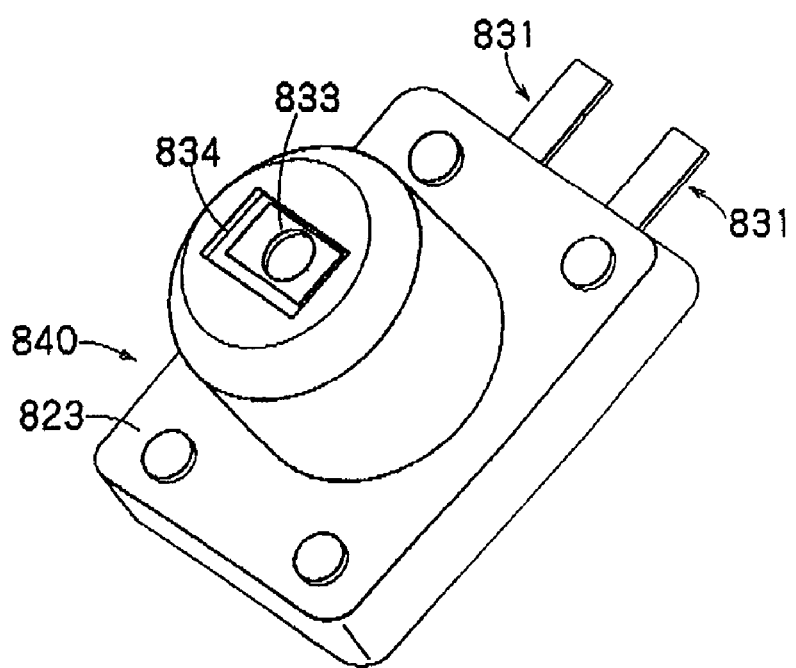
FIG. 32 is a perspective view showing a module structured by attaching an actuator to a mounting structure of an embodiment of the present invention and molding it with resin.
Figures 33A, 33D:
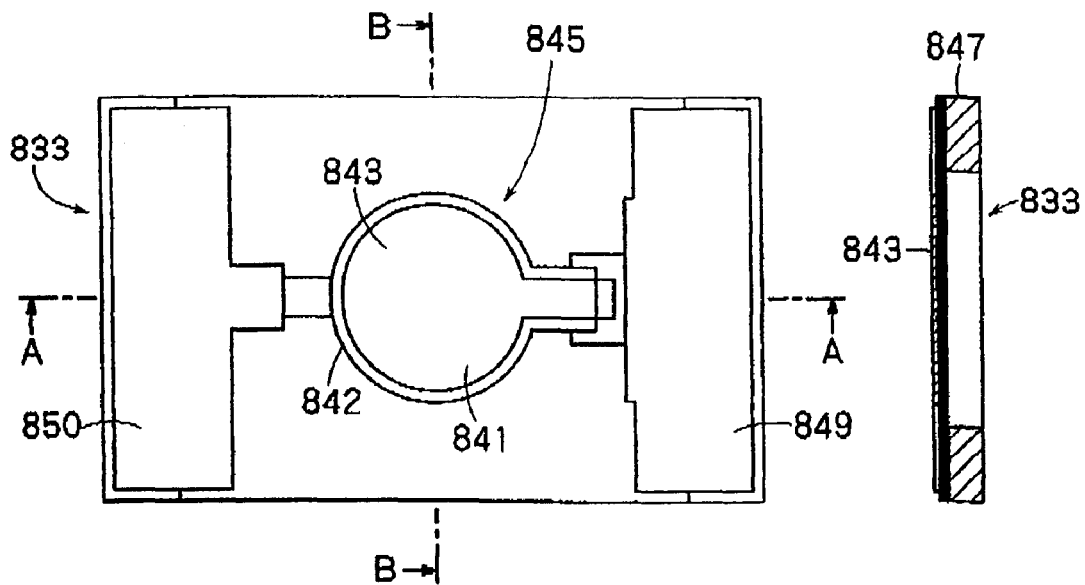
FIGS. 33A, 33B, 33C and 33D are drawings showing the constitution of an actuator of an embodiment of the present invention.
Figure 33C:
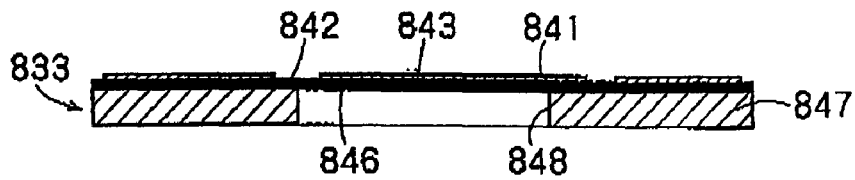
Figure 33B:
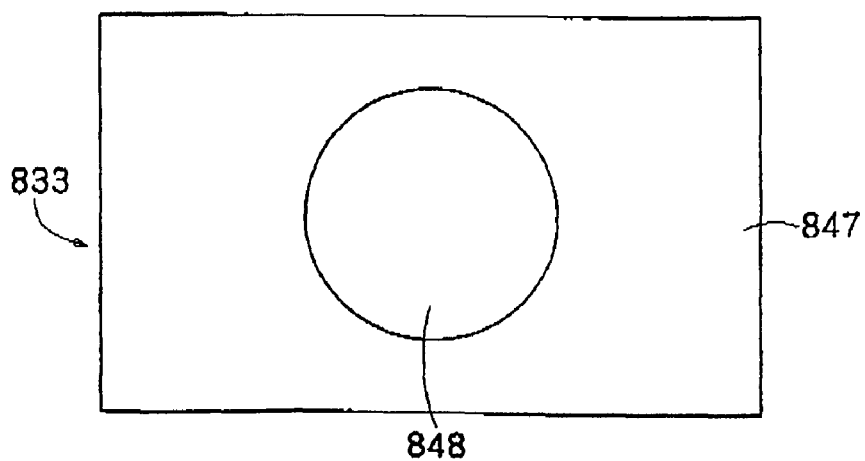

In the concavity 823 of the molded part 811 of the mounting structure 830, the actuator 833 constituting the piezo-electric device is fit and the pair of electrical contacts 832 of the mounting structure 830 and the pair of electrodes of the actuator 833 are electrically connected. At the time of this connection, a conductive adhesive may be used. When the electrodes of the actuator 833 and the electrical contacts 832 of the mounting structure 830 are connected to each other, as shown in FIG. 32, the periphery of the actuator 833 is molded by resin 834 and sealed tightly so as to prevent a liquid from moving on the back side of the actuator 833. By doing this, a module 840 having the mounting structure 830 and the actuator 833 is manufactured.

The elongated members 801 have a relatively high rigidity. Therefore, the actuator (piezo-electric device) can be supported by the distal ends 802 of the elongated members 801.

As shown in FIGS. 33A to 33D, the actuator 833 has a piezo-electric element 845 constituting a sensor part (vibration part) for detecting a liquid and the piezo-electric element 845 has an upper electrode 841, a lower electrode 842, and a piezo-electric layer 843 held by the electrodes 841 and 842. The piezo-electric element 845 is arranged on one side of a vibrating plate 846 and a cavity forming member 847 is arranged on the other side of the vibrating plate 846. At the center of the cavity forming member 847, a circular cavity (opening) 848 is formed and the piezo-electric element 845 is arranged at the position corresponding to the cavity 848. The upper electrode 841 is connected to an upper electrode terminal 849 and the lower electrode 842 is connected to a lower electrode terminal 850.

The module 840 is mounted on the same circuit board (not shown in the drawing) as that of the memory module (not shown in the drawing). In this case, when the projections 825 shown in FIGS. 30A to 30D are inserted into the holes formed in the circuit board, the module 840 and the circuit board are positioned, and in this state, the electrical connections of the module 840 and the circuit board are connected by soldering or others.

The module 840 mounted on the circuit board is inserted through the through hole formed in the side wall of the liquid container and fixed to the liquid container so that the part of the actuator 833 is projected into the liquid container. The liquid in the liquid container is in contact with the vibrating plate 846 via the cavity 848.

As mentioned above, according to this embodiment, the molded part 811 is integrally formed by resin molding with the pair of conductive members 831 constituting the three-dimensional circuit for applying a drive signal to the actuator 833, so that the mounting structure 830 for attaching the actuator 833 to the liquid container at a predetermined position can be manufactured with high dimensional precision, thus the consumption condition of the liquid in the liquid container can be detected with high precision by the module 840 having the actuator 833 and the mounting structure 830.

Next, the mounting structure of another embodiment of the present invention will be explained by referring to FIGS. 34A to 34C.

Figure 34A:
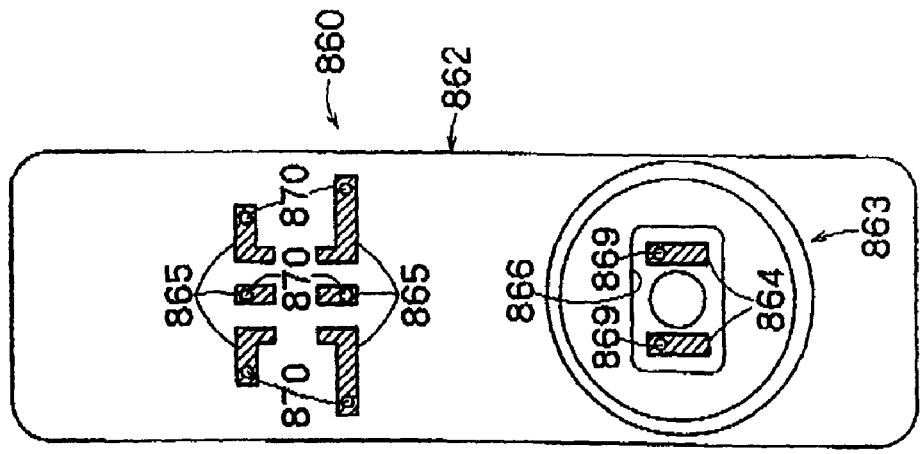
FIGS. 34A, 34B and 34C are drawings showing the constitution of a mounting structure of an embodiment of the present invention.
Figure 34C:
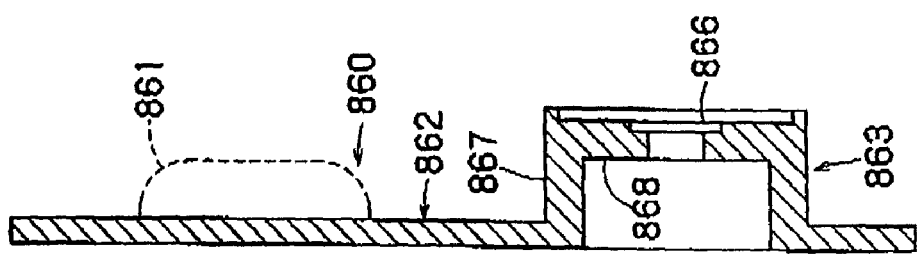
Figure 34B:
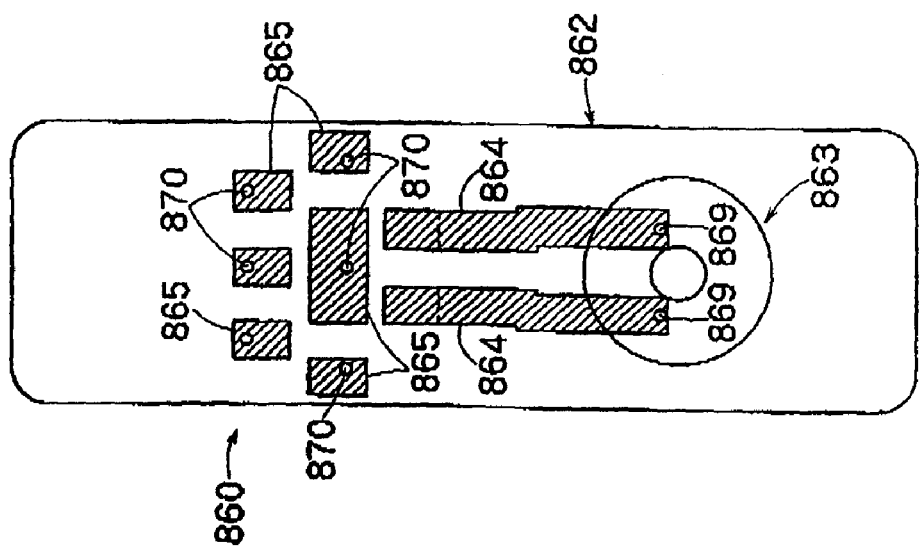

As shown in FIGS. 34A to 34C, a mounting structure 860 according to this embodiment has a base 862 on which a control element and a memory or a unit 861 (hereinafter referred to as "control element, etc. 861") composed of a control unit and a memory which are integrated for controlling an actuator (not shown in the drawing) constituting a piezo-electric device is mounted and a projection 863 which is projected from the base 862 and on which an actuator is mounted. The control element, etc. 861 is, for example, an integrated circuit (IC) for a memory.

The projection 863 has a column 867 projected from the base 862 and a circular and plate sealing part 868 for sealing the end opening of the column 867. On the surface of the sealing part 868, a concavity 866 for receiving the actuator constituting the piezo-electric device is formed.

On the mounting structure 860, a plurality of electric wires electrically connected to at least one of the actuator and the control element, etc. 861 are three-dimensionally formed by two-color molding resin plating. More concretely, a pair of through holes 869 passing through the sealing part 868 are formed on the bottom of the concavity 866 and the pair of electric wires 864 reach the back side of the sealing part 868 from the bottom of the concavity 866 via the inner surface of the through hole 869 and are further formed continuously up to the back side of the base 862. Further, the plurality of electric wires electrically connected to the control element, etc. 861 are continuously formed from the surface of the base 862 to the back thereof via a plurality of through holes 870 formed in the base 862.

The electric wires 864 and 865 on the back side shown in FIG. 34B function as contacts with which the contact type connectors installed in a printer carriage come in contact. Namely, when an ink cartridge is mounted to the printer carriage, the electric wires 864 and 865 on the back side shown in FIG. 34B are pressed against the contact type connectors.

In the mounting structure 860 shown in FIGS. 34A to 34C, the electric wires 864 and the electric wires 865 are not connected and this example is a one when a memory is to be used as the control element, etc. 861. When a control element is to be used as the control element, etc. 861, the electric wires 864 and the electric wires 865 may be laid so as to be connected.

The two-color molding resin plating method may be called a two-shot method or an on-catalytic method and patterning is carried out by two times of injection molding. A typical example of the two-color molding resin plating method may be roughly explained below. Firstly, the first molding (primary molding) is executed by resin capable of plating, and next the whole is chemically etched, and a catalyst which is a core of plating is given. Then, the part where no plating is to be deposited is cover-molded (secondary molding) by secondary resin and then plated. Namely, the two-color molding resin plating method is a method for depositing plating of a conductive metallic material, for example, gold only on the part exposed on the primary molding processed surface.

As mentioned above, according to the mounting structure of this embodiment, the electric wires electrically connected to the actuator and control element are formed three-dimensionally by two-color molding resin plating and at the time of forming the base 862 and the projection 863 of the mounting structure 860, the electric wires 864 and 865 can be formed at the same time, so that the manufacturing process can be greatly simplified and a large number of mounting structures 860 can be easily formed at the same time. Further, the forming position precision of the electric wires 864 and 865 in the mounting structure 860 is high, so that the mounting position precision of the actuator to the mounting structure 860 is high, and the liquid detection precision is improved, and more over, the mounting position precision of the control element, etc. 861 to the mounting structure 860 is also high, and the connection reliability between the control element, etc. 861 mounted to the mounting structure 860 and the external electrical contact is also improved.

Next, the module of another embodiment of the present invention will be explained by referring to FIGS. 35 to 40B.

Figure 35:
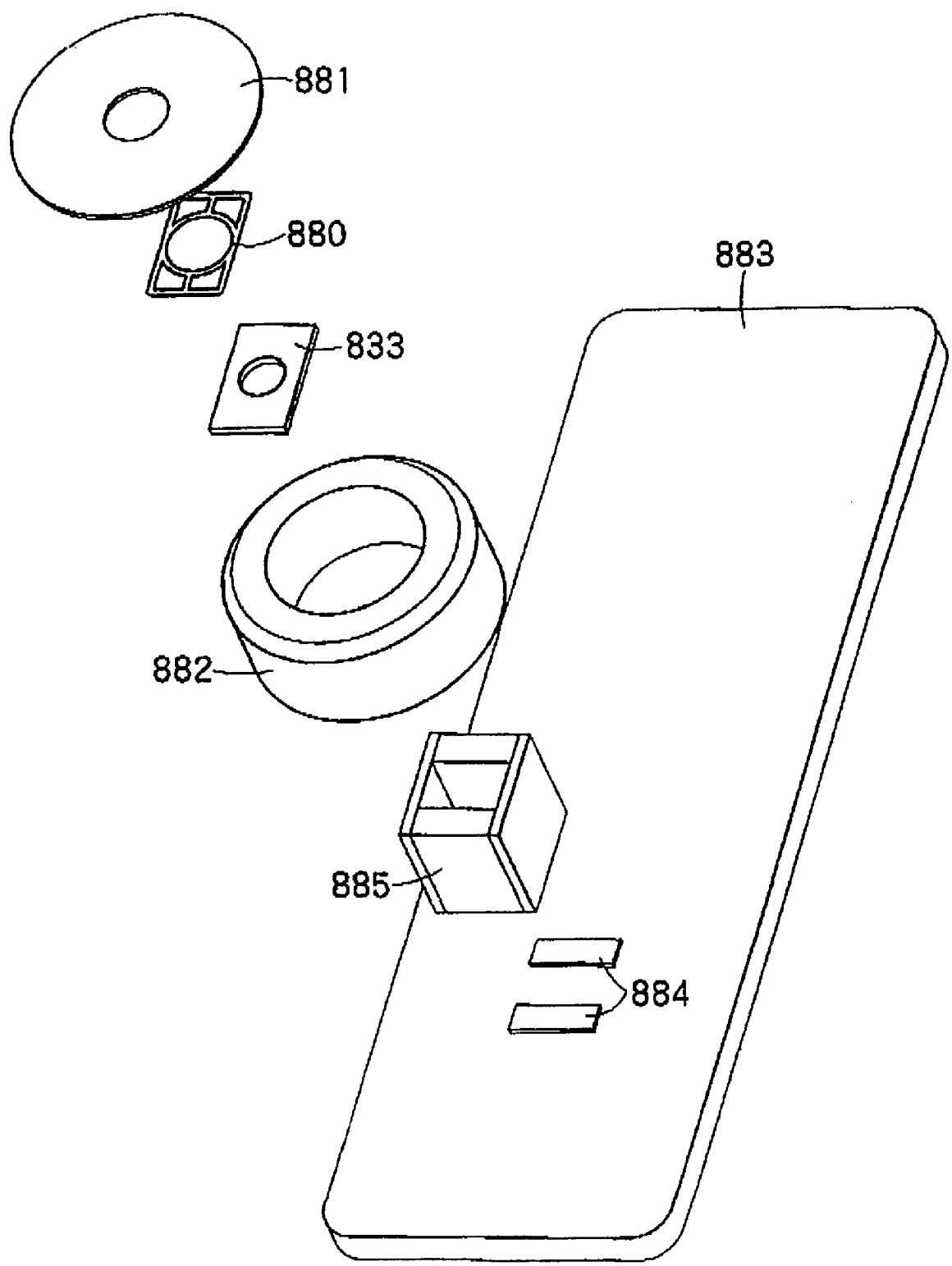
FIG. 35 is an exploded perspective view of a module of an embodiment of the present invention.

FIG. 35 is an exploded perspective view showing the module of this embodiment, and the module has the actuator 833 shown in FIGS. 33A to 33D, and the actuator 833 is thermally welded to a plate 881 composed of stainless steel with a polyolefin film 880. The polyolefin film 880 is shaped so as not to cover the sensor unit of the actuator 833, and an opening is formed at the center of the plate 881, thereby it is structured so that the liquid in the liquid container comes in contact with the sensor unit of the actuator 833 via the opening at the center of the plate 881. The plate 881 is adhered to the upper end of a cylindrical case 882 made of resin liquid tightly, thus the actuator 833 is housed in the case 882.

To electrically connect a pair of electrodes 884 formed on a circuit board 883 where a control element (not shown in the drawing) such as a semiconductor memory for controlling the actuator 833 is mounted and a pair of electrodes (not shown in the drawing) of the actuator 833, a pressed-and-held connector 885 is housed in the case 882 so that the pressed-and-held connector 885 is held between the circuit board 883 and the actuator 833 and the case 882 and the circuit board 883 are fixed by adhesion. By doing this, the actuator 833 and the circuit board 883 are electrically connected via the pressed-and-held connector 885.

FIGS. 36A and 36B show an example of the pressed-and-held connector 885 and the pressed-and-held connector 885 is that a plurality of brass wires 886 plated with gold are held by silicone sponge rubber members 887 comparatively soft and the periphery thereof is covered by a silicone solid rubber member 888 which is sufficiently strong not to be buckled at the time of pressing. A cavity 889 is formed in the silicone solid rubber member 888 at the part corresponding to the sensor part (vibration part) of the actuator 833 so as to prevent the vibration of the sensor part of the actuator 833 from obstruction. The cavity 889 may be formed by boring by a press and may be formed at the time of molding of the silicone solid rubber member 888. In the example shown in FIGS. 36A and 36B, the plurality of brass wires 886 extending in the compression direction are arranged in two rows on both sides of the cavity 889 and the arrangement directions of the rows of the plurality of brass wires 886 are parallel with each other.

FIGS. 37A and 37B show another example of the pressed-and-held connector 885 and a difference from the constitution shown in FIGS. 36A and 36B is that the plurality of brass wires 886 are arranged in a transverse row.

Even when the relative position of the actuator 833 and the pressed-and-held connector 885 is shifted at the time of assembling the module shown in FIG. 35 using the pressed-and-held connector 885 shown in FIGS. 36A and 36B or FIGS. 37A and 37B, in the arrangement direction of the brass wires 886, the contact between the electrodes of the actuator 833 with the brass wires 886 is ensured. Therefore, when the brass wires 886 are arranged in the direction in which the shift at the time of assembly is large, the electrodes of the actuator 833 and the electrodes 884 of the circuit board 883 can be electrically connected surely.

Figure 38A:
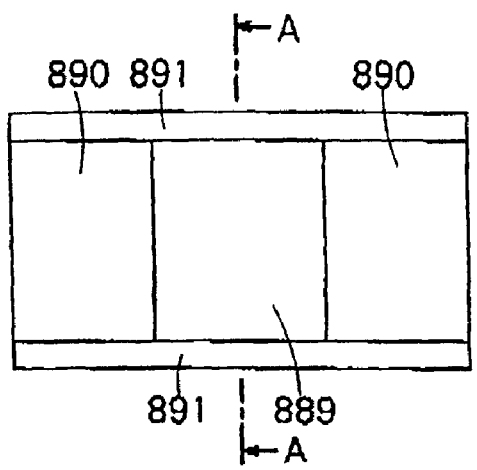
FIGS. 38A and 38B are drawings showing still another example of a pressed-and-held connector of the module shown in FIG. 35.
Figure 38B:
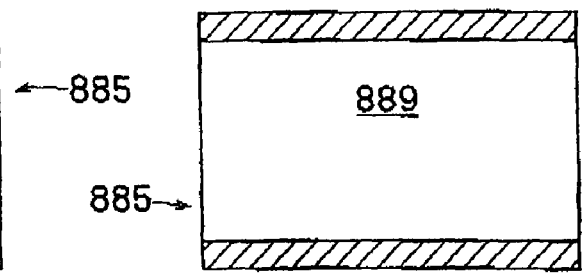

FIGS. 38A and 38B show still another example of the pressed-and-held connector 885 and in this example, a pair of conductive silicone rubber members 890 containing carbon are used instead of the brass wires and the conductive silicone rubber members 890 are integrated by an insulating silicone rubber member 891. Between the conductive silicone rubber members 890, the cavity 889 is formed in the same way as with the pressed-and-held connector 885 shown in FIGS. 36A and 36B or FIGS. 37A and 37B.

Figure 39A:
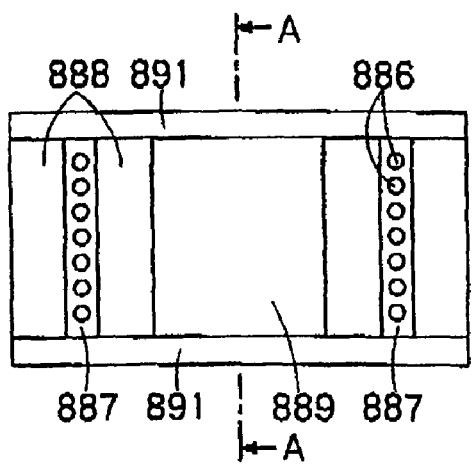
FIGS. 39A and 39B are drawings showing a further example of a pressed-and-held connector of the module shown in FIG. 35.
Figure 39B:
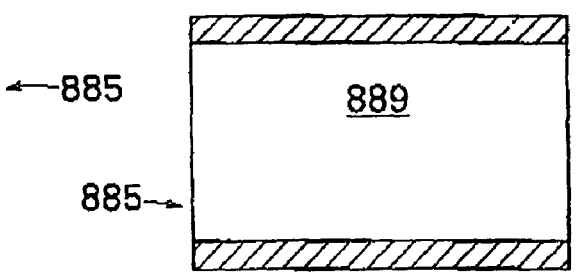

FIGS. 39A and 39B show a further example of the pressed-and-held connector 885 and in this example, the left and right halves of the pressed-and-held connector 885 shown in FIG. 36A are connected using the insulating silicone rubber 891 shown in FIG. 38A instead of connecting by continuously forming the silicone solid rubber member 888 itself.

Figure 40A:
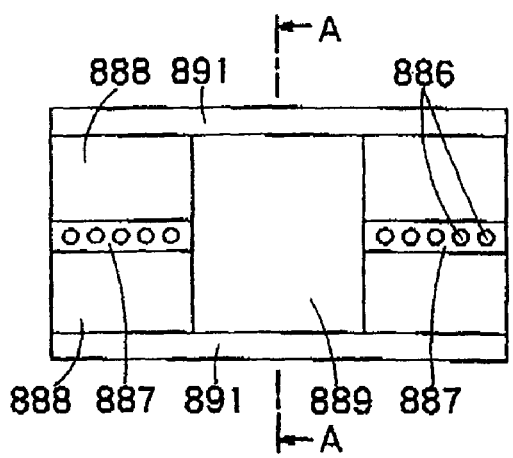
FIGS. 40A and 40B are drawings showing a still further example of a pressed-and-held connector of the module shown in FIG. 35.
Figure 40B:
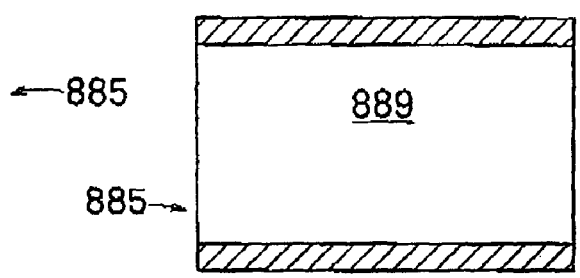

FIGS. 40A and 40B show a still further example of the pressed-and-held connector 885 and in this example, the left and right halves of the pressed-and-held connector 885 shown in FIG. 37A are connected using the insulating silicone rubber 891 shown in FIG. 38A instead of connecting by continuously forming the silicone solid rubber member 888 itself.

According to the pressed-and-held connector 885 having the constitution shown in FIGS. 38A to 40B, the boring process for forming the cavity 889 is not necessary.

As mentioned above, according to the module of this embodiment, the actuator 833 and the circuit board 883 can be electrically connected via the pressed-and-held connector 885, so that no soldering operation is required for connection and the manufacturing method is made easier.

The embodiments of the present invention are explained above. The scope of the present invention is not limited to the range described in the embodiments aforementioned. For example, the liquid container of the present invention is not limited to the ink cartridge and can be applied to the other kinds of liquid containers. Various changes or improvements can be applied to the embodiments aforementioned. It is obvious from the description in the claims that any configuration to which such various changes or improvements are applied is included in the scope of the present invention.

As clearly described by the explanation aforementioned, according to the present invention, the piezo-electric device can be appropriately mounted or demounted from the liquid container.

What is claimed is:

1. A module comprising:
   a piezo-electric device used to detect a consumption condition of a liquid in a liquid container;
   a circuit board electrically connected to said piezo-electric device; and
   a pressed-and-held connector which is pressed and held between said circuit board and said piezo-electric device so as to electrically connect a pair of electrodes formed on said circuit board and a pair of electrodes of said piezo-electric device.

2. A module according to claim 1, wherein said pressed-and-held connector has an insulating elastic member which is held and elastically compressed between said circuit board and said piezo-electric device, and a plurality of conductors extending inside said elastic member in a compression direction.

3. A module according to claim 1, wherein said pressed-and-held connector has a pair of conductive rubber members arranged between said pair of electrodes formed on said circuit board and said pair of electrodes of said piezo-electric device and an insulating rubber member for mutually connecting said pair of conductive rubber members.

4. A module according to claim 1, wherein said piezo-electric device has a piezo-electric element having a piezo-electric layer held between a pair of electrodes, a vibrating plate on one side of which said piezo-electric element is arranged, and a cavity forming member having a cavity arranged on the other side of said vibrating plate, and
   wherein said vibrating plate comes in contact with said liquid in said liquid container via said cavity.

* * * * *